(12) United States Patent
Bedadala et al.

(10) Patent No.: US 11,263,173 B2
(45) Date of Patent: Mar. 1, 2022

(54) TRANSACTION LOG INDEX GENERATION IN AN ENTERPRISE BACKUP SYSTEM

(71) Applicant: Commvault Systems, Inc., Tinton Falls, NJ (US)

(72) Inventors: Pavan Kumar Reddy Bedadala, Piscataway, NJ (US); Manoj Kumar Pradhan, Edison, NJ (US); Hemant Mishra, Englishtown, NJ (US); Gopikannan Venugopalsamy, Sunnyvale, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 129 days.

(21) Appl. No.: 16/526,699

(22) Filed: Jul. 30, 2019

(65) Prior Publication Data
US 2021/0034571 A1    Feb. 4, 2021

(51) Int. Cl.
*G06F 16/13* (2019.01)
*G06F 16/18* (2019.01)
(Continued)

(52) U.S. Cl.
CPC ........ *G06F 16/134* (2019.01); *G06F 11/1456* (2013.01); *G06F 11/1474* (2013.01);
(Continued)

(58) Field of Classification Search
CPC .. G06F 16/27; G06F 11/1453; G06F 11/1458; G06F 11/1474; G06F 16/13;
(Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.
(Continued)

*Primary Examiner* — Ken Hoang
(74) *Attorney, Agent, or Firm* — Knobbe, Martens, Olson & Bear, LLP

(57) ABSTRACT

Certain embodiments disclosed herein reduce or eliminate a communication bottleneck at the storage manager by reducing communication with the storage manager while maintaining functionality of an information management system. In some implementations, operations performed as part of a backup process may be stored in transaction logs. These transaction logs may include information about a transaction performed between the client computing system and the network storage that hosts the backup of the client computing system. The transaction logs may be provided to a secondary storage system that can be used to form a backup index. The backup index may be used to facilitate accessing the data stored at the network storage. Advantageously, generating the transaction logs and separating the generation of the backup index from the backup process can reduce resource usage during performance of the backup and speed up the backup process while further reducing interaction with the storage manager.

20 Claims, 29 Drawing Sheets

(51) Int. Cl.
*G06F 16/23* (2019.01)
*G06F 16/27* (2019.01)
*G06F 16/172* (2019.01)
*G06F 11/14* (2006.01)
*G06F 21/62* (2013.01)

(52) U.S. Cl.
CPC ........ *G06F 16/172* (2019.01); *G06F 16/1865* (2019.01); *G06F 16/2379* (2019.01); *G06F 16/27* (2019.01); *G06F 21/6227* (2013.01)

(58) Field of Classification Search
CPC .. G06F 16/134; G06F 16/172; G06F 16/1865; G06F 16/2379
See application file for complete search history.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 5,835,915 A | 11/1998 | Car et al. | |
| 5,960,436 A | 9/1999 | Chang et al. | |
| 6,418,478 B1 | 7/2002 | Ignatius et al. | |
| 6,457,014 B1 | 9/2002 | Parker | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,107,298 B2 | 9/2006 | Prahlad et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,734,669 B2 | 6/2010 | Kottomtharayil et al. | |
| 7,747,579 B2 | 6/2010 | Prahlad et al. | |
| 7,793,148 B2 | 9/2010 | Beardsley et al. | |
| 7,801,864 B2 | 9/2010 | Prahlad et al. | |
| 7,809,914 B2 | 10/2010 | Kottomtharayil et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,627,025 B2 | 1/2014 | Doshi et al. | |
| 8,954,446 B2 | 2/2015 | Vijayan Retnamma et al. | |
| 9,020,900 B2 | 4/2015 | Vijayan Retnamma et al. | |
| 9,098,495 B2 | 8/2015 | Gokhale | |
| 9,239,687 B2 | 1/2016 | Vijayan et al. | |
| 9,444,811 B2 | 9/2016 | Nara et al. | |
| 9,448,731 B2 | 9/2016 | Nallathambi et al. | |
| 9,491,112 B1 | 11/2016 | Patel et al. | |
| 9,575,804 B2 | 2/2017 | Kochunni et al. | |
| 9,633,033 B2 | 4/2017 | Vijayan et al. | |
| 9,639,274 B2 | 5/2017 | Maranna et al. | |
| 9,645,762 B2 | 5/2017 | Nara et al. | |
| 9,648,105 B2 | 5/2017 | Nallathambi et al. | |
| 9,904,481 B2 | 2/2018 | Joshi et al. | |
| 9,921,920 B2 | 3/2018 | Nallathambi et al. | |
| 9,939,981 B2 | 4/2018 | Varadharajan et al. | |
| 9,996,428 B2 | 6/2018 | Nallathambi et al. | |
| 10,474,388 B2 | 11/2019 | Nara et al. | |
| 10,521,308 B2 | 12/2019 | Nallathambi et al. | |
| 10,628,266 B2 | 4/2020 | Nallathambi et al. | |
| 10,628,267 B2 | 4/2020 | Pradhan et al. | |
| 10,673,943 B2 | 6/2020 | Pradhan et al. | |
| 2003/0074600 A1 | 4/2003 | Tamatsu | |
| 2003/0120636 A1 | 6/2003 | Bird et al. | |
| 2006/0224846 A1 | 10/2006 | Amarendran et al. | |
| 2007/0185922 A1 | 8/2007 | Kapoor et al. | |
| 2008/0040551 A1 | 2/2008 | Gray et al. | |
| 2009/0319534 A1 | 12/2009 | Gokhale | |
| 2010/0005151 A1* | 1/2010 | Gokhale | G06F 16/27 709/216 |
| 2011/0302140 A1* | 12/2011 | Gokhale | G06F 11/1471 707/645 |
| 2012/0096093 A1 | 4/2012 | Bouw et al. | |
| 2012/0150818 A1 | 6/2012 | Vijayan Retnamma et al. | |
| 2012/0150826 A1 | 6/2012 | Vijayan Retnamma et al. | |
| 2014/0046908 A1 | 2/2014 | Patiejunas et al. | |
| 2014/0181035 A1* | 6/2014 | Moue | G06F 16/25 707/647 |
| 2014/0189432 A1 | 7/2014 | Gokhale et al. | |
| 2014/0201170 A1 | 7/2014 | Vijayan et al. | |
| 2015/0039931 A1 | 2/2015 | Blood et al. | |
| 2015/0074536 A1 | 3/2015 | Varadharajan et al. | |
| 2015/0205682 A1 | 7/2015 | Gokhale et al. | |
| 2015/0268876 A1 | 9/2015 | Ahn et al. | |
| 2015/0363319 A1* | 12/2015 | Qi | G06F 11/2028 711/121 |
| 2016/0004721 A1 | 1/2016 | Iyer et al. | |
| 2016/0110266 A1 | 4/2016 | Nara et al. | |
| 2016/0350391 A1 | 12/2016 | Vijayan et al. | |
| 2017/0168903 A1 | 6/2017 | Dornemann et al. | |
| 2017/0185488 A1 | 6/2017 | Kumarasamy et al. | |
| 2017/0193003 A1 | 7/2017 | Vijayan et al. | |
| 2017/0206018 A1 | 7/2017 | Nara et al. | |
| 2017/0228290 A1 | 8/2017 | Macanti et al. | |
| 2017/0235647 A1 | 8/2017 | Kilaru et al. | |
| 2017/0242871 A1 | 8/2017 | Kilaru et al. | |
| 2018/0024862 A1 | 1/2018 | Nakagawa et al. | |

(56) References Cited

U.S. PATENT DOCUMENTS

| | | |
|---|---|---|
| 2018/0253192 A1 | 9/2018 | Varadharajan et al. |
| 2019/0278661 A1 | 9/2019 | Bharatkumar et al. |
| 2019/0278663 A1 | 9/2019 | Bharatkumar et al. |
| 2019/0340082 A1 | 11/2019 | Pradhan et al. |
| 2019/0340084 A1 | 11/2019 | Pradhan et al. |
| 2020/0192899 A1 | 6/2020 | Joshi et al. |
| 2020/0322430 A1 | 10/2020 | Pradhan et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.
Written Opinion in PCT/US2019/029876 dated Jul. 17, 2019 in 7 pages.
International Search Report in PCT/US2019/029876 dated Jul. 17, 2019 in 8 pages.
International Preliminary Report on Patentability in PCT/US2019/029876 dated Nov. 3, 2020 in 8 pages.

* cited by examiner

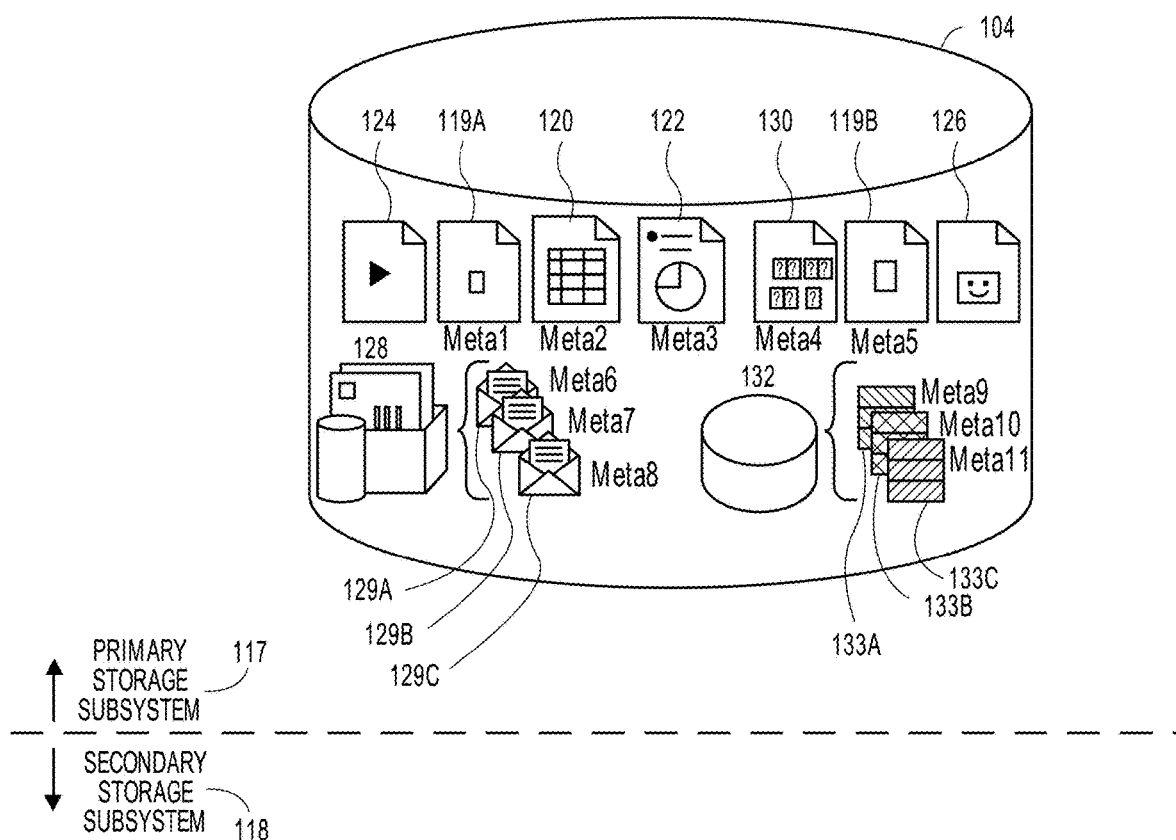
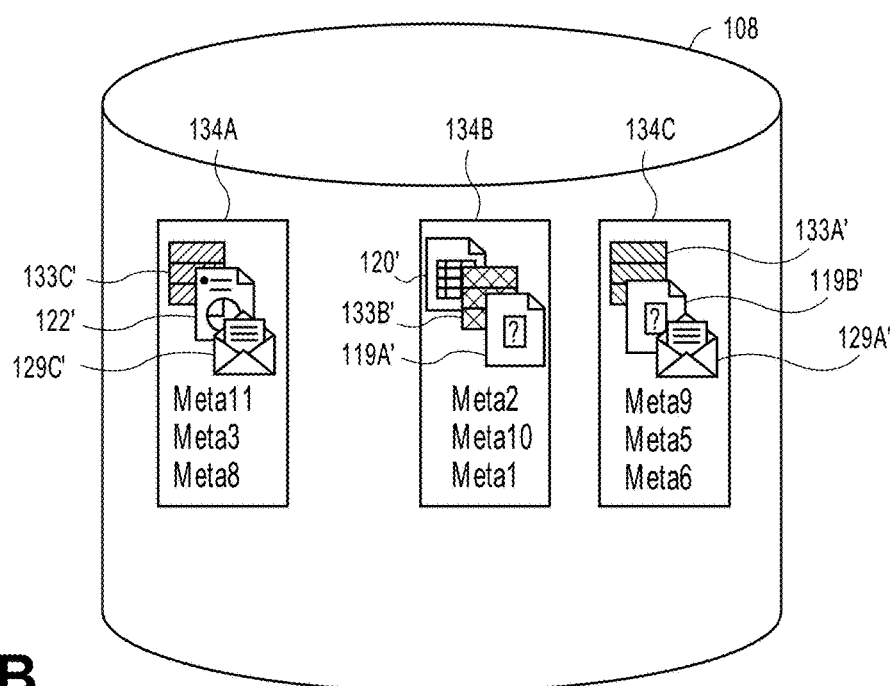
FIG. 1B

TRANSACTION LOG INDEX GENERATION IN AN ENTERPRISE BACKUP SYSTEM

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

SUMMARY

In some cases, a bottleneck may be created in an information management system by components or systems of the information management system that help regulate the processing of data across the information management system. As the number of client devices supported by the information management system increases, the bottleneck can worsen, which can reduce the availability of computing resources within an information management system. This reduction in resource availability can include a reduction in hardware processor availability and/or storage availability. In some cases, it is not possible to scale the number of supported client devices to a desired level or amount because of the constraint on available resources at the information management system.

One example where users may notice the reduction in resource availability due to communication bottlenecks in the information management system is in the backup or restore context. A storage manager may trigger a backup process for a client computing system, such as a laptop, desktop, or tablet. Each time the backup process is to be performed, the storage manager may alert the client and provide metadata to the client that, among other features, instructs the client regarding the availability of resources to perform the backup process. The client may then communicate data for backup to a media agent along with metadata to facilitate indexing the data at a backup location, such as a network storage site or a secondary storage disk. Further, the storage manager may provide metadata to the media agent instructing the media agent regarding resources to use to complete the backup, the type of backup to perform, and other backup related features or decisions. When the information management system includes a large number of clients (such as 10,000, 20,000, 100,000, or 200,000 clients), the communication with the storage manager during the backup process can cause a bottleneck in the backup process when a large number or percentage of the clients are to be backed up simultaneously or substantially in parallel. Similar problems may occur in the restore context.

Certain embodiments disclosed herein reduce or eliminate the bottleneck by reducing communication with the storage manager. In some implementations, a client obtains information for enabling a secondary storage job (e.g., a backup or restore) from a storage manager and stores the information (which may be referred to as job metadata) in a local cache. The client may then reuse the job metadata for multiple storage jobs reducing the frequency of communication with the storage manager. When a configuration of the information management system changes, or the availability of resources changes, the storage manager can push updates to the job metadata to the clients. Further, a client can periodically request updated job metadata from the storage manager ensuring that the client does not rely on out-of-date job metadata.

Further, certain embodiments disclosed herein enable a client of the information management system to communicate data directly with a cloud or network storage system while providing index data or backup metadata to the media agent. Advantageously, in certain embodiments, by separating the data and the backup metadata, the burden on computing resources of the media agent can be reduced. In certain embodiments, by distributing backup management, at least in part, to the client systems, communications with the storage manager and the media agent during backup and restore operations can be reduced. Further, the distributed backup management enables the information management system to be scaled to support a greater number of client devices while utilizing the same amount or fewer computing resources compared to non-distributed backup management systems.

In addition, certain embodiments disclosed herein may present backup index information in transaction logs. These transaction logs may include information about a transaction performed between the client computing system and the network storage that hosts the backup of the client computing system. The transaction typically, but not necessarily, may relate to the modification of data stored at the backup via, for example, performing a backup, deleting data from a backup, consolidating backups, or any other process that may modify the data stored at the network storage system. The transaction logs may be provided to a secondary storage system that can be used to form a backup index. The backup index may be used to facilitate accessing the data stored at the network storage. Advantageously, in certain embodiments, by separately generating the transaction logs and providing the transaction logs to the secondary storage system, the backup index can be generated in a separate process from the backup, thereby reducing resource usage during performance of the backup and speeding up the backup process.

Further, in certain embodiments disclosed herein, a client computing device interacting with the network storage system during a backup process can monitor commit cycles of chunks being stored at the network storage system. Chunks, in some cases, may be larger units than files, smaller than certain files, or include portions of files with other portions of files being stored in other chunks. By monitoring the commit confirmation of chunks, the client computing device can restart an interrupted backup process at a particular point without scanning a backup or primary store to determine where the backup was interrupted, thereby reducing the time to restart a backup and the resources used during restart of the backup process.

Moreover, certain embodiments disclosed herein reduce or eliminate the communication bottleneck that may occur in the backup context (and in other data management contexts) by reducing the number of queries to the storage manager. In some cases, a client computing system, via, for example, a data agent or a media agent may communicate with the storage manager numerous times during a single backup process. For example, the data agent may communicate with the storage manager between 10 and 15 times, or more, during a single backup process. In some cases, poor software development or poor configuration management may result in a number of unnecessary queries to the storage manager. These queries may be unnecessary because, for example, they are duplicative of queries previously requested as part of the job, or as part of an earlier job.

For an information management system that includes a 1,000 client computers that are backed up once every hour with 10 to 15 queries per backup process, there may be between 240,000 and 360,000 queries to the storage manager in a single day. Certain embodiments disclosed herein reduce or eliminate queries to the storage manager by caching previous storage manager queries at a local cache. In addition, communications with the storage manager may be further reduced by aggregating related queries. In certain cases, the number of communications in the previous example, can be reduced from between 240,000 and 360,000 queries down to 24,000 queries or even 1,000 queries (e.g., 1 per client computer per hour, or one per client computer per day). Moreover, as many of the queries may be redundant because, for example, each backup uses similar configuration information or because changes in the information management system may be relatively rare (e.g., once a month, 2-3 times a quarter, once a year, etc.), using the local cache may enable queries to be reduced significantly further (e.g., from 24,000 a day to a 1,000 or less a day). It should be understood that the numbers in the above examples are for illustration purposes only. It is possible that more or less queries may occur for a particular entity's configuration of the information management system. Advantageously, in certain embodiments, by reducing the number of queries to the storage manager, the storage manager can support a greater number of client computer systems. Moreover, an information management system can reduce the number of storage manager systems while supporting a larger number of client computer systems.

BRIEF DESCRIPTION OF THE DRAWINGS

FIG. 1B is a detailed view of a primary storage device, a secondary storage device, and some examples of primary data and secondary copy data.

DETAILED DESCRIPTION

Detailed descriptions and examples of systems and methods according to one or more embodiments may be found in the section titled Transaction Log Based Indexing, as well as in the section titled Example Embodiments, and also in FIGS. 15-20 herein. Furthermore, components and functionality for storage manager query caching may be configured and/or incorporated into information management systems such as those described herein in FIGS. 1A-1H and 2A-2C. Moreover, embodiments of storage manager query caching can be utilized with and/or combined with embodiments of distributing backup management described herein with respect to FIG. 3-14. A "cloud computing environment" as used herein can include a collection (or suite) of resources provided as a service by the cloud service provider to a cloud services account. Such a cloud computing environment can be accessed via the cloud service account that entitles the subscriber to a suite of services in a given cloud service supplied by a cloud service provider. Cloud computing environments can vary among cloud services, among cloud availability zones, and even among cloud service accounts from the same cloud service provider. A cloud computing environment as used herein need not comprise data processing (computing) resources and can be limited to data storage and retrieval features. Certain embodiments described herein can be implemented in a cloud computing environment, for example, including those shown and described with respect to FIGS. 5A-20.

Various embodiments described herein are intimately tied to, enabled by, and would not exist except for, computer technology. For example, storage manager query caching an distributing backup management as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
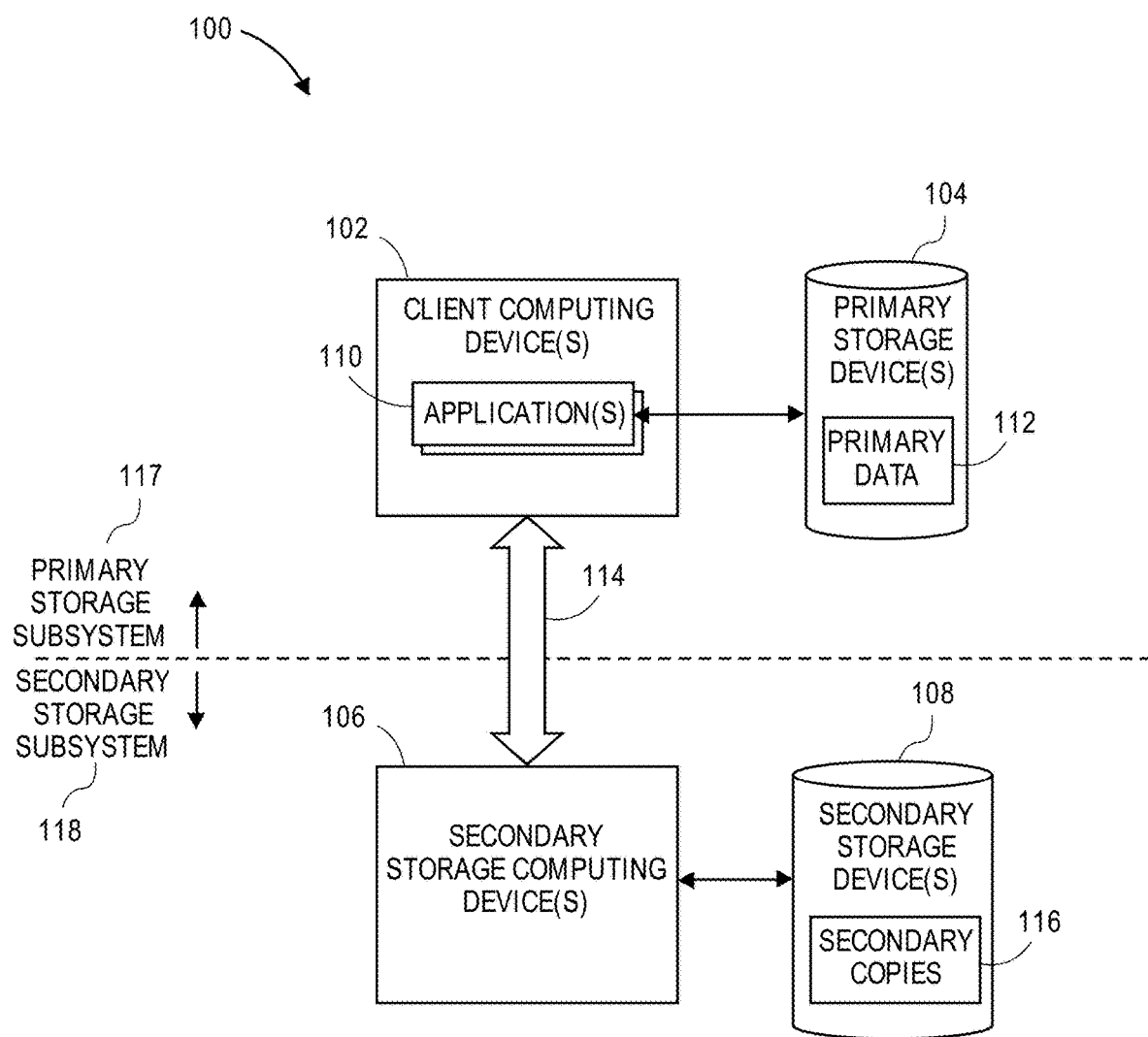
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. Patent Application No. 62/265,339 entitled "Live Synchronization and Management of Virtual Machines across Computing and Virtualization Platforms and Using Live Synchronization to Support Disaster Recovery";

U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information"; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
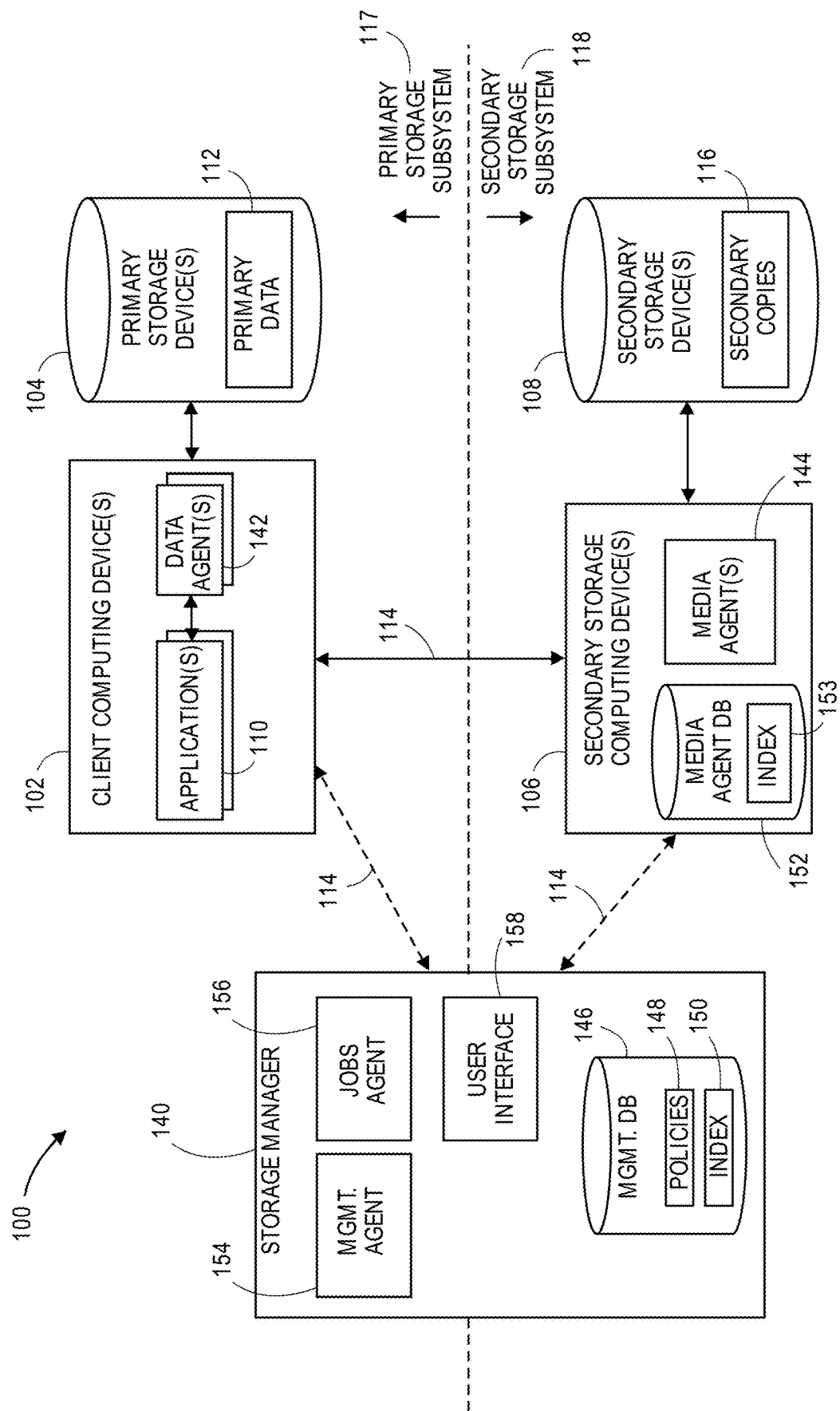
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
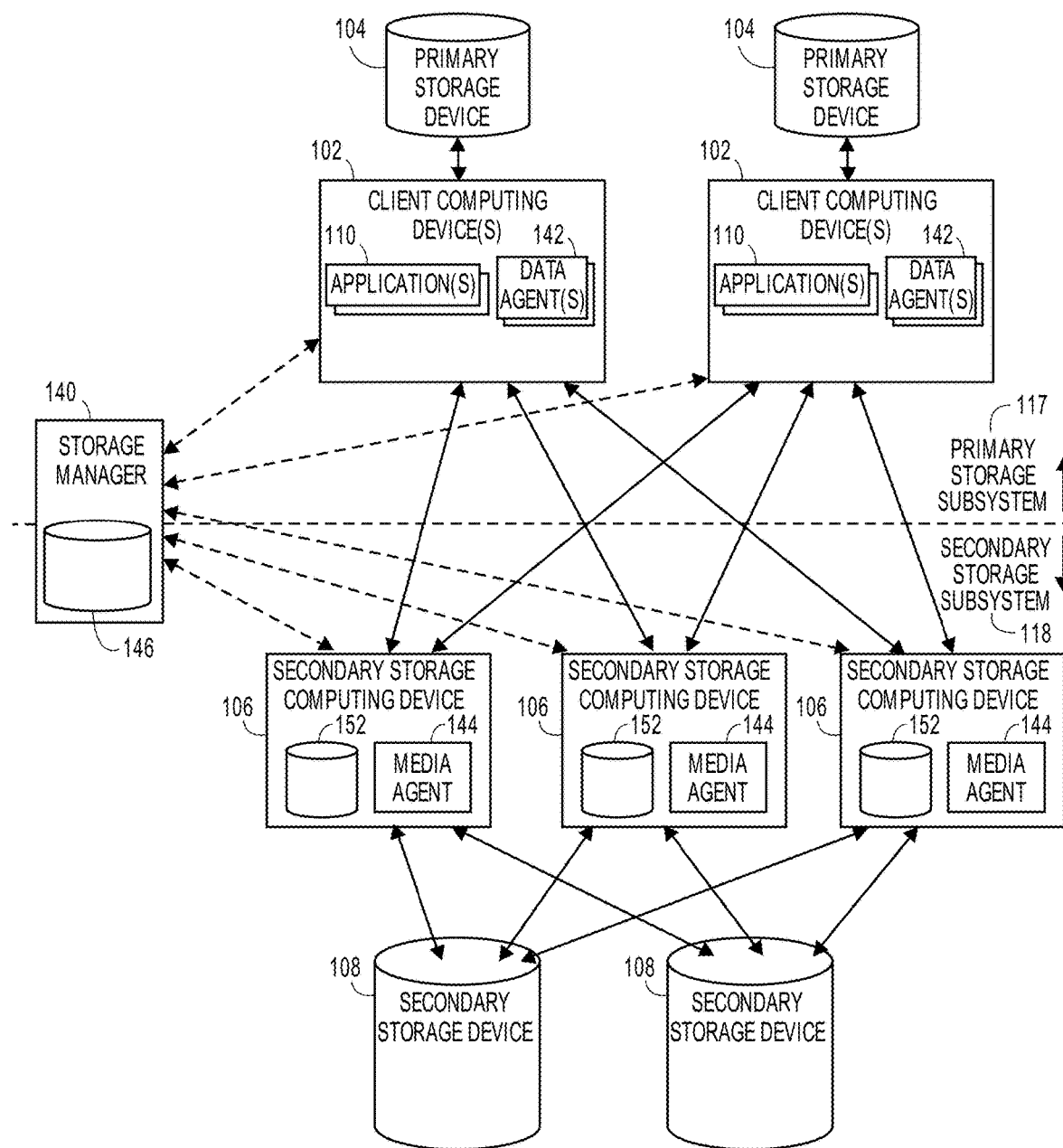
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.); Sa location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116; Sa relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
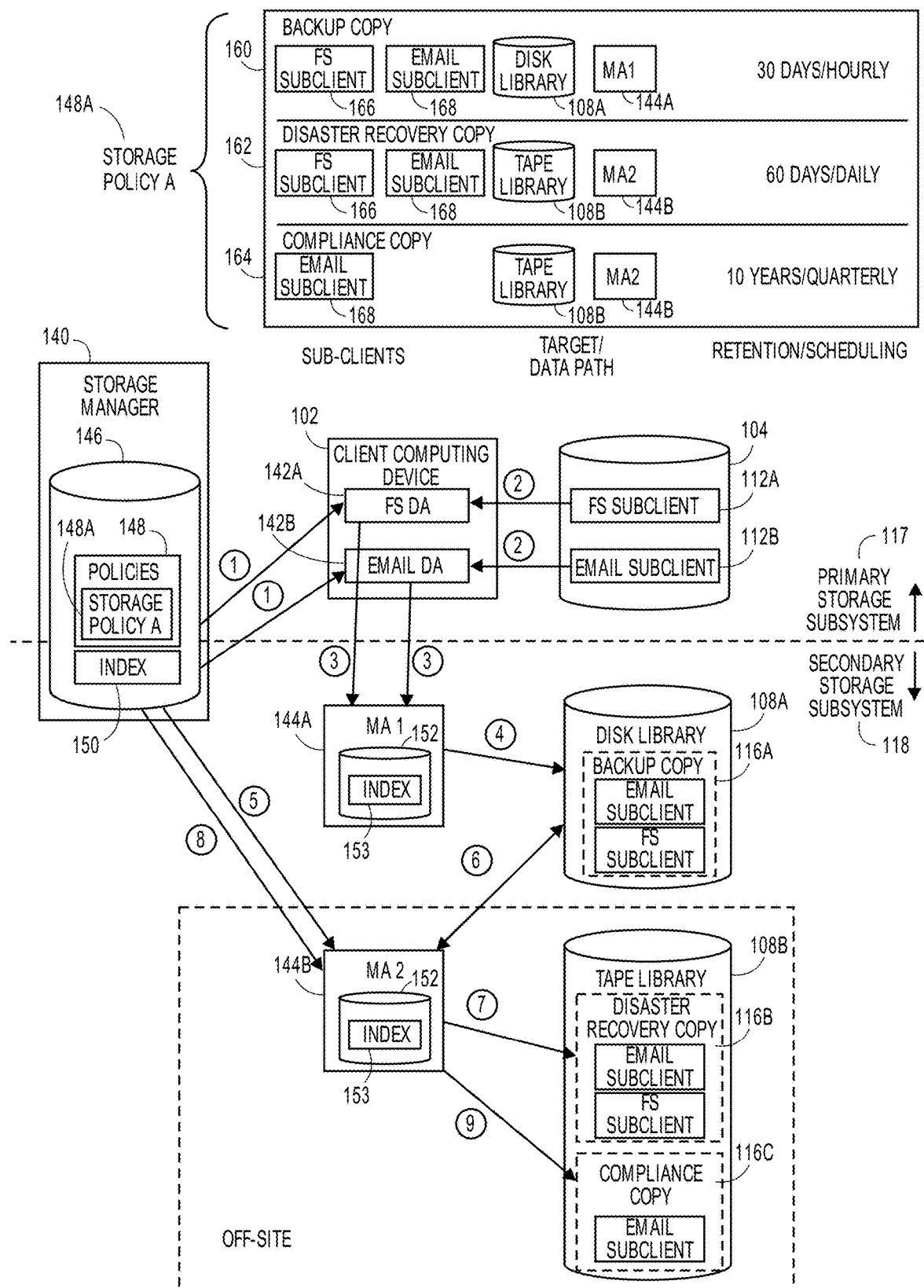
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic dataloss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s)

142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria.

The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
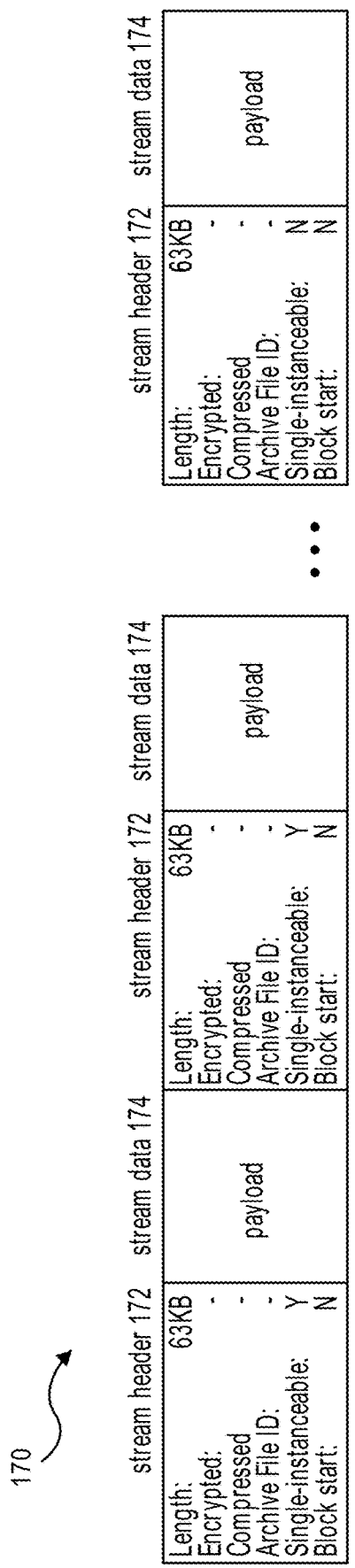
FIGS. 1F-1H are block diagrams illustrating suitable data structures that may be employed by the information management system.
Figure 1G:
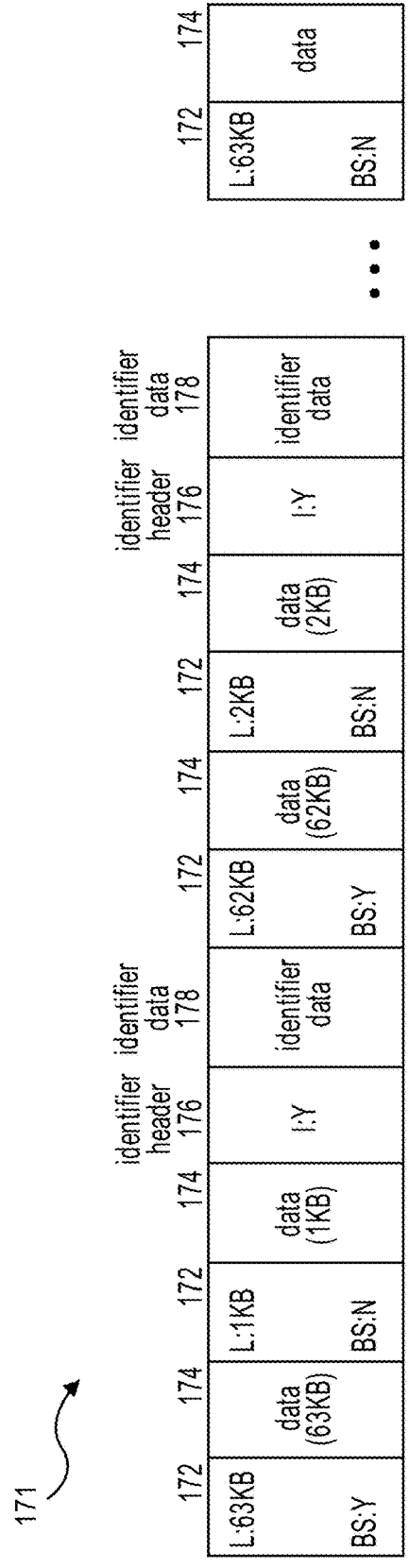

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
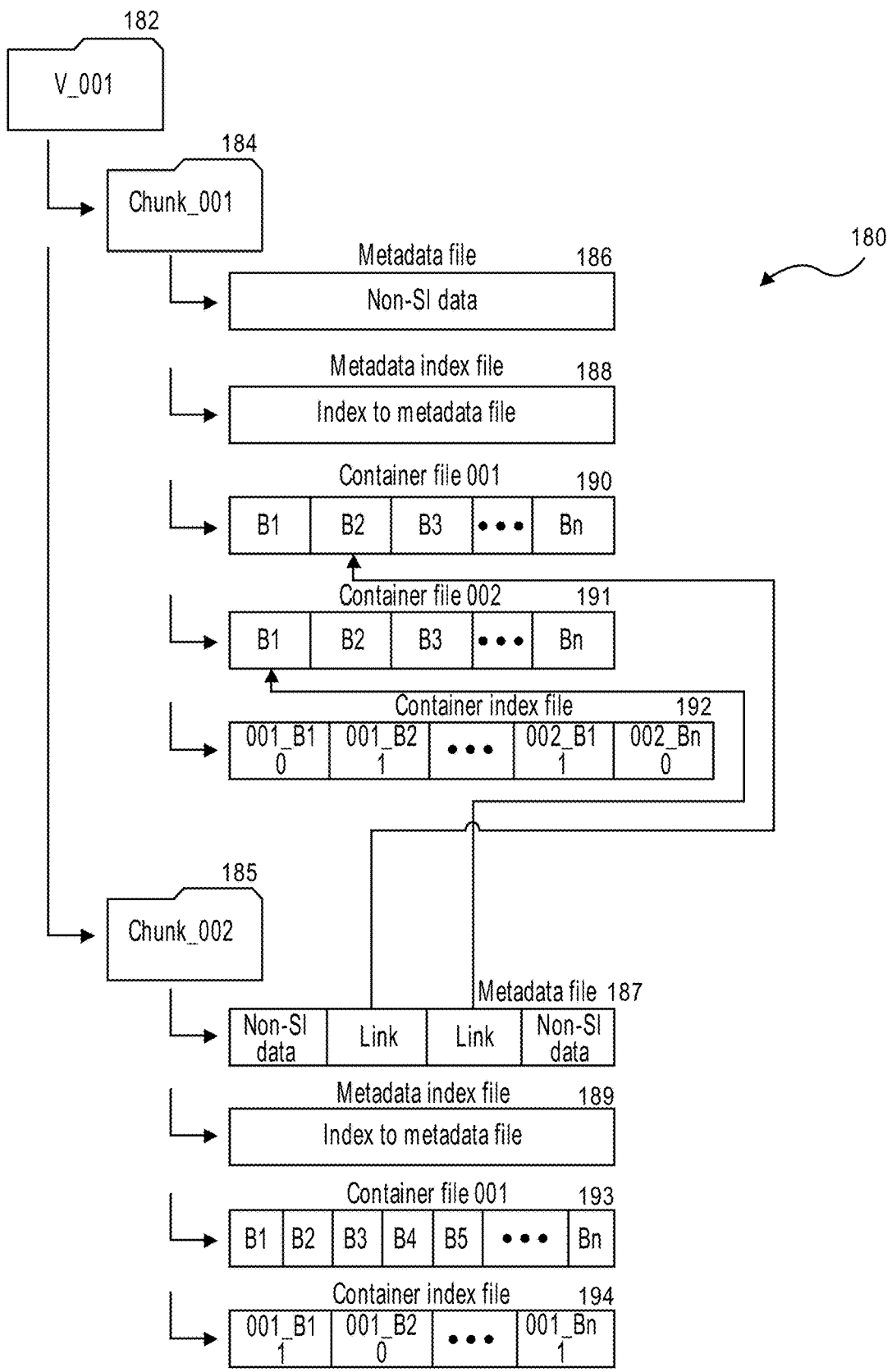

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
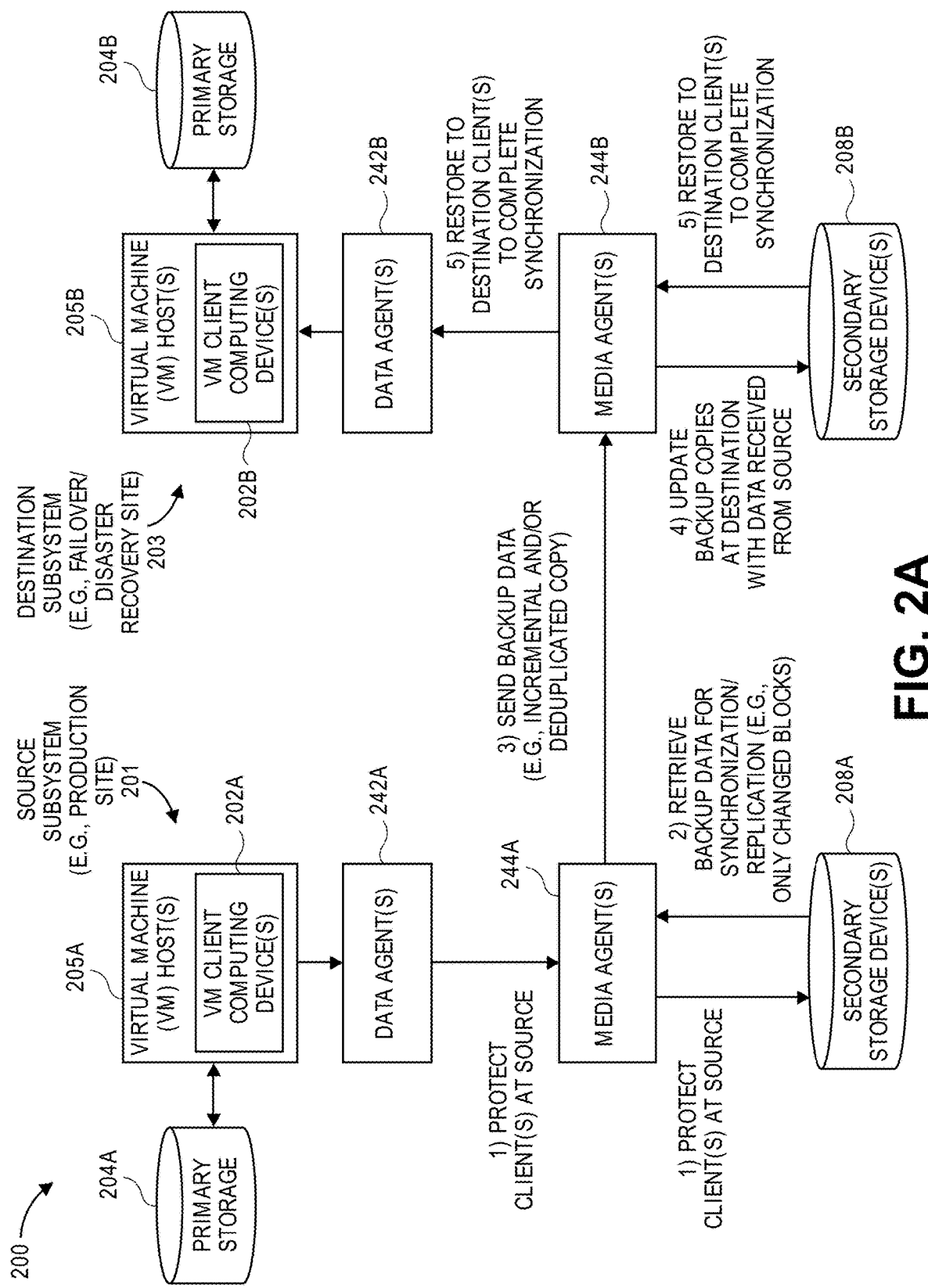
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
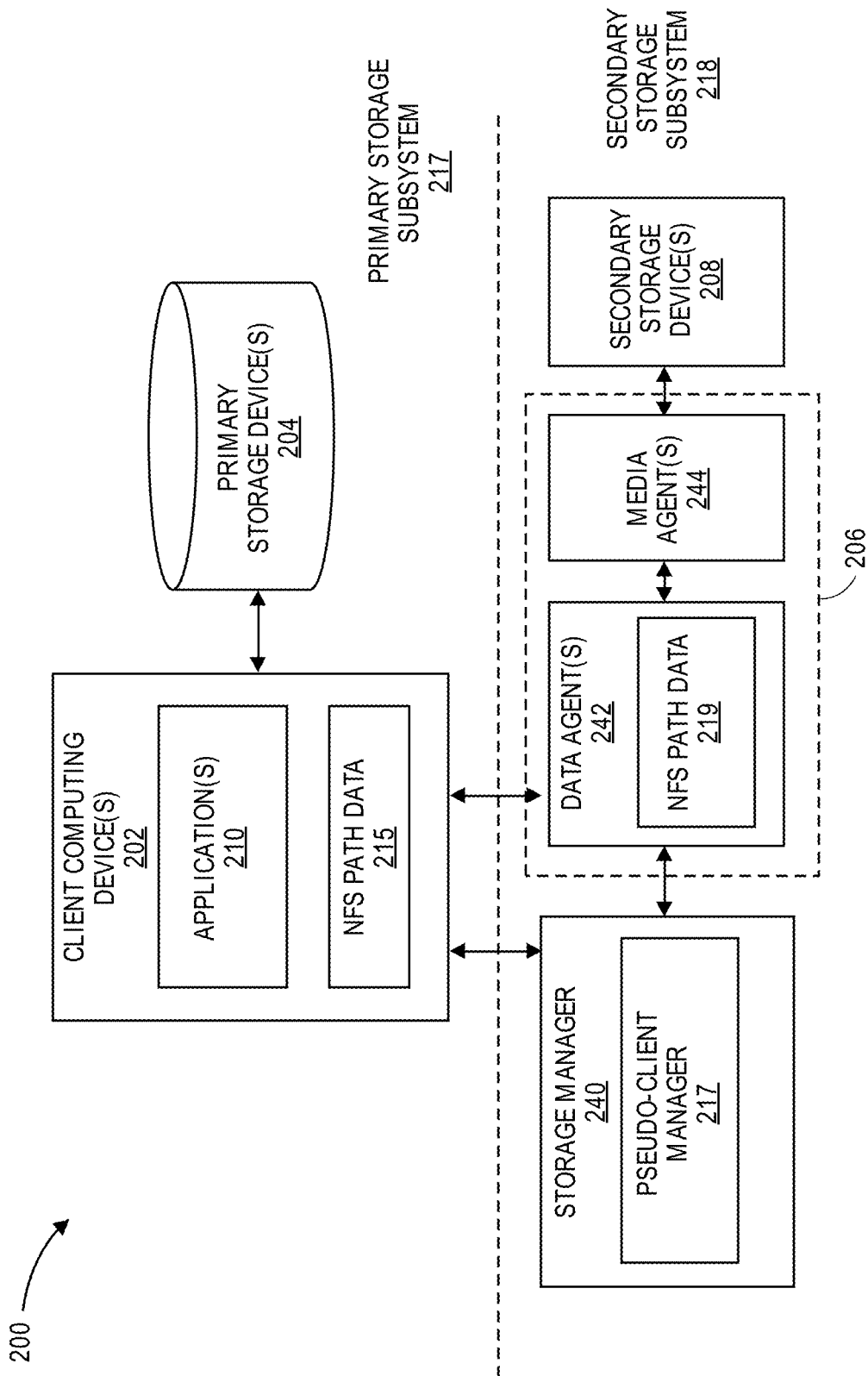
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
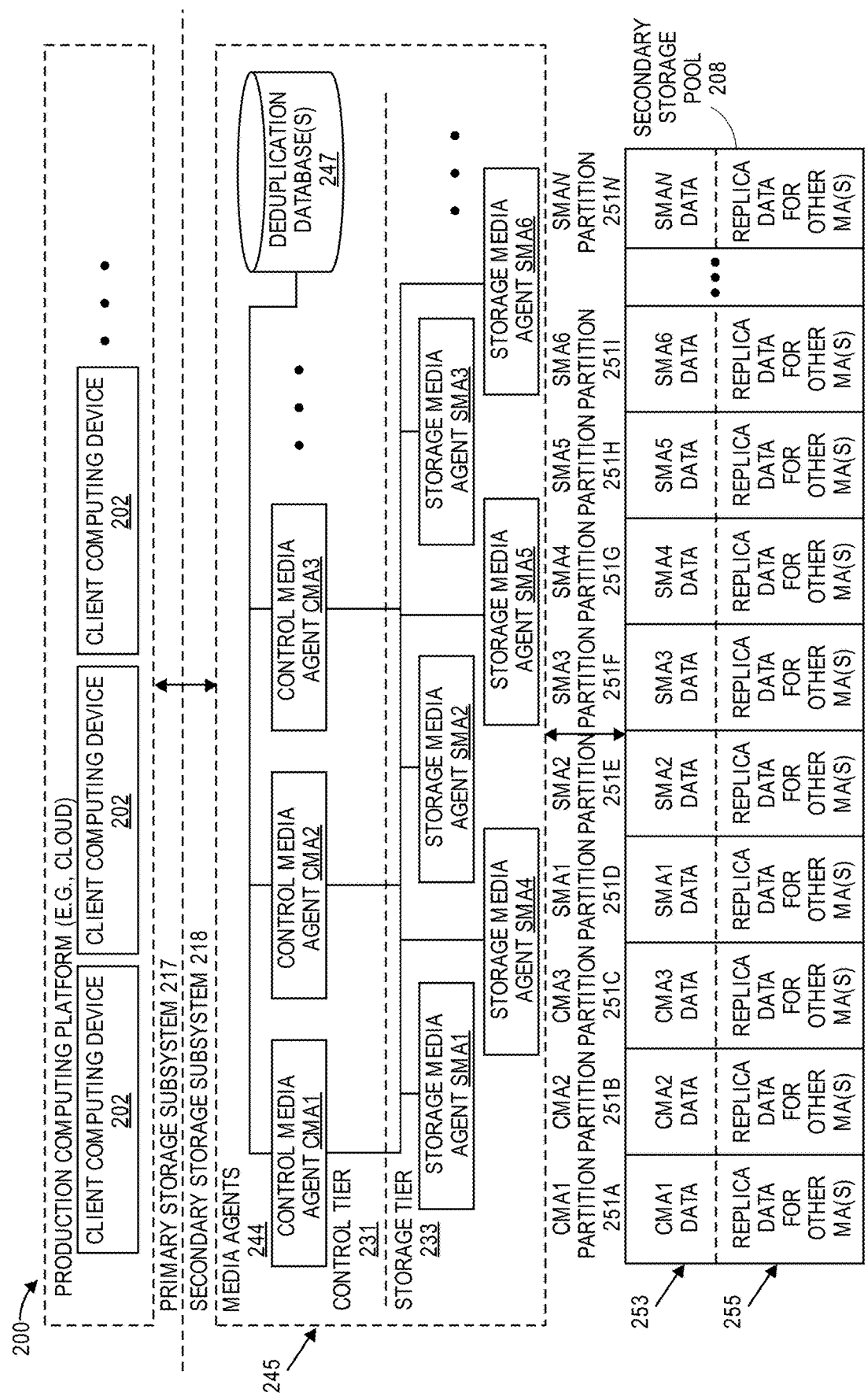
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Distributed Backup Management

As previously described, in some embodiments, a storage manager 140 may manage or control backup and/or restore operations between computing systems of a primary storage system 117 and computing systems of a secondary storage system 118. However, in certain embodiments, the amount of communication with the storage manager 140, as well as other overhead, during a backup or restore process may limit the number of client computing devices 102 that can be supported by the information management system 100.

Figure 3:
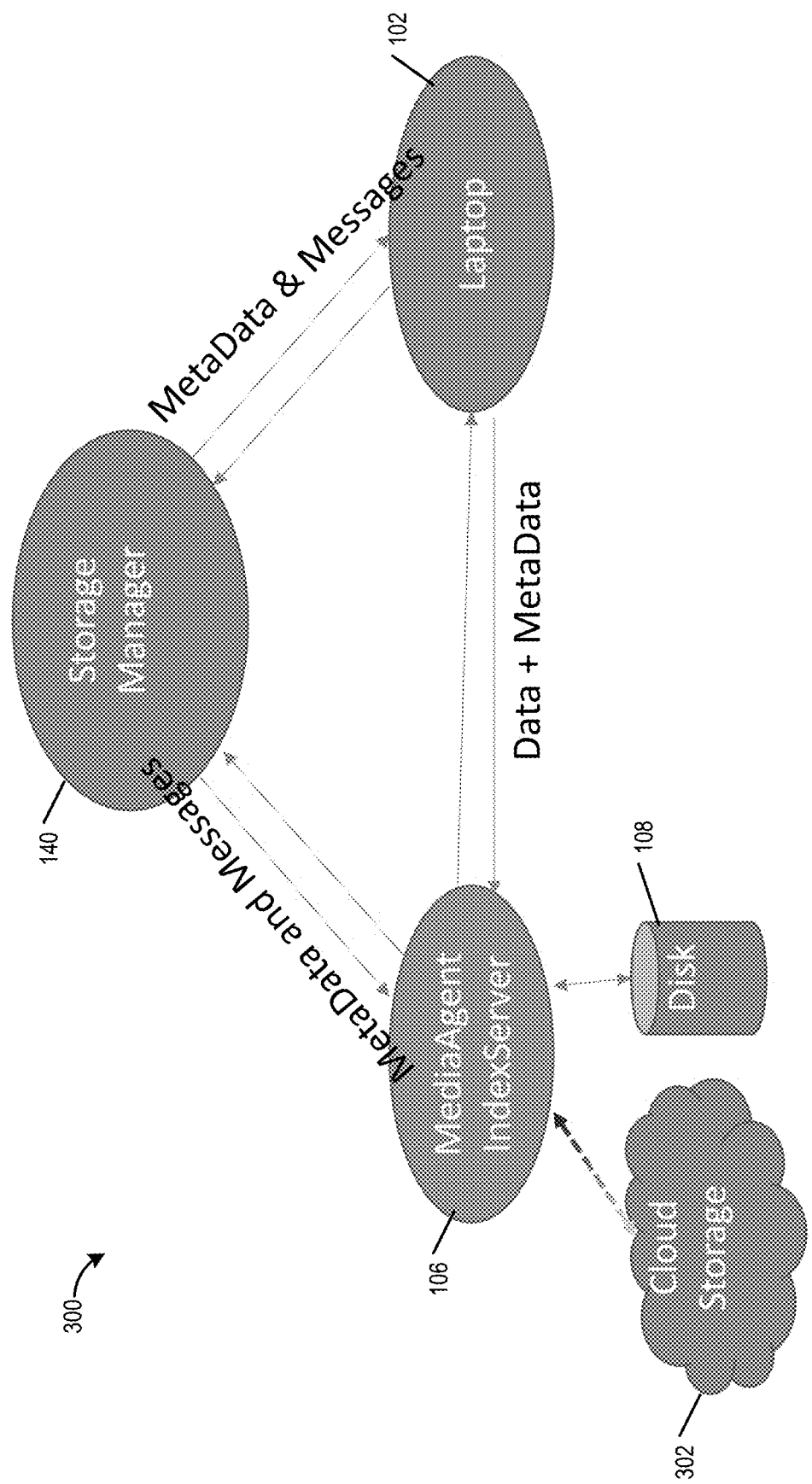
FIG. 3 presents one example of a dataflow diagram illustrating the flow of data and metadata within an information management system.

FIG. 3 presents one example of a dataflow diagram 300 illustrating the flow of data and metadata within an example embodiment of the information management 100 system. As illustrated by the dataflow diagram 300, the storage manager 140 may provide control messages and metadata to a client computing device 102, such as a laptop, tablet, or desktop computing system. The control messages may include, among other possibilities, a trigger to initiate backup of the client computing device 102. The metadata may include an identity of the secondary storage computing device to which to provide data for backup, a number of communication streams available to the client computing device 102, a type of filter to use in selecting data for backup, a type of scanning process (for example, a recursive scan) to identify data for backup, and the like.

Further, the storage manager 140 may provide metadata and control messages to the media agent at the secondary storage computing device 106 to facilitate the backup process with the client computing device 102. The client computing device 102 can provide the data to be backed up to the selected secondary storage computing device 106 along with metadata that can be used by the media agent to facilitate creating a backup index for indexing the backed up data. The media agent 144 may provide the data and index information to a secondary storage device 108 at the information management system 100 or to an external storage system 302, such as a cloud-based or network-based storage system that is external to the information management system 100. In some embodiments, the network-based storage system is at least partially managed by a separate entity or organization than the information management system 100.

As can be ascertained from the above description of the dataflow diagram 300, the backup process is reliant on communication with the storage manager 140. Further, the media agent at the secondary storage computing device 106 is also relied upon during the backup process. For a single client computing device 102, the overhead caused by the communication with the storage manager 140 and the media agent at the secondary storage computing device 106 during the backup process may be virtually non-existent or at least undetectable by a user of the information management system 100. However, when it is desired for the information management system 100 to support thousands, tens of thousands, hundreds of thousands, or even more client computing systems, the overhead caused by communicating with the storage manager 140 and the media agent at the secondary storage computing device 106 can become a bottleneck that is readily noticeable by users and reduces the ability of the information management system 100 to support all of the desired client computing systems.

Figure 4:
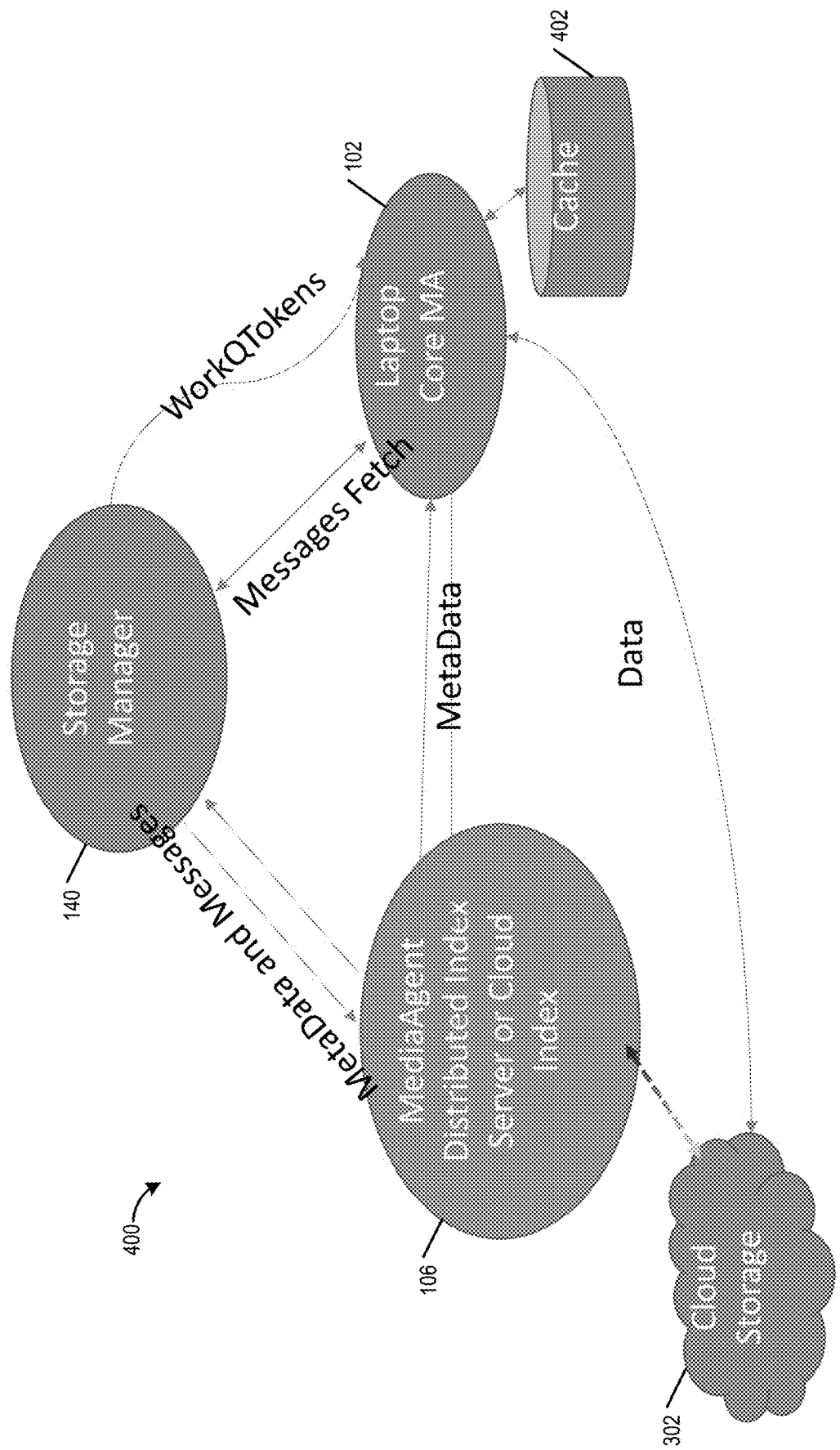
FIG. 4 presents an alternative example of a dataflow diagram illustrating the flow of data and metadata within an information management system that reduces overhead compared to the dataflow of FIG. 3 enabling an increase in scale for the information management system.

FIG. 4 presents an alternative example of a dataflow diagram 400 illustrating the flow of data and metadata within an information management system 100 that reduces overhead compared to the dataflow of FIG. 3 enabling an increase in scale for the information management system 100. As illustrated by the dataflow diagram 400, the storage manager 140 may provide control messages to a client computing device 102, such as a laptop, tablet, or desktop computing system. Further, like with the dataflow of FIG. 3, the storage manager 140 can provide metadata to the client computing device 102. However, in contrast to the flow illustrated in FIG. 3, the client computing device 102 may store the metadata in a job cache 402 for use with future jobs. The client computing device 102 may receive a job identifier (e.g., a WorkQToken) from the storage manager 140. This job identifier may be associated with the metadata at the job cache 402 and can be used to perform additional jobs without further accessing the storage manager 140. Thus, from the perspective of the storage manager, the subsequent jobs performed by the client computing device 102 may appear to be one long-running job or pseudo-job.

As with the dataflow of FIG. 3, the storage manager 140 may provide metadata and control messages to the media agent at the secondary storage computing device 106 to facilitate the backup process with the client computing device 102. However, in contrast to the dataflow of FIG. 3, the client computing device 102 may include a core media agent that provides at least partial functionality of the media agent 144 at the secondary storage computing device 106. In some such embodiments, the client computing device 102 can communicate data directly to the network storage system 302 without provided the data to the secondary storage computing device 106. The client computing device 102 may provide metadata to the secondary storage computing device 106 that can be used by the media agent to facilitate creating a backup index for indexing the backed up data. This backup index may be a distributed index that is distributed among multiple media agents. Alternatively, or in addition, the backup index may be replicated among multiple media agents. Advantageously, in certain embodiments, by reducing the frequency of communication with the storage manager 140 and by enabling the client computing device 102 to communicate the data directly to the network storage system 302 while providing only the backup metadata to the secondary storage computing device 106, the overhead of the information management system 100 may be reduced enabling the information management system 100 to support a greater number of client computing devices 102 with the same amount of computing resources.

Example Distributed Backup Management System

Figure 5A:
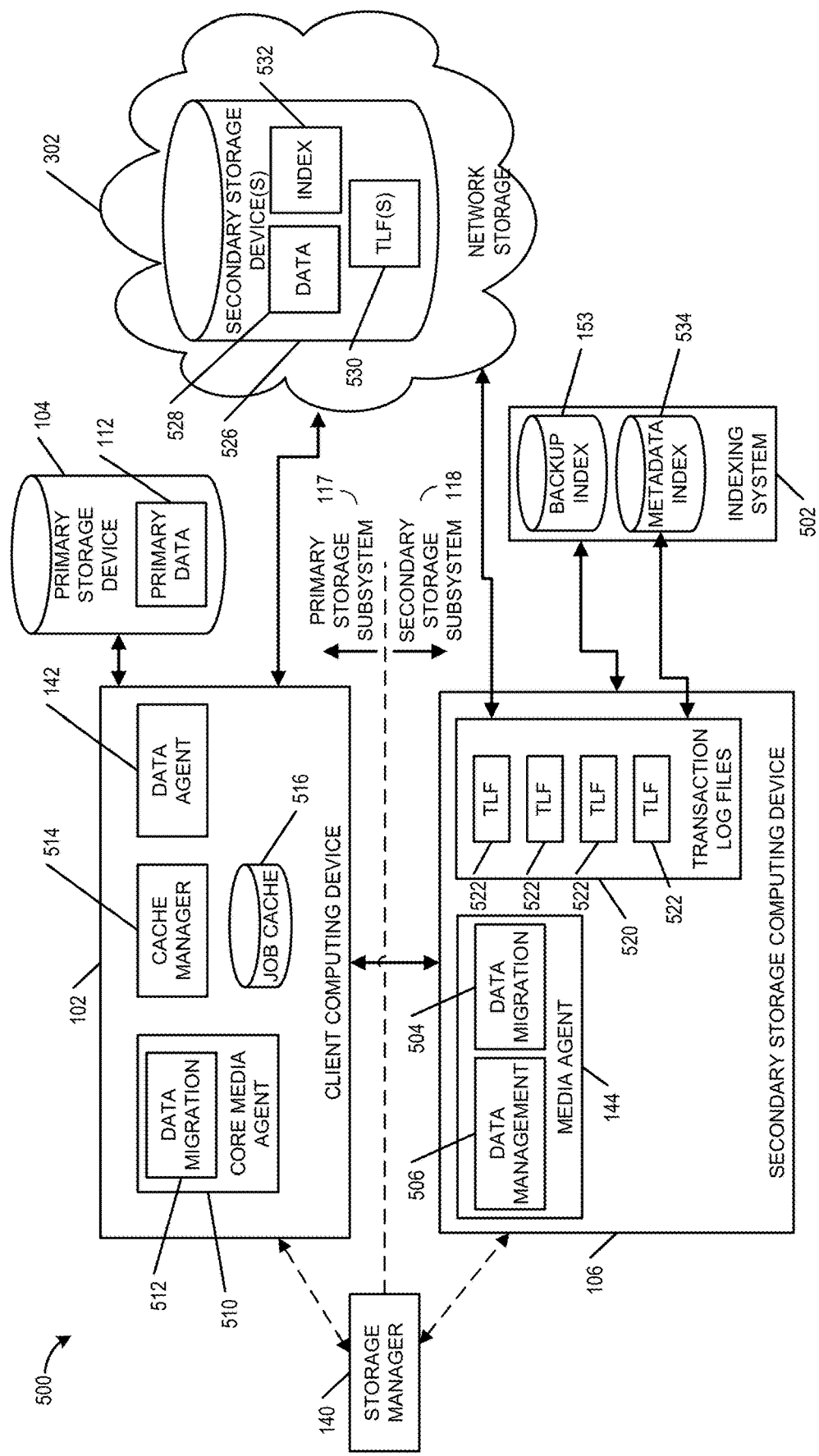
FIG. 5A is a block diagram illustrating portions of a system 500 for reducing a management burden on a storage manager enabling an increase in scale of clients supported by an information management system, according to an embodiment.

FIG. 5A is a block diagram illustrating portions of a system 500 for reducing a management burden on a storage manager enabling an increase in scale of clients supported by an information management system, according to an embodiment. In some embodiments, the system 500 can be part of an information management system 100 and may include one or more of the systems and one or more of the embodiments previously described with respect to the information management system 100. For ease of illustration and to simplify the related discussion, the system 500 illustrates a single client computing device 102 and a single secondary storage computing device 106. However, it should be understood that generally there are multiple client computing devices 102 and multiple secondary storage computing devices 106. For example, there may be 20,000, 50,000, or 250,000 client computing devices 102 included as part of the primary storage subsystem 117. Further, there may be 10s, 100s, or thousands of secondary storage computing devices 106. In addition, there may be multiple storage managers 140. For example, the information management system 100 may be divided into different domains with each domain being assigned a different storage manager 140 or subset of storage managers.

In certain embodiments, a trigger may cause a data agent 142 of the client computing device 102 to initiate a backup process for backing up data of a primary storage device 104 of the client computing device 102. The client computing device 102 using, for example, the data agent 142 may obtain a job identifier and a set of job metadata that identifies resources available to the client computing device 102 to complete the backup process. The client computing device 102 may store the job identifier and the set of job metadata at a job cache 516. By storing the job identifier and the set of job metadata at the job cache 516, the client computing device 102 may perform multiple jobs using the same job identifier and the stored set of job metadata. The client computing device 102 includes a cache manager 514 for managing the job cache 516. Further, the cache manager 514 can determine whether the job identifier, and associated job metadata, is expired. If the job identifier, or the associated job metadata, is expired, the data agent 142 can communicate with the storage manager 140 to obtain a new job identifier and to confirm the set of job metadata or to obtain updated job metadata.

In some embodiments, the client computing device 102 may include a core media agent 510. The core media agent 510 may be a reduced or slimmed-down media agent that includes some of the capabilities of the media agent 144. For example, the core media agent 510 may be a reduced media agent that is capable of migrating data or providing data for backup to a secondary store, such as at the network storage system 302, but may not have other capabilities of a media agent. For example, the core media agent 510 may not have features that enable the core media agent 510 to generate or maintain an index of the backup or to perform deduplication tasks that may be performable by a full media agent, such as the media agent 144.

In some embodiments, a media agent 144 can be divided into two subsystems, a data migration system 504 and a data management system 506. The core media agent 510 may include a data migration system 512 that can communicate with the network storage system 302, but may not include a data management system. On the other hand, the media agent 144 within the secondary storage subsystem 118 may include both a data migration system 504, which may have the same capabilities as the data migration system 512, and a data management system 506. The data management system 506 may include any system for creating a backup or media agent index 153. In some embodiments, the data management system 506 may receive information relating to the data or files provided to the network storage 302 or modified at the network storage 302. The data management system 506 can use the information to create an index that enables retrieval of the data from the network storage 302. For example, the index may identify where the data is stored at the network storage 302, when the data was modified, when the data was provided to the network storage system 302, and the like.

The data migration system 512 can communicate data to be backed up from the primary storage device 104 to the network storage system 302 without communicating the data to a secondary storage computing device 106 in the secondary storage subsystem 118. For example, the data migration system 512 may cause the client computing device 102 to establish a communication connection with the network storage system 302. Using the communication connection, the client computing device 102 may stream data for backup to the network storage system 302. Separately, the core media agent 510 may provide metadata to the data management system 506 relating to the data provided to the network storage 302. Using this metadata, the data management system 506 can create an index of the backup that can be used to restore some or all of the backed up data. In some embodiments, the data management system 506 may access the network storage system 302 to complete the backup index generation process. For example, the data management system 506 may access the network storage system 302 to determine a status or location of data provided to the network storage system 302 for backup. The network storage system 302 may store the data in one or more secondary storage devices 526 of the network store system 302, as indicated by the data block 528. In certain embodiments, the core media agent 510 may be a duplicate of the media agent 144 and may include the same features as the media agent 144.

The core media agent 510 may provide backup metadata or backup index information to the data management system 506 of the media agent 144. The media agent 144, using the indexing system 502, may generate a backup index at the media agent index 153 that includes information about the data stored at the network storage system 302.

In certain embodiments, the indexing system 502 may be included on or implemented by the secondary storage computing device 106. In certain embodiments, the backup index 153 and/or the metadata index 534 of the indexing system 502 may be stored in a storage device of the secondary storage computing device 106. Further, the media agent 144 can create a transaction log file 522, which may be one of a plurality of transaction log files 522 maintained by the secondary storage computing device 106 and stored in a transaction log file repository 520. Each transaction log file 522 may include data that is being backed up. For example, each transaction log file 522 may include a file system object with index-able metadata. In some embodiments, each transaction log file 522 may include attributes of files that have been backed up by the data migration system 504 or the data migration system 512 to the network storage system 302. The media agent 144 may periodically back up the transaction log files 522 to the network storage system 302, as indicated by the TLFs 530 stored in the secondary storage devices 526 of the network storage system 302. Further, the media agent 144 can backup the backup index 153 to the network storage system 302, as indicated by the index 532 at the secondary storage devices 526.

The backup index 153 and the transaction log files 522 may be generated periodically or at particular scheduled times. However, in certain embodiments, one or more transactions associated with backing up data to the network storage system 302 or accessing backed up data from the secondary storage system 302 may occur at times other than the times when the backup index 153 and/or the transaction log files 522 are generated. In some such cases, a transaction identifier for each performed transaction may be provided to a metadata index 534. When a trigger causes a transaction log file 522 to be generated, the media agent 144 may access the metadata index 534 to identify any transactions that may have occurred since the previous transaction log file 522 or the previous backup index 153 was generated.

Figure 5B:
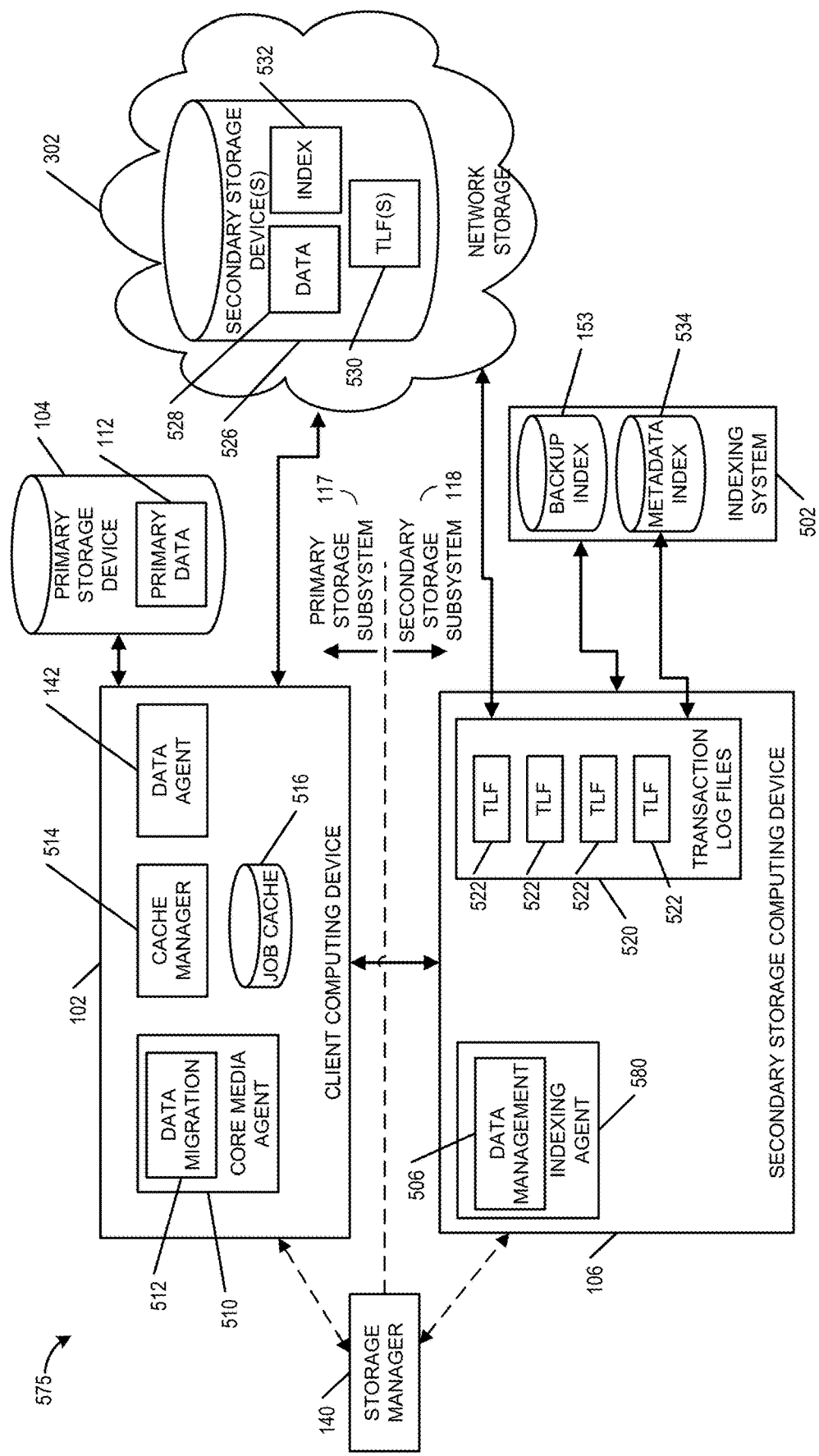
FIG. 5B is a block diagram illustrating portions of a system 575 for reducing a management burden on a storage manager enabling an increase in scale of clients supported by an information management system, according to an embodiment.

FIG. 5B is a block diagram illustrating portions of a system 575 for reducing a management burden on a storage manager enabling an increase in scale of clients supported by an information management system, according to an embodiment. In certain embodiments, the system 575 includes one or more of the embodiments described with respect to the system 500. Further, the secondary storage computing device may include an indexing agent 580. The indexing agent 580 may include any system that can perform indexing of a backup or archive. Further, the indexing agent 580 can facilitate restore of a backup from a network storage system 302. In certain embodiments, the indexing agent 580 includes a data management system 506. In certain embodiments, the combination of the core media agent 510 and the indexing agent 580 may perform the operations of a media agent 144. In other words, in certain embodiments, the media agent 144 may be divided into a core media agent 510 that can migrate data between a primary storage device 104 and a network storage 302, and an indexing agent 580 that can create, maintain, and/or update an index for a backup or archive of the primary storage device 104. Advantageously, in certain embodiments, by dividing the media agent 144, and the operations performed by the media agent 144, across the client computing device and the secondary storage computing device, the amount of time spent by the client computing device 102 during a backup process can be reduced. Further, the resource burden, such as bandwidth and the number of communication connections between the client computing device 102 and the secondary storage subsystem 118 and/or the network storage 302 may be reduced.

Additional processes and details of the operations of the systems illustrated in FIGS. 5A and 5B are described below with respect to FIGS. 6 through 10 and 12 though 14.

Example Client Managed Job Process

Figure 6:
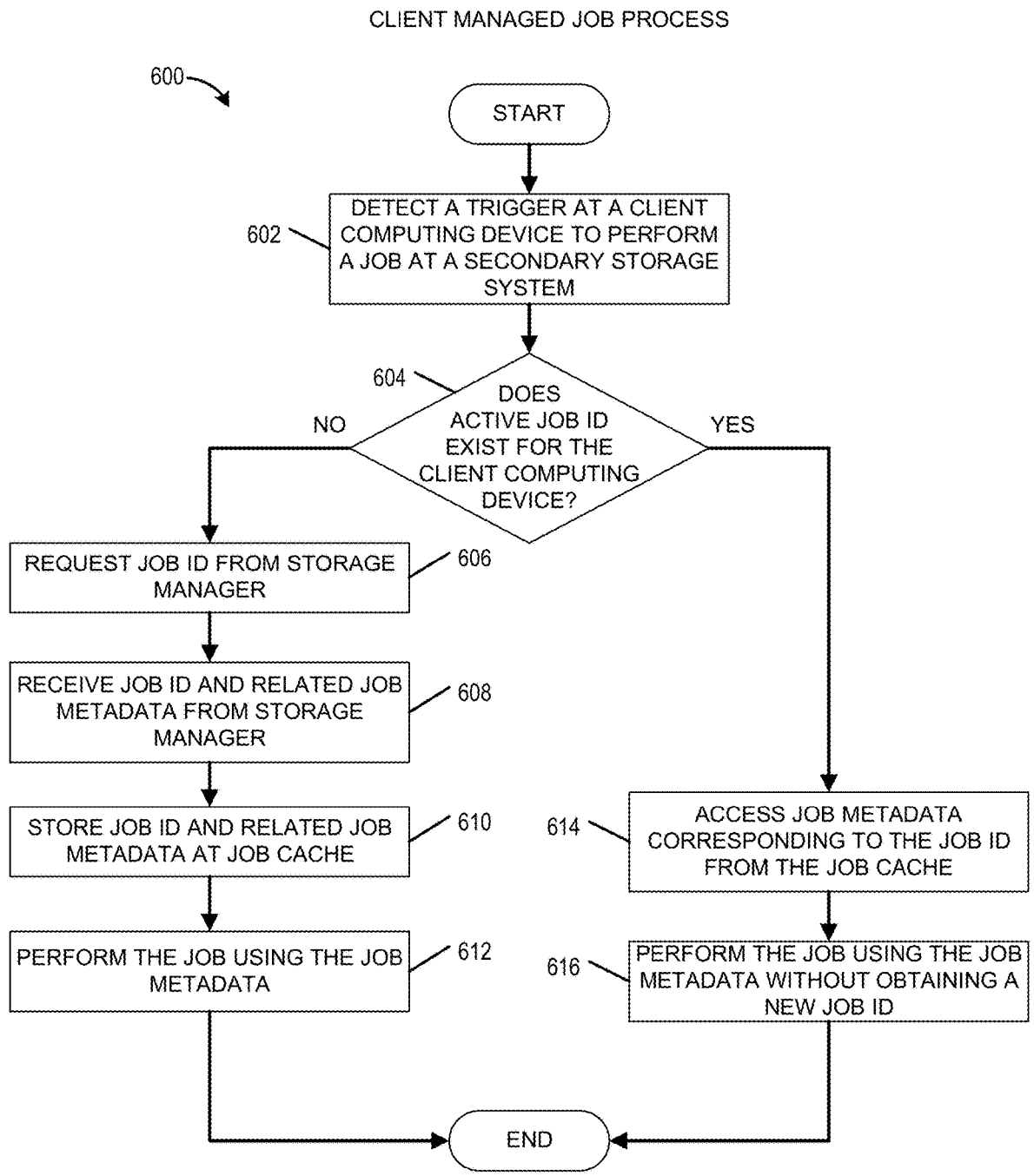
FIG. 6 depicts operations of a client managed job process 600 according to an embodiment.

FIG. 6 depicts operations of a client managed job process 600 according to an embodiment. The process 600 can be implemented by any system that can self-manage or manage a job, such as a backup of a primary storage device 104, at a secondary storage system 118 without communicating with or with minimal communication to the storage manager 140. The process 600, in whole or in part, can be implemented by, for example, a data agent 142, a cache manager 514, or a job cache repository 516, among others. Although any number of systems, in whole or in part, can implement the process 600, to simplify discussion, the process 600 will be described with respect to particular systems.

The process 600 begins at block 602 where, for example, the data agent 142 detects a trigger at the client computing device 102 to perform a job at a secondary storage system. The secondary storage system may be or may include the secondary storage subsystem 118 or a network storage system (sometimes referred to as a "cloud" or "cloud storage system"), such as the network storage system 302. The job may include any type of job or task that relates to the access or management of data at a secondary storage system 118. Typically, the job is a backup of data from a primary storage device 104 to a secondary storage, such as a secondary storage device 108 or a network storage system 302. However, in certain embodiments, the job may include a restore operation to restore data from a secondary storage system 118 or a network storage system 302 to a primary storage system 117. Further, the job may include an archiving operation, a de-duplication operation, or any other type of data management operation with respect to a secondary storage system 118 or a network storage system 302. To simplify discussion, and not to limit the present disclosure, the job will primarily be described as a backup job unless specified otherwise. It should also be understood that the backup job may include different types of backup operations. For example, the backup operation may be a complete backup, a backup of a subset of files in a primary storage device 104, a differential backup, or any other type of backup process that may be performed with respect to the primary storage device 104. In some embodiments, the backup operation may include or may be an archiving operation.

The trigger may include a command received from a user, an administrator user, another computing device, an occurrence of a defined sequence of events (for example, a creation of a particular number of files or a modification in hardware configuration of the client computing device 102), or the passage of time. In some cases, the job may be scheduled to be performed at particular periods of time or at a particular time intervals. For example, the job may be scheduled to be performed every weekday, every evening, every week, or once a month. Further, in certain embodiments, the trigger may include a detection of a threshold percentage or amount of change in data or files at the primary storage device 104.

The client computing device 102 may generally include any type of client computing device. For example, the client computing device may be a laptop, a tablet, a desktop computing system, a smart phone, a computing kiosk, a smart appliance, or any other type of computing system. Typically, the client computing device is one of a large number of computing devices at an entity or organization. For example, the client computing device may be one of 100 or 200,000 computing devices. Although generally the computing device is a client computing device, in some embodiments, the computing device may be a server computing device.

At decision block 604, the data agent 142 determines whether an active job identifier exists for the client computing device 102. Determining whether an active job identifier exists may include determining whether the job identifier available to the client computing device 102 has expired. The job identifier may be provided by a storage manager 140 for a single job. However, in embodiments of the present disclosure, the client computing device 102 may use the job identifier for multiple jobs. Advantageously, in certain embodiments, by reusing the job identifier for multiple jobs, communication with the storage manager 140 may be reduced, thereby reducing the burden on the storage manager 140 and enabling the storage manager 140 to manage a greater number of computing systems. In certain embodiments, when the client computing device 102 performs multiple jobs using the same job identifier, the storage manager 140 may process the multiple jobs as a single job associated with the same job identifier.

If it is determined at the decision block 604 that an active job identifier does not exist for the client computing device 102, the data agent 142 requests a job identifier from the storage manager 140 at block 606. The block 606 may include providing information about the client computing device 102, such as the size of the primary storage device 104, the amount of data on the primary storage device 104, a speed or capability of a network card included in the client computing device 102, or any other information that may affect the performance of the job by the client computing device 102. In some embodiments, the block 606 may include providing information about the job to be performed to the storage manager 140. For example, the block 606 may include identifying to the storage manager 140 that the job is a backup job or restore job. Further, the block 606 may include informing the storage manager 140 of the amount of data to be backed up or restored.

At block 608, the data agent 142 receives a job identifier and related job metadata from the storage manager 140. The job metadata may include a designation of computing resources allotted to or available to the client computing device 102 to perform the job. For example, the job metadata may identify a number of communication streams designated for the client computing device 102 to communicate with the secondary storage system 118 or the network storage system 302. As another example, the job metadata may include an identity of a particular secondary storage computing device 106 or a particular media agent 144 for the client computing device 102 to communicate with to perform the job. In addition, the job metadata may identify filters to be used by the client computing device 102 and selecting data or files at the primary storage device 104 to backup. In some cases, the job metadata may also identify a type of scan to perform to identify data to back up. For example, the type of scan may be a recursive scanning algorithm or an iterative scanning algorithm. In some embodiments, the job metadata may include a job identifier, an archive identifier, a chunk identifier, a job token, and the like. In some embodiments, a job identifier may be related to an archive identifier and/or a chunk identifier. These identifiers may be used to identify data to prune or restore from a backup.

In some systems, a client device may incur many jobs (e.g., hundreds, thousands, or more), which may result in many archive identifiers and correspondingly fragmented chunks associated with the jobs. The many chunks, archive identifiers, and other tracking and management data can significantly increase an amount of resources required for data management and generally system book-keeping. Further, the many chunks, archive identifiers, and other tracking and management data can add complexity to restore and pruning operations.

On the other hand, by having a relatively large archive, it is easier to manage jobs and overall efficiency for restoring and pruning operations can be increased while computing resources for book-keeping or other tracking and management operations can be reduced. Thus, reusing a job identifier and/or archive identifier for multiple jobs can reduce computing resources used for management tasks. The job identifier and/or archive identifier can be reused for multiple jobs for a particular time period and/or until a backup or archive reaches a particular size. The particular size and/or time period may be configurable. Once the time period or size is reached, the job identifier or archive identifier may be rotated. In certain embodiments, the identifiers may be rotated if there is an error at the information manager relating to archive or chunk management relating to a particular job.

At block 610, the cache manager 514 stores the job identifier and the related job metadata that the job cache 516. In certain embodiments, the client computing device 102 may be configured with particular default job metadata. For example, the client computing device 102 may by default perform recursive scanning. In some such embodiments, the job metadata received from the storage manager may be complementary to the default job metadata and/or may replace some of the default job metadata. Storing the related job metadata at the job cache 516 may include associating the related job metadata with the job identifier at the job cache 516.

At block 612, the data agent 142 performs the job using the job metadata. Further, the data agent 142 may associate the job with the job identifier. Performing the job using the job metadata may include performing or initiating a backup process using the computing and/or communication resources available to the client computing device 102 as identified by the job metadata.

If it is determined at the decision block 604 that an active job identifier does exist for the client computing device 102, the data agent 142, using the cache manager 514, accesses job metadata corresponding to the job identifier from the job cache 516. Using the job metadata accessed from the job cache 516, the data agent 142 may determine resources available to complete the job. By using the stored job metadata to perform multiple jobs and by associating the multiple jobs with the same job identifier, communication with the storage manager 140 is reduced enabling the storage manager 140 to support more devices.

At block 616, the data agent 142 performs the job using the job metadata without obtaining a new job identifier. Further, the data agent 142 may associate the job with the job identifier, which may previously have been associated with previously performed jobs. In some embodiments, the data agent 142 may assign another identifier to the job that is associated with the job identifier. For example, the data agent 142 may assign a sub-identifier or a set of nested identifiers to each job that is associated with the job identifier previously provided by the storage manager 140. By assigning a sub-identifier or other identifier that is associated with the job identifier to the job, the client computing device 102 can uniquely identify each particular job associated with the single job identifier provided by the storage manager 140.

Example Job Metadata Update Process

Figure 7:
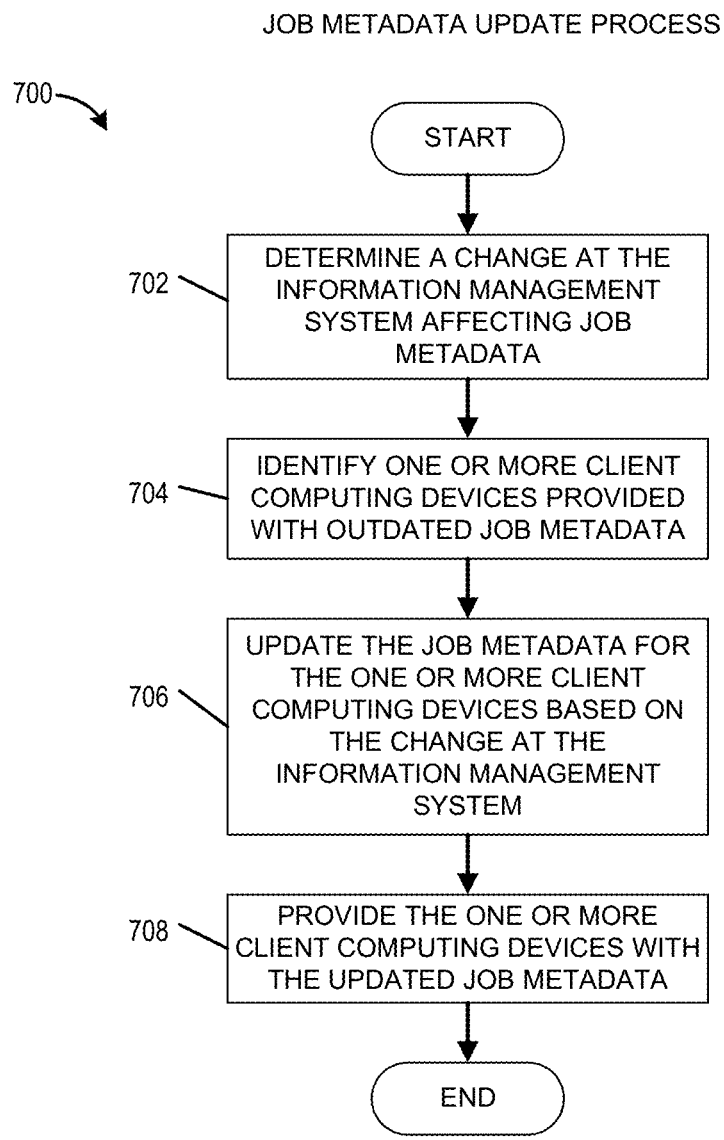
FIG. 7 depicts operations of a job metadata update process 700 according to an embodiment.

FIG. 7 depicts operations of a job metadata update process 700 according to an embodiment. The process 700 can be implemented by any system that can update job metadata at one or more client computing devices. The process 700, in whole or in part, can be implemented by, for example, a storage manager 140, a jobs agent 156, or a management agent 154, among others. Although any number of systems, in whole or in part, can implement the process 700, to simplify discussion, the process 700 will be described with respect to particular systems.

The process 700 begins at block 702 where, for example, the storage manager 140 determines a change at the information management system 100 affecting job metadata. The change at the information management system 100 may include any type of change that modifies the resources available to one or more computing devices within the primary storage system 117. In some embodiments, the change in resources available may be a change to resources available within the primary storage system 117, a change in resources available in the secondary storage system 118, or change in's resources available at the network storage system 302. Some non-limiting examples of changes at the information management system that can affect the job metadata may include the addition of or the loss of access to a media agent 144 or a secondary storage computing device 106, a change in the availability of one or more secondary storage devices 108, a change in the amount of storage available at the secondary storage system 118 or at the network storage system 302, a change in the number of communication streams or the bandwidth of the communication streams available at the information management system 100, a change in the availability of network resources, a change in the priority level or access control level of one or more systems of the information management system 100, a change in the number of client computing devices 102 requesting access to resources at the information management system 100, or any other change that may affect the availability of resources that may be available to perform a job.

At block 704, the storage manager 140 identifies one or more client computing devices 102 provided with outdated or expired job metadata. In some embodiments, the block 704 may include identifying all client computing devices 102 within the information management system 100 that have been provided with job metadata. In other embodiments, the block 704 may include identifying a subset of client computing devices 102 that may be designated or selected to receive an modified amount of computing resources as determined by an administrator or an allocation algorithm performed by the storage manager 140. In some embodiments, the block 704 may include identifying a subset of client computing devices 102 that are associated with an unexpired job identifier.

At block 706, the storage manager 140 updates the job metadata for the one or more client computing devices 102 based on the change at the information management system 100. In some embodiments, updating the job metadata for the one or more client computing devices 102 may include modifying the job metadata previously provided to the one or more client computing devices 102 based on the change in the information management system 100. In some embodiments, different client computing devices 102 may be updated with different job metadata. In some embodiments some of the client computing devices 102 may be updated with different job metadata and other client computing devices 102 may not be updated or may not be assigned updated job metadata. In some embodiments, the storage manager 140 may determine job metadata to provide, or computing resources to assign, to one or more client computing devices 102 based on the current state or configuration of the information management system 100. In some such cases, the storage manager 140 may determine the computing resources were job metadata to provide to the one or more client computing devices 102 without accessing or considering prior job metadata provided to the one or more client computing devices 102.

At block 708, the storage manager 140 provides the one or more client computing devices 102 with the updated job metadata. Providing a client computing device 102 with the updated job metadata may include providing a new job identifier to the client computing device 102 associated with the updated job metadata. Alternatively, providing the client computing device 102 with the updated job metadata may include identifying to the client computing device 102 an associated job identifier previously provided to the client computing device 102 enabling the client computing device 102 to modify the job metadata associated with the previously provided job identifier.

In certain embodiments, the updated job metadata is pushed to the client computing device 102. In other words, in certain embodiments, the storage manager 140 may provide the updated job metadata to the client computing device 102 without the client computing device 102 requesting the updated job metadata. Upon receiving the updated job metadata, the cache manager 514 of the client computing device 102 may update the job cache 516 to store the updated job metadata. Updating the job cache 516 to store the updated job metadata may include associating the updated to metadata with a new job identifier at the job cache 516 or with a previously provided job identifier at the job cache 516.

Example Backup Process

Figure 8:
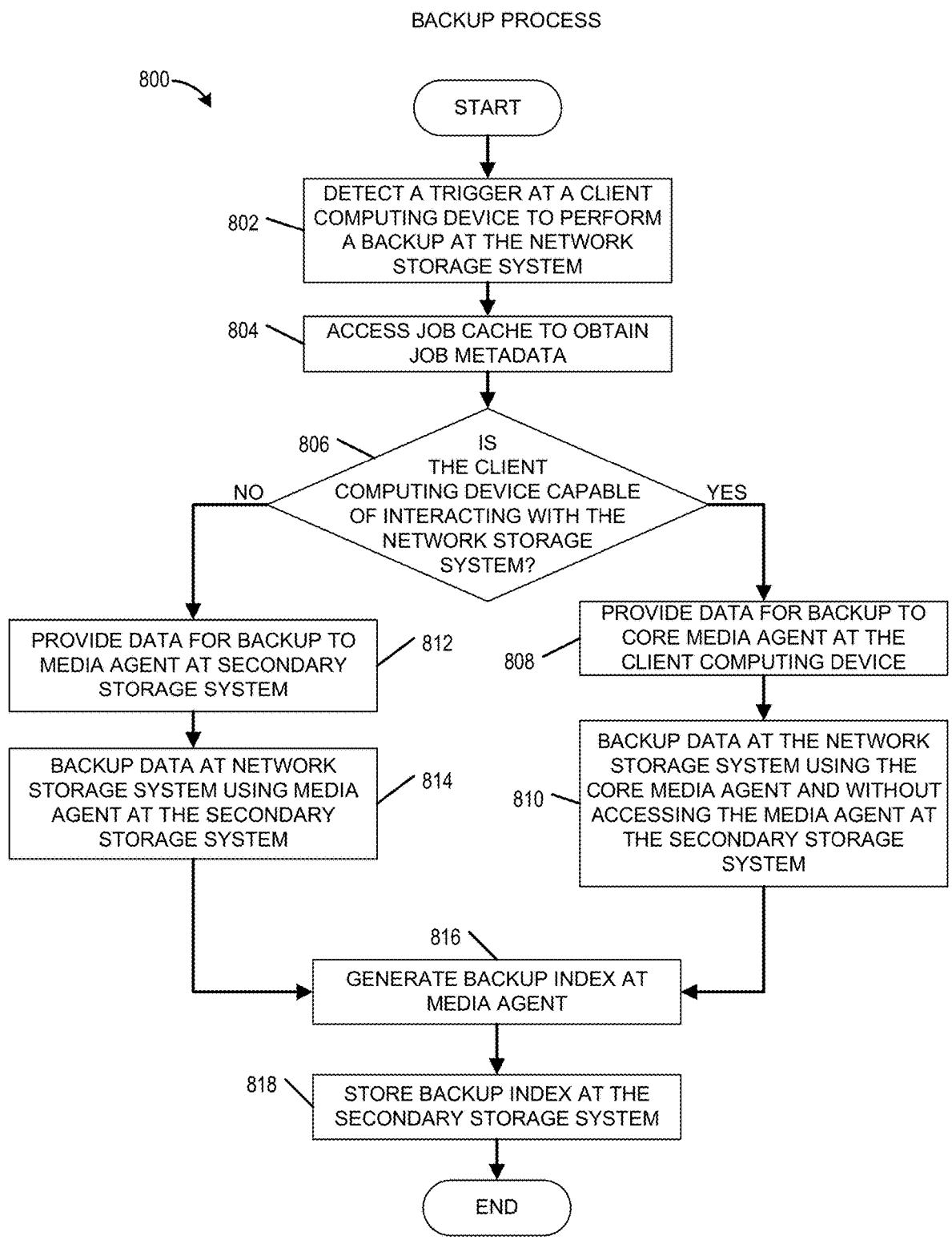
FIG. 8 depicts operations of a backup process 800 according to an embodiment.

FIG. 8 depicts operations of a backup process 800 according to an embodiment. The process 800 can be implemented by any system that can perform a backup process for backing up a primary storage device 104 to a secondary storage or a network storage system. The process 800, in whole or in part, can be implemented by, for example, a client computing device 102, a data agent 142, a core media agent 510, a data migration system 512, a media agent 144, a data migration system 504, or a data management system 506, among others. Although any number of systems, in whole or in part, can implement the process 800, to simplify discussion, the process 800 will be described with respect to particular systems. Further, although the process 800 is primarily described with respect to backing up a primary storage device 142 network store system 302, in some embodiments, the process 800 or a modified version of the process 800 may be used to perform a restore process for restoring data from a network storage system 302 to a primary storage device 104 of the client computing device 102.

The process 800 begins at block 802 where, for example, the data agent 142 detecting a trigger at a client computing device 102 to perform a backup of a primary storage device 104 at a network storage system 302. The trigger may include a command received from a user, an administrator user, another computing device, an occurrence of a defined sequence of events (for example, a creation of a particular number of files or a modification in hardware configuration of the client computing device 102), or the passage of time. In some cases, the backup job may be scheduled to be performed at particular periods of time or at particular time intervals. For example, the job may be scheduled to be performed every weekday, every evening, every week, or once a month. Further, in certain embodiments, the trigger may include a detection of a threshold percentage or amount of change in data or files at the primary storage device 104.

At block 804, the cache manager 514 accesses the job cache 516 to obtain job metadata. Accessing the job cash 516 may include identifying particular job metadata associated with a currently pending, active, or non-expired job identifier. In some embodiments, the job identifier may be used as an index into the job cache 516 to identify current or non-expired job metadata associated with the job identifier.

At decision block 806, the data agent 142 determines whether the client computing device 102 is capable of interacting with the network storage system 302. In certain embodiments, determining whether the client computing device 102 is capable of interacting with the network storage system 302 is based at least in part on the job metadata obtained at the block 804. In other embodiments, determining whether the client computing device 102 is capable of interacting with the network storage system 302 is performed without consideration of job metadata stored at the job cache 516. In some such embodiments, the block 804 may be optional or omitted.

In some embodiments, the decision block 806 may include determining whether the client computing device 102 is authorized to access the network storage system 302. Determining whether the client computing device 102 is authorized to access the network store system 302 may include determining whether the client computing device 102 has an account with the network storage system 302 or has authorization information, such as a username and/or password for accessing the network storage system 302. In some embodiments, the decision block 806 may include attempting to communicate with the network storage system 302 to confirm whether the client computing device 102 is capable of interacting with the network storage system 302. Attempting to communicate with the network storage system 302 may include sending a test communication packet to the network storage system 302, attempting to authenticate with the network store system 302, or performing any other operation that may confirm whether the client computing device 102 is capable of interacting with the network storage system 302. In some embodiments, the decision block 806 may include requesting access to the network storage system 302 from one or more of the storage manager 140, the network storage system 302, or a secondary storage computing device 106.

If it is determined at the decision block 806 that the client computing device 102 is capable of interacting with the network storage system 302, the data agent 142 provides data to the core media agent 510 at the client computing device 102 at block 808. The data provided to the core media agent 510 includes data from the primary storage device 104 to be backed up. This data may include one or more files, directories, metadata, or other types of data to be backed up. Providing the data to the core media agent 510 may include providing the core media agent 510 with access to the data at the primary storage device 104. In certain embodiments, providing the data to the core media agent 510 may include copying the data from the primary storage device 104 to a memory location at the client computing device 102 that is accessible to the core media agent 510. This memory location may, for example, be volatile memory or non-volatile memory that is assigned to the core media agent 510 or to one or more process threads of the core media agent 510.

At block 810, the core media agent 510 backs up the data at the network storage system 302 without accessing the media agent 144 at the secondary storage system 118. Backing up the data at the network store system 302 may include communicating the data to the network storage system 302 directly or via a network, such as, but not limited to, the Internet. Advantageously, in certain embodiments, by providing the data for backup to the core media agent 510 and by backing up the data at the network store system 302 without communicating the data to the secondary storage system 118 or to the media agent 144, the amount of processing performed by the media agent 144 during a backup process is reduced. By reducing the processing or overhead of the media agent 144, the media agent 144 and/or the secondary storage computing device 106 may support a larger number of client computing devices 102 enabling the information management system 100 to be scaled to support more client computing devices 102. Further, in certain embodiments, by reducing the overhead on the media agent 144 during the backup process, information management system 100 can support an increased rate of occurrence of the backup process. In other words, in certain embodiments, the client computing device 102 may be backed up more frequently due to the reduced burden on the secondary storage system 118 by performance of the process 800 and the communication of data for backup directly to the network storage system 302 instead of the of the secondary storage system 118.

If it is determined at the decision block 806 that the client computing device 102 is not capable of interacting with the network storage system 302, the data agent 142 provides data for backup to the media agent 144 at the secondary storage computing device 106 of the secondary storage system 118 at block 812. Providing the data for backup to the media agent 144 may include streaming data from the primary storage device 104 to the media agent 144 or to the secondary storage computing device 106.

At block 814, the data agent 142 backs up the data at the network storage system 302 using the media agent 144 at the secondary storage system 118. Backing up the data to the network storage system 302 may include streaming the data from the secondary storage computing device 106 to the network storage system 302. In some embodiments, the block 814 is performed by the media agent 144. In some embodiments, the blocks 810 and 814 may include backing up the data to a secondary storage device 108 instead of or in addition to backing up the data to the network storage system 302. In such embodiments, the block 810 may include backing up the data to the secondary storage device 108 without accessing the media agent 144 or the secondary storage computing device 106.

At block 816, the media agent 144 generates a backup index at the secondary storage system 118. In certain embodiments, regardless of whether the backup is performed by the media agent 144 or the core media agent 510, the backup index may be generated by the media agent 144 at the secondary storage system 118. As previously described, the backup index may be a media agent index 153 and may include a data structure that includes information about the stored data. In some embodiments, as previously described, the media agent index 153 may store information about stored data associated with a particular media agent 144. However, in other embodiments, the media agent index 153 may not be associated with a particular media agent 144 and may be distributed among a set of media agents 144. Moreover, as the data may be backed up to the network storage system 302 instead of the secondary storage system 118, the media agent index 153 generated by the media agent 144 may be associated with one or more particular backups of data at the network storage system 302. The media agent index 153 generated by the media agent 144 may facilitate searching and accessing data backed up to the network storage system 302. In certain embodiments, generating the backup index may include performing one or more operations of the process 900 described with respect to FIG. 9.

At block 818, the media agent 144 stores the backup index at the secondary storage system 118. In certain embodiments, the block 818 may include backing up the backup index, or the media agent index 153, to the network storage system 302. Further, in certain embodiments, the block 818 may include distributing the backup index among a plurality of media agents 144.

Example Indexing Process

Figure 9:
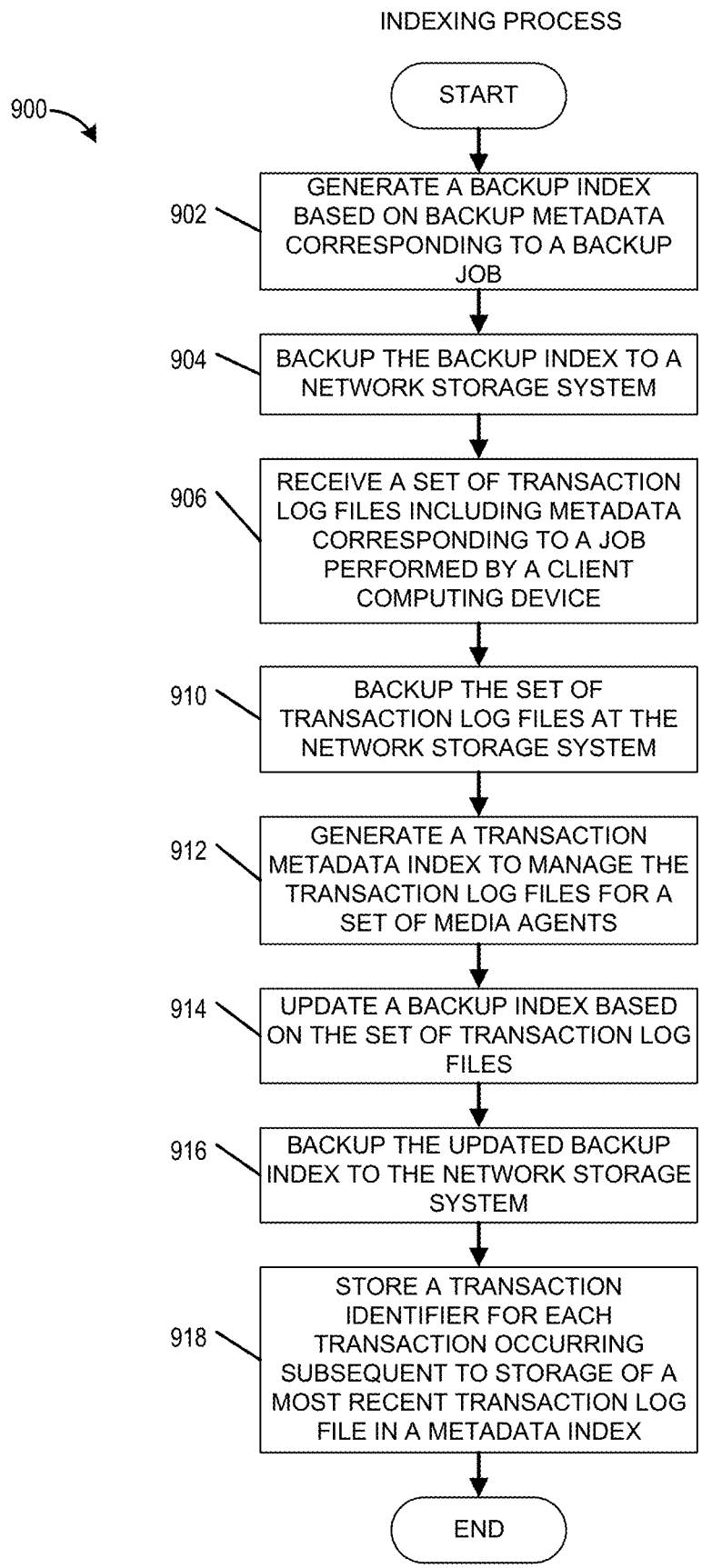
FIG. 9 depicts operations of an indexing process 900 according to an embodiment.

FIG. 9 depicts operations of an indexing process 900 according to an embodiment. The process 900 can be implemented by any system that can perform an indexing process for creating a backup index to facilitate access to data stored or backed up to a secondary storage system 118 or a network storage system 302. The process 900, in whole or in part, can be implemented by, for example, a media agent 144, a data management system 506, a secondary storage computing device 106, a storage manager 140, or an indexing system 502, among others. Although any number of systems, in whole or in part, can implement the process 900, to simplify discussion, the process 900 will be described with respect to particular systems.

The process 900 begins at block 902 where, for example, the media agent 144, using the data management system 506, generates a backup index based at least in part on the backup metadata corresponding to a backup job. This backup metadata may be received from the client computing device 102, the core media agent 510, or the data agent 142. In some embodiments, the block 902 may include storing the backup index at the indexing system 502. The backup job may be a full backup of the primary storage device 104. Further, in certain embodiments the backup job may be an initial backup of the primary storage device 104. In other embodiments, the backup job may be any type of backup or archive the primary storage device 104 and may or may not be an initial backup of the primary storage device 104 to stop At block 904, the media agent 144 backs up the backup index to a network storage system 302. Backing up the backup index to the network storage system 302 may include associating the backup index with the backup job. This backup job may be a backup job performed by the media agent 144 or a backup job performed by the core media agent 510. In other words, in certain embodiments, the backup index generated by the media agent 144 may be associated with a backup job is performed by system other than the media agent 144, such as the core media agent 510. In some such embodiments, despite not receiving the data for backup, the media agent 144 may generate the backup index based on backup metadata received from the core media agent 510, the data agent 142, or the client computing device 102.

At block 906, the media agent 144 receives a set of transaction log files including metadata corresponding to a job performed by a client. This job may be a separate or subsequent job to the job that generated the metadata used to create the backup index at the block 902. Further, the metadata received at the block 906 may be received over time or over a set of time intervals. For example, a first set of metadata may be received at or during a first time period while a second set of metadata may be received at or during a second time period that is later than the first time period. The second set of metadata may come in some cases, be received after a period of inactivity following receipt of the first set of metadata. In certain embodiments, the metadata received at the block 906 may be received at the same time as or substantially in parallel to the corresponding job being performed by the client computing device 102 or the media agent 144.

At block 910, the media agent 144 backs up the set of transaction log files at the network storage system 302. Backing up the set of transaction log files may include storing the data and, in some cases, the metadata at the network storage system 302 without updating or generating a backup index associated with the data of the transaction log files. In some embodiments, the set of transaction log files may be backed up to the network storage system 302 as they are received or created during the set of time intervals. In other embodiments, the set of transaction log files may be aggregated and backed up to the network storage system 302 together during a particular period in time. In some embodiments, the block 910 may include distributing the set of transaction log files 522 across a plurality of media agents 144 or a plurality of secondary storage computing devices 106. The set of transaction log files 522 may be backed up periodically. For example, the set of transaction log files 522 may be backed up once a day, every two hours, or each workday. In certain embodiments, the transaction log files 522 are backed up more frequently than the backup index. Thus, for example, while the backup index may be backed up to the network storage system 302 once a day or once a week, the transaction log files 522 may be backed up each hour or a few times a day.

Generally, storing the attributes of files or data and/or the transaction log file 522 is faster than generating a backup index. Thus, in certain embodiments, attributes of files or data obtained from the metadata received at the block 906 may be stored in a transaction log file 522 during a time period while a job is occurring. At some period of time subsequent to the backup job completing, a backup index can be generated based on the set of transaction log files. Advantageously, in certain embodiments, by first storing file data attributes in a transaction log file 522 and later generating the backup index, the amount of time required to complete the backup process, or the man of time that the client computing device 102 is involved in the backup process, may be reduced.

A backup index may be implemented as a database. Storing and/or maintaining the backup index separately from the TLF(s) can have several benefits. One advantage is that it is possible to transition the backup index to a new or different storage technology with or without any changes to the TLFs or backed up data. For example, a common or middle layer may be implemented between the backup index and the TLFs. The middle layer could translate the TLFs to the new database schema associated with the new backup index technology or vice versa. Further, in certain embodiments, by separating the TLFs from the backup indexing, it is possible to store the TLFs and to generate or update the backup index at a later time, such as when more computing resources are available. Thus, in certain embodiments, scheduled backup indexes can be satisfied even when a system is busy because, for example, the amount of computing resources required to complete the backup can be reduced by separating when the storage of the TLFs and the generation of the backup index occurs. Further, the TLFs can be used to regenerate a backup index if there is loss of a previously generated backup index.

Moreover, in certain cloud backup or network storage embodiments, a distributed backup process comprising backing up the TLFs in network storage at a first time period and later playing back the TLF at a second time period to generate the backup index can have significant scale and performance improvements. For example, a large number of TLFs can be stored at a first time period using a set of available network computing resources. At a second time period when a greater amount of computing resources are available or when the cost of using the computing resources is lower, the backup index can be created reducing a burden on available computing resources and/or reducing cost.

In certain embodiments, one transaction log file 522 may be generated for each job performed by the client computing device 102. In other embodiments, multiple transaction log files 522 may be generated per job performed by the client computing device 102. The transaction log files 522 may include attributes of files or data that are included as part of the backup process.

At block 912, the media agent 144 generates a transaction metadata index at the indexing system 502 to manage the transaction log files 522 for a set of media agents. The transaction metadata index may be distributed among a plurality of media agents 144. Advantageously, in certain embodiments, by distributing or replicating the indexing system 502 among a plurality of media agents 144 and/or secondary storage computing devices 106, access to the backup index 153 and the transaction log files 522 may be maintained when some of the media agents 144 or secondary storage computing devices 106 suffer or experience a failure.

At block 914, the media agent 144 updates a backup index 153 based at least in part on the set of transaction log files 522. In certain embodiments, updating the backup index 153 may include generating a new backup index based at least in part on the set of transaction log files 522. In some cases, the new backup index may be generated based on the previous backup index 153 generated at the block 902. A TLF 522 may include the backed up data and index-able metadata. Updating the backup index can include executing or performing one or more commands or actions based on the data stored in the transaction log files to bring the backup index and indexing information in the backup index repository up-to-date based on the data that has been backed up.

At block 916, the media agent 144 backs up the updated backup index to the network storage system 302. Backing up the updated backup index to the network storage system 302 may include modifying the backup index previously stored to the network store system 302. Alternatively, or in addition, backing up the updated backup index may include storing a new copy of a backup index corresponding to the updated backup index to the network storage system 302.

At block 918, the media agent 144 stores a transaction identifier, or a transaction number, for each transaction occurring subsequent to storage of the most recent transaction log file 522 in a metadata index 534. Storing the transaction log file 522 in the metadata index 534 may include storing metadata of the transaction log file 522, or of data stored in the transaction log file 522, in the metadata index 534. In some embodiments, the transaction identifiers for each transaction occurring subsequent to storage of the most recent transaction log file may be stored at the network storage system 302. Further, in some embodiments, upon a particular number of transaction identifiers being stored or upon a particular point in time being reached, a new transaction log file may be generated based on the transaction identifiers. In some such cases the transaction identifiers may be discarded upon creation of the new transaction log file. Further, additional transaction identifiers associated with transactions occurring subsequent to the new transaction log file 522 may be collected and stored at the metadata index 534.

In certain embodiments, the transaction number may be a serial number associated with a client device that is backed up. Each client device may be associated with a different transaction number. A transaction log file that is generated during a backup process may be named after the transaction number. In certain embodiments, each transaction that is generated during the backup process may be recorded in an index, such as the backup index 153, the metadata index 534, or the index 532. When a transaction is consumed or recorded into the index, an attribute, flag, or other marker may be recorded representing that transaction in the index. This attribute may indicate that the transaction is consumed or recorded. Periodically, it can be checked whether all received transactions have been consumed or not by checking the flag in the index. If it is determined that any unconsumed transactions exist, the transaction can be retried, and the index can be updated to indicate that the transaction metadata has been recorded in the index.

The process 900, or portions thereof may be repeated intermittently, on a continuous basis, or each time a backup job is performed. For example, the operations associated with the blocks 906-910 may be repeated for a particular number of jobs. In some embodiments, after a particular number of jobs, the process 900 may return to the block 902 to create a new backup index. Thus, in one non-limiting example, a backup index may be created at time 0. At times 10, 20, 30, and 40, a set of transaction log files may be created. At times occurring between the creation of the backup index and/or each transaction log file, transaction identifiers for each transaction occurring in the time intervals may be stored. For example, transaction identifiers for transactions occurring between times 10 and 20 may be stored at the metadata index 534. Metadata associated with these transactions may then be integrated or included as part of the transaction log file created at time 20. At time 50, a new backup index may be created, or the backup index generated at time 0 may be updated based on the transaction log files created at times 10, 20, 30, and 40. The backup index may also be updated based on transactions occurring between time 40 and 50. At time 60, a number transaction log file may be generated.

As will be understood from the previous description, the process 900 may be a form of tiered indexing process that creates different types or granularities of indexes. In certain embodiments, at least some of the operations associated with the process 900 may be performed in a different order or at least partially in parallel. For example, in some embodiments, a backup index may be created prior to the formation of transaction log files. In some other embodiments, transaction log files may be created first, and a backup index may be created later, with or without using the transaction log files.

Example Media Agent Restoration Process

Figure 10:
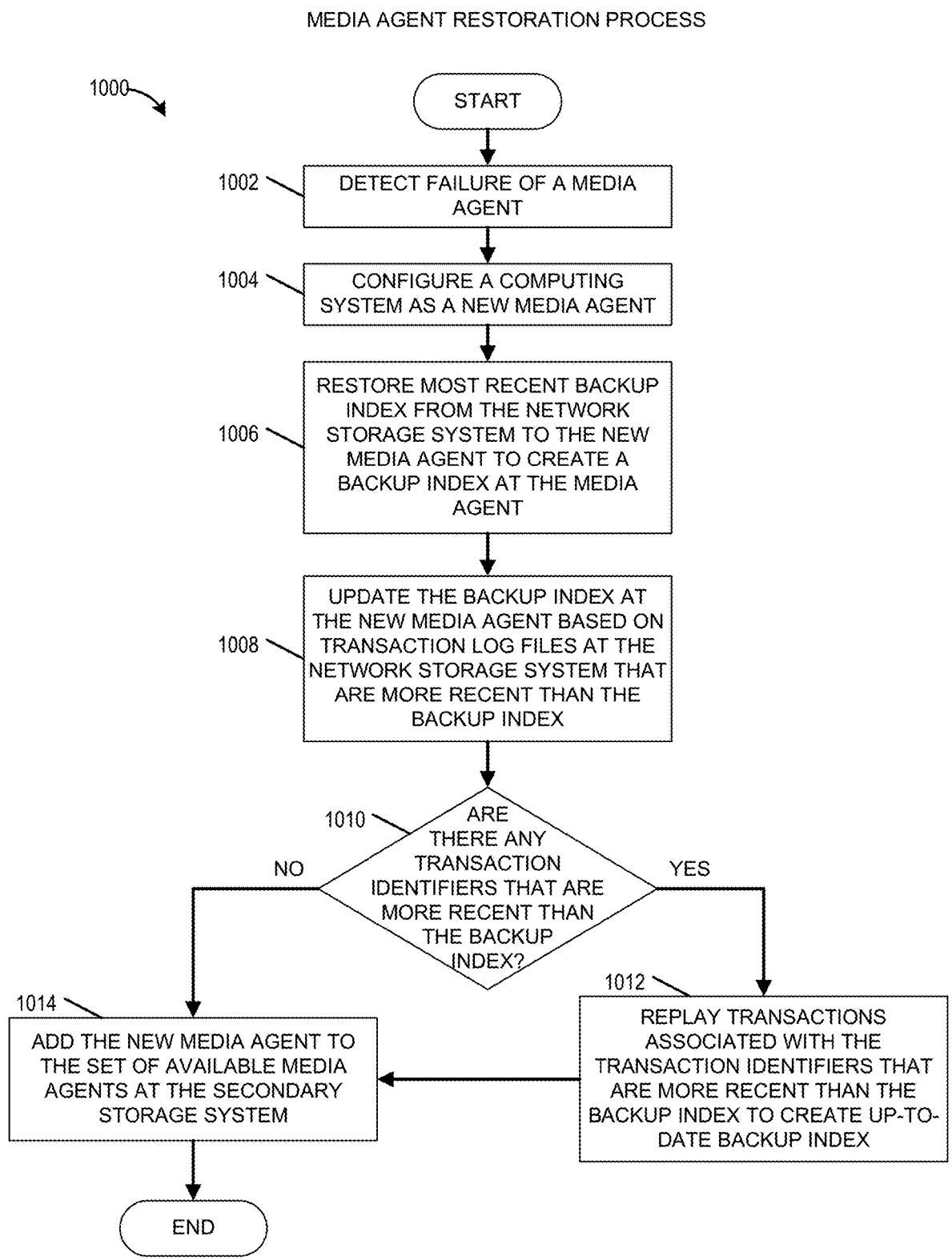
FIG. 10 depicts operations of a media agent restoration process 1000 according to an embodiment.

FIG. 10 depicts operations of a media agent restoration process 1000 according to an embodiment. The process 1000 can be implemented by any system that can add a new media agent to a secondary storage system 118 or replace a media agent at the secondary storage system 118. The process 1000, in whole or in part, can be implemented by, for example, a storage manager 140 or a secondary storage computing device 106, among others. Although any number of systems, in whole or in part, can implement the process 1000, to simplify discussion, the process 1000 will be described with respect to particular systems.

The process 1000 begins at block 1002 where, for example, the storage manager 140 detects a failure of the media agent 144 at the secondary storage system 118. In some embodiments, the block 1002 may be optional or omitted. For example, in some embodiments, the process 1000 may be used to add new or additional media agents 144 to the secondary storage system 118 when, for example, scaling the information management system 100 to provide additional computing resources or support additional client computing devices 102. In such embodiments, the process 1000 may be performed without the detection of a failure of a media agent 144.

Alternatively, or in addition, the block 1002 may detect that a new media agent should be configured or made available based on one or more detected scaling criteria associated with the information management system 100. In some cases, the media agent may be added if the detected scaling criteria satisfy a scaling threshold. This scaling criteria and/or threshold may relate to the number of computing devices available or registered at the primary storage system 117, the amount of expected backups to be performed, the amount of data to be backed up, or any other criteria that may affect the number of media agents to be used. For example, if the storage manager 140 detects that more than a threshold number of client computing devices have been added to or registered with the primary storage system 117, the storage manager 140 may determine that one or more additional media agents should be configured or made available to the information management system 100, to the primary storage system 117, or to the secondary storage system 118. As another example, if it is determined that a threshold number of backup operations are to be scheduled over a particular time period, the storage manager 140 may determine that one or more additional media agents should be configured or made available. In certain embodiments, the failure of one or more media agents may cause the scaling criteria to satisfy a scaling threshold that causes the storage manager 140 to configure new or additional media agents. In some cases, the failure of one media agent may not cause the scaling criteria to satisfy the scaling threshold. In some such cases, the failure of a media agent may not result in the remainder of the process 1000 being performed. But the failure of additional media agents in the future that result in the scaling criteria satisfying the scaling threshold may cause the remainder of the process 1000 to be performed after the additional media agents have failed.

At block 1004, the storage manager 140 configures a computing system as a new media agent 144 or to include a new media agent 144. In some embodiments, the computing system may be configured as a secondary storage computing device 106 that is configured to host or implement the new media agent 144. In some cases, the secondary storage computing device 106 or the media agent 144 may be configured to replace a secondary storage computing device or a media agent that has failed. In other cases, the secondary storage computing device 106 or the media agent 144 may be configured as a new or additional secondary storage computing device 106 or media agent 144.

At block 1006, the storage manager 140 restores the most recent backup index 532 from the network storage system 302 to the new media agent 144 to create a backup index 153 at the media agent 144. Restoring the most recent backup index may include retrieving the backup index from the network store system 302 and storing it on an indexing system 502 of the new secondary storage computing device 106. In some embodiments, the backup index may be restored from the secondary storage device 108 at the secondary storage system 118. The most recent backup index may comprise the most recently created backup index generated and/or the most recently created backup index stored at the network storage system 302. In some embodiments, the most recent backup index may be the most recent backup index identified as available or eligible for use or restoration. For example, in some cases, one or more backup indexes may be marked or identified as being expired, unavailable, corrupted, or otherwise unusable. In some such cases, the most recent backup index may be marked as unavailable. In some cases, a most recent backup index may be unusable because a more recent backup was discarded and an earlier backup was identified as the most up-to-date backup to be used. Thus, in some cases, the most recent backup index restored at the block 1006 may in fact not be the most recent backup index generated.

At block 1008, the storage manager 140 updates the backup index 153 at the new media agent 144 based at least in part on one or more transaction log files at the network storage system 302 that are more recent than the backup index 153. The one or more transaction log files may be retrieved from the network storage system 302 and stored at the indexing system 502 of the new secondary storage computing device 106. In some embodiments, the one or more transaction log files may be restored from the secondary storage device 108 at the secondary storage system 118. In certain embodiments, the storage manager 140 accesses, retrieves, or cause to be retrieved one or more transaction log files that have a timestamp that is more recent than a timestamp associated with the backup index 153. In certain embodiments, at least some of the transaction log files may be accessed from an indexing system of another secondary storage computing device. Further, in some cases, the transaction log files may be stored at a distributed index, such as a distributed indexing system 502. Moreover, in certain embodiments, there may be no transaction log files that are more recent than the backup index. In such embodiments, the block 1008 may be omitted.

At decision block 1010, the storage manager 140 determines whether any transaction identifiers that are more recent than the backup index 153 exist. Determining whether any transaction identifiers that are more recent than the backup index 153 exists may include comparing the timestamp of the transaction identifiers with the timestamp of the backup index and/or the one or more transaction log files used to update the backup index. The transaction identifiers may be accessed from a network storage system 302, from a secondary storage device 108, or from an indexing system 502 of another secondary storage computing device 106 other than the one being replaced or added to the secondary storage system 118.

If it is determined at the decision block 1010 that there are transaction identifiers that exist that are more recent than the backup index 153, the storage manager 140, at block 1012, replays or causes to be replayed transactions associated with the transaction identifiers that are more recent than the backup index 153 to create an up-to-date backup index. Replaying the transactions may include accessing one or more transactions from transaction log files associated with the transaction identifiers that have yet to be recorded in the backup index. These one or more transactions may be replayed or performed and the backup index may be updated to indicate that the transaction has been flushed to backup. A flag in the backup index may indicate that the transaction has been consumed to performed. By replaying the transactions associated with the transaction identifiers, backup index can be updated to reflect the state of the index at a point in time where the media agent 144 of the block 1002 was detected to have failed or to the current state of the index. In certain embodiments, replaying the transactions may be limited to replaying the effects of the transactions on the index because, for example, although the index may have been lost when the media agent 144 failed, the backup of the primary storage device associated with the index may still exist at the network store system 302. In some embodiments, replaying the transactions may include modifying the backup index 153 based on one or more results generated by replaying the transactions. In some embodiments, one or more transaction identifiers are accessed from the network storage manager 302. Alternatively, or in addition, one or more of the transaction identifiers may be accessed from an indexing system 502, which may be associated with another secondary storage computing device. In some cases the indexing system 502 may be a distributed indexing system that is distributed among a plurality of systems at the secondary storage system 118.

After creating the up-to-date backup index at block 1012, or if it is determined that there are no transaction identifiers that are more recent than the backup index at the decision block 1010, the storage manager 140 adds the new media agent 144 to the set of available media agents at the secondary storage system 118. Adding the new media agent 144 to the set of available media agents may include providing the new media agent with the up-to-date backup index. In some cases, providing the up-to-date backup index to the new media agent 144 includes storing the up-to-date backup index at an indexing system 502 of the new media agent 144. This indexing system 502 may be included as part of or hosted by the secondary storage computing device 106 that hosts the new media agent 144.

Further, adding the new media agent 144 to the set of available media agents may include identifying the new media agent 144 as available for use by one or more client computing devices 102. Further, adding the new media agent 144 to the set of available media agents may include storing the identity of or access information for the new media agent 144, or the new secondary storage computing device 106, in the management database 146.

In certain embodiments, one or more of the blocks of the process 1000 may be performed by the new media agent 144 itself. For example, after the storage manager 140 configures the secondary storage computing device 106 as a new media agent 144 or to include the media agent 144, the new media agent 144 may perform the operations associated with the blocks 1006, 1008, 1010, and 1012. Upon completion of the operations associated with the blocks 1010 and/or 1012, the new media agent 144 may inform the storage manager 140 that the backup index has been restored for use by the new media agent 144 enabling the storage manager 142 at the new media agent the set of available media agents as part of the block 1014.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation.

Example Use Cases

In one example use case, a backup of a client computing device 102, or other data management task, may be triggered. For example, a user may request a backup or a scheduled backup time may be reached. The data agent 142 may request a job ID and job metadata from a storage manager 140 to perform the backup task using, for example the process 600. The data agent 142 may receive the job ID (e.g., Job ID XYZ) and job metadata indicating information to facilitate the backup process. For example, the job metadata may identify where to backup the data, how many data connections to establish, or an amount of bandwidth available to the client computing device 102. The job ID and job metadata may be stored at a job cache 516.

In embodiments where the client computing device 102 includes a core media agent 510, the data agent 142 may write or provide data from the primary storage device 104 to the core media agent 510 for backup using, for example, the process 800. Metadata relating to the files to be backed up may be provided to a data management system 506 at a media agent 144 or at an indexing agent 580 to create or maintain an index of the backup. In embodiments where the client computing device 102 does not include a core media agent 510, the data may be provided by the data agent 142 to a media agent 144 at a secondary storage computing device 106.

In a continuing example use case, a second job may be triggered. For example, an incremental backup may be triggered. The client computing device 102 may determine from the job cache that the job ID XYZ and associated job metadata is still valid. For example, an associated time to live value has not been reached or an invalidation command invalidating the job ID has not been received from the storage manager 140. In such cases, the second job may be performed using the job metadata associated with the job ID XYZ. Thus, it may appear to the storage manager 140 that the second job is a continuation of the first job. In other words, the client computing device 102 may cause one or more other systems within the information management system 500 to associate a plurality of jobs as one job under one job ID. Advantageously, overhead is reduced within the system 500 by reducing communication between systems within the system 500.

At some time subsequent to the performance of the first and second job, and possibly one or more additional jobs, the client computing device 102 may provide a batch update to the storage manager 140 relating to the plurality of jobs performed under the job ID XYZ. At such time, the storage manager 140 may update a jobs agent 156 to identify the plurality of jobs performed under the job ID XYZ and whether the jobs were successful or failed.

Storage Manager Query Caching

As previously described, one way to reduce overhead, and therefore increase the number of client computing devices 102 that can be supported by the storage manager 140, is to re-use job identifiers for multiple backup and/or restore processes. Another way to reduce overhead in the information management system 100 is to reduce the number of times the storage manager 140 is queried or otherwise communicated with during a backup, restore, or other data management process. Embodiments disclosed herein can reduce the number of communications with the storage manager 140 by combining separate queries into a single query and/or by caching query results enabling the query results to be re-used in subsequent data management operations (e.g., in subsequent backup operations) without accessing the storage manager 140 during the subsequent data management operation.

Figure 11:
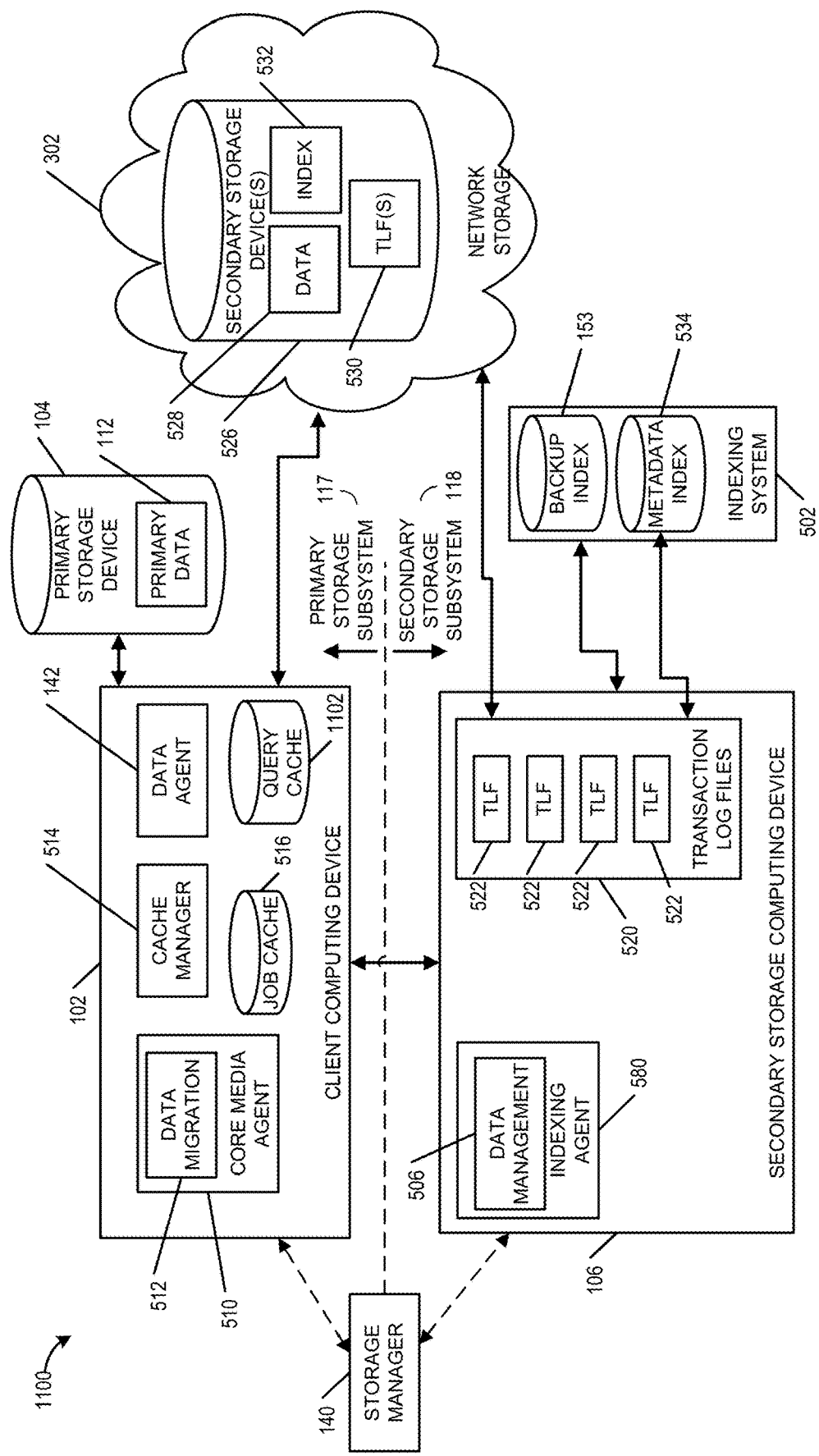
FIG. 11 is a block diagram illustrating portions of a system 1100 for reducing a management burden on a storage manager enabling an increase in the number of clients supported by an information management system, according to an embodiment.

FIG. 11 is a block diagram illustrating portions of a system 1100 for reducing a management burden on a storage manager enabling an increase in the number of clients supported by an information management system, according to an embodiment. In some embodiments, the system 1100 can be part of an information management system 100 and may include one or more of the systems and one or more of the embodiments previously described with respect to the information management system 100. Moreover, in certain embodiments, the system 1100 includes one or more of the embodiments described with respect to the systems 500 and/or 575.

The client computing device 102, as illustrated in FIG. 11, may include a query cache 1102. The query cache 110 may include any repository that is capable of storing or caching query results, or data obtained from query results, from queries provided to the storage manager 140. The query cache 1102 may comprise volatile memory, non-volatile memory, or a combination of volatile and non-volatile memory. The query cache 1102 can be managed by the cache manager 514, which also manages the job cache 516. Alternatively, the query cache 1102 may be managed by a separate cache manager (not shown). In some cases, the cache manager 514 may be included as part of the data agent 142 and/or the core media agent 510. Thus, in some cases, the data agent 142 and/or the core media agent 510 may manage the query cache 1102. In some embodiments, the query cache 1102 and the job cache 516 may be combined into a single repository. Alternatively, the query cache 1102 may replace the job cache 516.

The query cache 1102 may cache any type of data obtained from the storage manager 140 during a data management process, such as a backup process, a restore process, a deduplication process, an archive process, and the like. The data obtained from the storage manager 140 may relate to various policies implemented globally at the information management system 100 or implemented with respect to particular subsystems or computing devices of the information management system 100. For example, the policies may be associated with client computing devices 102 of particular types, associated with particular users, or associated with users of particular roles.

Further, the policies may relate to storage policies (e.g., storage locations, encryption used, deduplication frequency and policies, and the like), sub-client configurations (e.g., particular storage drives of the client computing device 102), back-up policies (e.g., frequency of backup, data to backup, location of backup, whether to archive, deduplication frequency and policies, and the like), restore policies (e.g., when to restore, where to restore, and the like), access control policies, or any other policy that can be applied to an information management system 100 or a portion thereof. In other words, in certain embodiments, the query cache 1102 may store data relating to where to backup data, where to restore data, the number of streams or communication connections available to backup or restore data, the type of encryption to use, encryption/decryption keys to use, the size of data chunks, where to index the backup, the type of data to include in the index, network storage 302 access information, a job identifier for a storage management task, and any other data that may be obtained from the storage manager 140 as part of or to enable a storage management task.

In some embodiments, the query cache 1102 may be split into a light-weight cache, such as a registry cache, that can store more frequently accessed data and/or smaller data units, and a heavy-weight cache, such as a SQL-based cache that may store more substantial data blocks. For example, the light-weight cache may store identifiers or query response data that comprises a single value or data that rarely changes. For instance, the light-weight cache of the query cache 1102 may store a job identifier value, or a secondary storage computing device identifier. The SQL-based cache may store larger data-entries compared to the light-weight cache, such as storage policy information or access information for each computing device within the secondary storage subsystem 118.

The data agent 142 in the core media agent 510 are illustrated as separate systems within the client computing device 102. However, in certain embodiments, the core media agent 510 may be part of or implemented within the data agent 142. Alternatively, or in addition, the data agent 142 may have at least some of the functionality of the core media agent 510.

Additional processes and details of the operations of the systems illustrated in FIG. 11 are described below with respect to FIGS. 12 through 14.

Example Storage Manager Query Process

Figure 12:
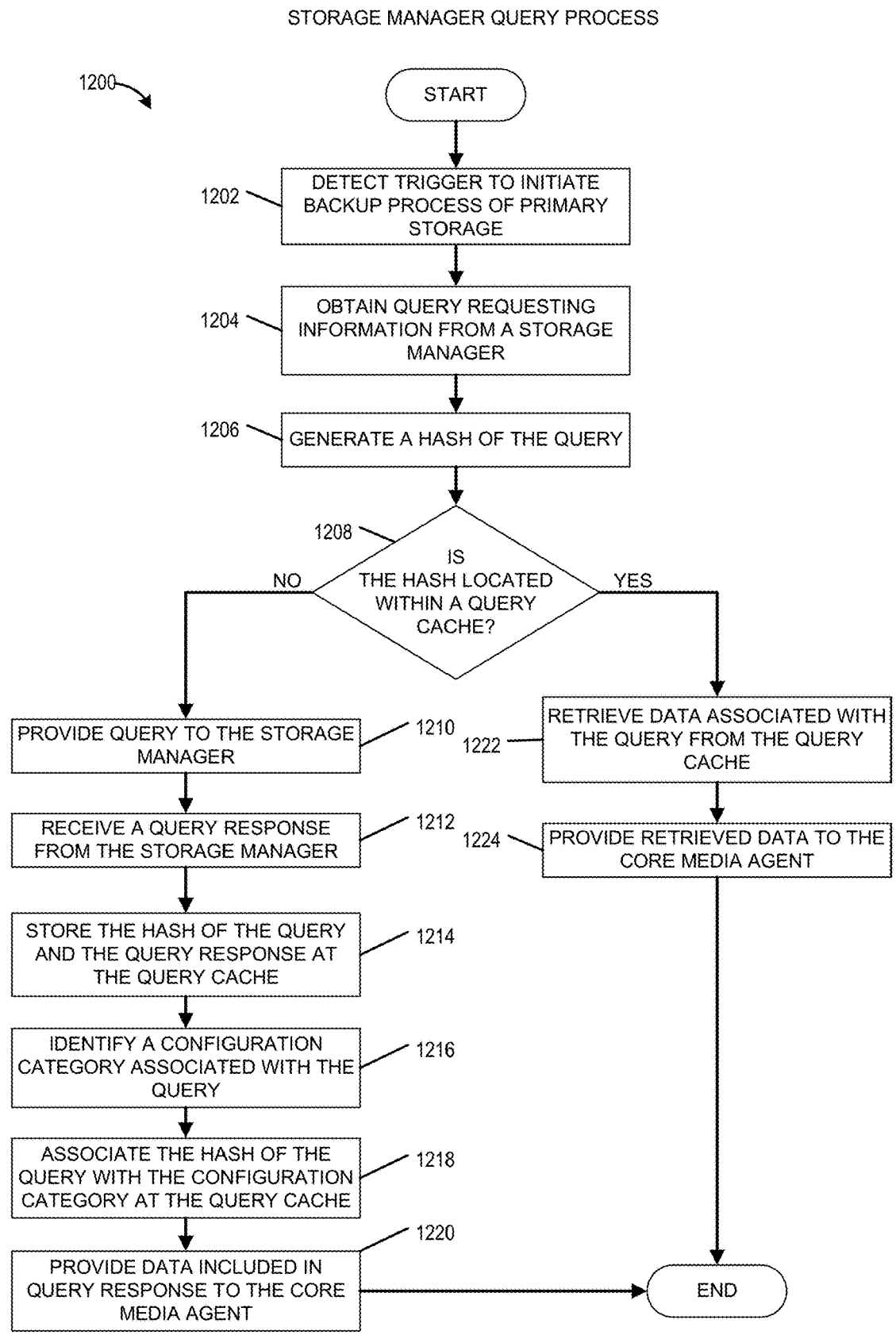
FIG. 12 depicts operations of a storage manager query process 1200 according to an embodiment.

FIG. 12 depicts operations of a storage manager query process 1200 according to an embodiment. The process 1200 can be implemented by any system that can query, or may attempt to query, a storage manager 140 during performance of a data management task, such as a backup operation, a restore operation, a deduplication operation, an archiving operation, and the like. The process 1200, in whole or in part, can be implemented by, for example, a data agent 142, a cache manager 514, a query cache 1102, or a core media agent 510, among others. Although any number of systems, in whole or in part, can implement the process 1200, to simplify discussion, the process 1200 will be described with respect to particular systems.

The process 1200 begins at block 1202 where, for example, the data agent 142 detects a trigger to initiate a backup process of a primary storage device 104. Alternatively, or in addition, the data agent 142 may detect a trigger to perform an alternative data management operation, such as a restore, archive, or deduplication operation. The trigger may include any of the previously described triggers herein. For example, the trigger may include a command, an amount of changes to the primary data 112, or a scheduled time being reached. Further, a core media agent 510 instead of, or in addition to, the data agent 142 may detect the trigger at the block 1202.

While the process 1200 may be performed with respect to a number of different data management operations, the process 1200 may be performed most frequently during a backup operation. The backup operation may be triggered by a thread of the data agent 142, which may work in conjunction with the core media agent 510 perform the backup process. In some embodiments, the backup process may be initiated without a management agent 150 for a job agent 156 of the storage manager 140 initiating the backup process. In other words, in certain embodiments, a scheduler within the data agent 142 may trigger the backup process.

At block 1204, the cache manager 514 obtains a query requesting information from the storage manager 140. The query may be generated by the data agent 142 and provided to the cache manager 514 or generated by the cache manager 514 itself. Alternatively, or in addition, the query may be generated by software that triggers the backup process. This software may be at the client computing device 102, the storage manager 104, or elsewhere within the information management system 100. In some embodiments, the query may be generated by the cache manager 514. In yet other embodiments, the query may be generated by the core media agent 510 or any other system involved in the data backup process. The query may then be provided to the data agent 142 and/or the cache manager 514.

At block 1206, the cache manager 514 generates a hash of the query obtained at the block 1204. In certain embodiments, the hash of the query is generated based on the entire query. In other embodiments, the hash of the query is generated based on a portion of the query. In certain embodiments, two instances of the same query may include at least some differing data or metadata. For example, in certain embodiments, each query may be associated with a timestamp. Thus, two queries that are otherwise identical in all other ways may have differing timestamps. As another example, each query may be associated with a unique identifier. In such cases, two otherwise identical queries may each have unique identifiers. In certain embodiments, in generating the hash of the query, unique data or metadata associated with the query that does not affect a response to the query may be omitted (e.g., a timestamp or unique identifier, or the like may be omitted). In other words, in some cases, repeated instances of the same query may include some unique aspects that differentiate the queries (e.g., timestamps). These unique aspects may be omitted in generating a hash of the query.

In certain embodiments, each query may be associated with a unique identifier, but repetitions of the same query to be associated with the same unique identifier. In other words, the identifier may be unique to the particular query, but not to the particular instance of the query. In some such embodiments, the hash may be generated based on the unique identifier. In other embodiments, the unique identifier may be used in place of the hash at the block 1206 in such embodiments, the block 1206 may include identifying the unique identifier.

At decision block 1208, the cache manager 514 determines whether the hash is located within a query cache 1102. Determining whether the hash is located within the query cache 1102 may include comparing the hash generated the block 1206 two hash is stored within the query cache 1102. Alternatively, or in addition, the hash generated at the block 1206 may be used as a key or to index the query cache 1102. In such embodiments, the decision block 1208 may include determining whether there is a value stored in the query cache 1102 at an entry indexed or otherwise identified based on the hash generated at the block 1206. In certain embodiments, the decision block 1208 may include determining whether an entry in the query cache 1102 associated with the hash is valid. In cases where the hash is located within the query cache but the entry associated with the cash has been invalidated, the process 1200 may proceed to the block 1210 as if the hash was not located within the query cache 1102.

If it is determined at the decision block 1208 that the hash is not located within the query cache 1102, the data agent 142 provides the query to the storage manager 140 at block 1210. In certain embodiments, as is described in more detail below, the query may be associated with a set of queries or a plurality of queries. In some such cases, the block 1210 may include providing the set of queries or an aggregate query created from the set of queries to the storage manager 140 of the block 1210.

At block 1212, the data agent 142 receives a query response from the storage manager 140. The query response may include data or metadata obtained from one or more management tables at the storage manager 140. In certain embodiments, the query response may include a response specifying whether the data exists at the storage manager 140. As the query may include any type of query associated with performing a data management operation, such as a backup process, the query response may include any type of data responsive to the query and associated with performing the data management operation. For example, a query associated with determining the type of encryption to perform on the primary data 112 or a query associated with identifying a secondary storage device 526 to backup the data may result in the storage manager 140 providing an encryption key or an identity of a particular secondary storage device 526 available for backup.

At block 1214, the cache manager 514 stores the hash of the query and the query response at the query cache 1102. Storing the hash of the query and the query response may involve indexing the query cache 1102 using the hash and storing the query response at the location within the query cache 1102 indexed by the hash. In other words, in certain embodiments, the hash of the query may be used as an address or to determine an address within the query cache 1102 at which to store the query response or to identify a location in memory at which to store the query response. In certain embodiments, the block 1214 may include storing the query along with the hash of the query at the query cache 1102.

At block 1216, the cache manager 514 identifies a configuration category associated with the query. The configuration categories can include any type of category or delineation associated with configurations of different aspects of the information management system 100. For example, the configuration categories may relate to storage policy, sub client configurations (e.g., configuration of different drives or different partitions within the primary storage device 104), backup policies, restore policies, duplication policies, access control policies, or any other policies or configurations associated with the information management system 100.

The cache manager 514 may identify the configuration category associated with the query based on a tag included with the query. Alternatively, or in addition, the cache manager 514 may categorize the query by analyzing one or more portions of the query. For example, the cache manager 514 may categorize the query based at least in part on one or more tables referenced at the storage manager 140. As another example, the cache manager 514 may categorize the query based at least in part on types of variables or data referenced in the query. In yet another example, the cache manager 514 may categorize the query based at least in part on a source of the query.

In some embodiments, the block 1216 may include identifying multiple configuration categories to associate with the query. For example, a query may be associated with both a storage policy and a backup policy. In such an example, the cache manager 514 may categorize the query under both a storage policy category and a backup policy category at the query cache 1102.

At block 1218, the cache manager 514 associates the hash of the query with the configuration category at the query cache 1102. Alternatively, or in addition, the cache manager 514 associates the configuration category with an entry at the query cache 1102 that is referenced by, accessible using, or otherwise associated with the hash. The cache manager 514 may associate the hash of the query, or an entry associated with the hash of the query, with the configuration category by associating a particular tag with the hash, or the entry associated with the hash of the query. Alternatively, or in addition, the block 1218 may include storing the hash and/or data associated with the hash in a particular location at the query cache 1102 that is associated with the configuration category.

At block 1220, the data agent 142 provides data included in the query response to the core media agent 510. Alternatively, or in addition, the data may be provided to the data agent 142. In some embodiments, providing the data to the core media agent 510 may include providing the query response to the core media agent 510. Alternatively, or in addition, providing the data to the core media agent 510 may include providing portions of the data that are responsive to the query to the core media agent 510, but may omit portions of the query response that may be un-responsive to her unrelated to the particular query. For example, portions of the query response that may be related to transmitting or directing the patent between computing systems may be omitted from the data that is provided to the core media agent 510. In certain embodiments, the data agent 142 may provide the query response, or data included in the query response, to the media agent 144.

If at the decision block 1208 the cache manager 514 determines that the hash is located within the query cache 1102, the process 1200 proceeds to the block 1222. At the block 1222, the cache manager 514 retrieves data associated with the query from the query cache 1102. Retrieving the data associated with the query from the query cache 1102 may include accessing an entry at the query cache 1102 associated with the hash. The entry may be located at the query cache 1102 by using the hash as a key to locate the entry responsive to the query within the query cache 1102.

At block 1224, the data agent 142 provides the retrieved data to the core media agent 510. Alternatively, in certain embodiments, the cache manager 514 may provide the retrieved data directly to the core media agent 510. In certain embodiments, the block 1224 may include one or more of the embodiments described with respect to the block 1220.

In certain embodiments, the query obtained and/or generated at the block 1204 may be one of a plurality of queries that are obtained and/or generated at the block 1204. This plurality of queries may be processed together as part of the process 1200. In other words, in certain embodiments, the plurality of queries may be provided to the storage manager 140 at the block 1210 during a single communication with the storage manager 140. This single communication may be a single packet or a single message, or may be a plurality of packets or messages that occur during a single communication session. Advantageously, in certain embodiments, by providing the plurality of queries together, the number of communications (or communication sessions) with the storage manager 140 or messages provided to the storage manager 140 can be reduced compared to embodiments where the storage manager 140 is separately queried throughout the backup process for each of the queries included in the plurality of queries.

The queries identified to be included in the plurality of queries may be determined based at least in part on a probability that one or more additional queries are issued within a threshold time period of the query obtained at the block 1204 or within a single instance of a backup process. This probability may be determined based on an analysis of historical data. For example, if a query to the storage manager 140 to determine an encryption policy is determined to occur more at more than a threshold rate subsequent to a query to determine a backup location for backing up the primary data 112, the two queries may be associated with each other. Thus, if a query is obtained at the block 1204 to determine a backup location, the data agent 142 or the cache manager 514 may combine the query with a query to determine the encryption policy.

The plurality of queries obtained or identified at the block 1204 may be aggregated into a single query to the storage manager 140. Further, the aggregated query may be hashed and stored at the query cache 102 with the query response obtained from the storage manager 140. Alternatively, the individual queries that are aggregated may be separately hashed and separately stored at the query cache 1102 with the associated query responses. Advantageously, by separately hashing and storing each query and associated query response, queries associated with different configuration categories can be aggregated for the purposes of querying the storage manager 140 while continuing to be associated with separate categories at the query cache 1102, which enables partial query invalidation as described further below with respect to the process 1400. Moreover, although aggregated queries may include groups of queries that are often, or more than a threshold probability of time performed together, there may be instances where it is desirable for a query to be repeated without repeating each of the queries in the aggregate query. Separately storing the queries at the query cache 1102 enables the repeat of individual queries while still reducing the accesses to the storage manager 140.

Example Cache Invalidation Process

Figure 13:
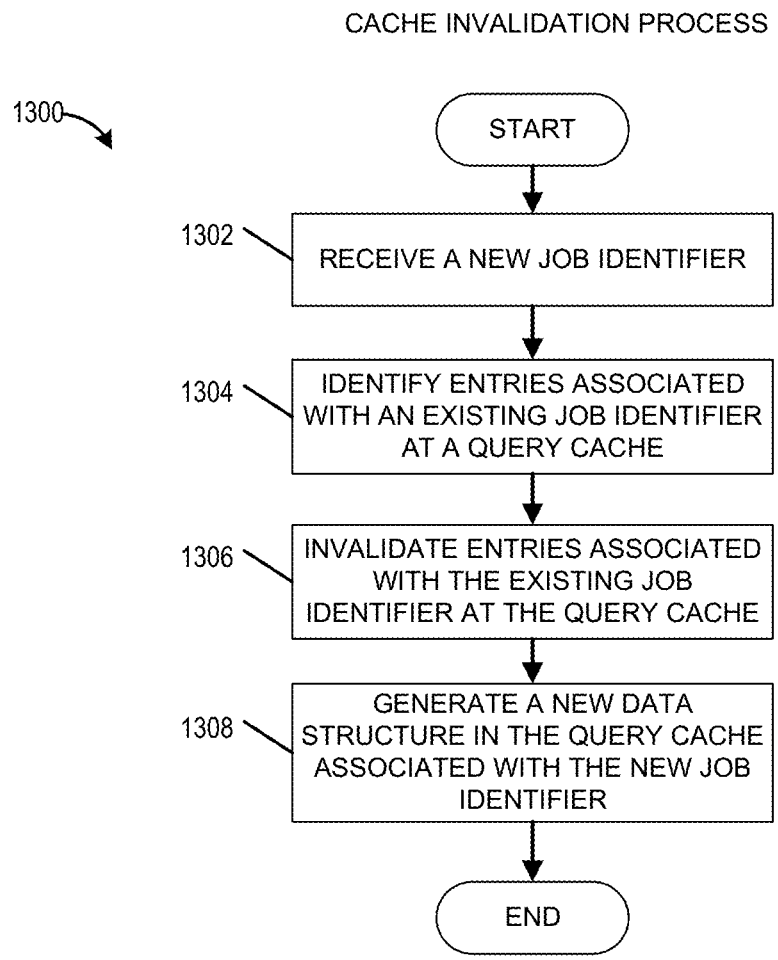
FIG. 13 depicts operations of a cache invalidation process 1300 according to an embodiment.

FIG. 13 depicts operations of a cache invalidation process 1300 according to an embodiment. The process 1300 can be implemented by any system that can invalidate the query cache 1102. The process 1300, in whole or in part, can be implemented by, for example, a data agent 142, a cache manager 514, a query cache 1102, or a core media agent 510, among others. Although any number of systems, in whole or in part, can implement the process 1300, to simplify discussion, the process 1300 will be described with respect to particular systems.

The process 1300 begins at block 1302 where, for example, the cache manager 514 receives a new job identifier. The new job identifier may be received from the storage manager 140 and/or from the data agent 142. In certain embodiments, the new job identifier may be received using the process 600 or based on any other process that may result in a new job identifier being assigned. The new job identifier may be received when a configuration of the information manager 100, or one or more elements of the information manager 100, changes. Alternatively, or in addition, the cache manager 514 may receive the new job identifier when one or more policies is changed. For example, when a storage or backup policy is modified, a new job identifier may be received. In some cases, in addition to receiving the new job identifier, the cache manager 514 may receive an identity of the change that triggered the provisioning of the new job identifier.

At block 1304, the cache manager 514 identifies one or more entries associated with an existing job identifier at the query cache 1102. In certain embodiments, the block 1304 includes identifying any entries within the query cache 1102 that are associated with a different job identifier than the new job identifier received at the block 1302. Alternatively, or in addition, the block 1304 may include identifying entries that are not associated with the new job identifier received at the block 1302.

At the block 1306, the cache manager 514 invalidates entries associated with the existing job identifier at the query cache 1102. Alternatively, or in addition, the cache manager 514 invalidates entries at the query cache 1102 that are not associated with the new job identifier received at the block 1302. Invalidating entries at the query cache 1102 may include any process for invalidating a cache. For example, invalidating entries at the query cache 1102 may include deleting the entries from the query cache 1102, marking entries at the query cache 1102 as invalid, or marking entries at the query cache 1102 is available for storage.

In certain embodiments, the identification of particular entries within the query cache 1102 and/or the invalidation of particular entries within the query cache 1102 is unnecessary because, for example, the cache manager 514 may invalidate all entries within the query cache 1102 upon receipt of a new job identifier. In other words, in certain embodiments, operations associated with the block 1304 may be optional or omitted.

At block 1308, the cache manager 514 generates a new data structure in the query cache 1102 associated with the new job identifier received at the block 1302. The new data structure may be used to store any new queries, hashes of the new queries, and/or query responses are data associated with query responses as may be obtained using, for example, the process 1200. In certain embodiments, invalidating entries within the query cache 1102 at the block 1306 may include identifying the new data structure generated at the block 1308 as the active data structure. The data structure may include any type of data structure that can store a query, a hash of a query, and/or data associated with a response to the query. For example, the data structure may be a table or a linked list.

Example Partial Cache Invalidation Process

Figure 14:
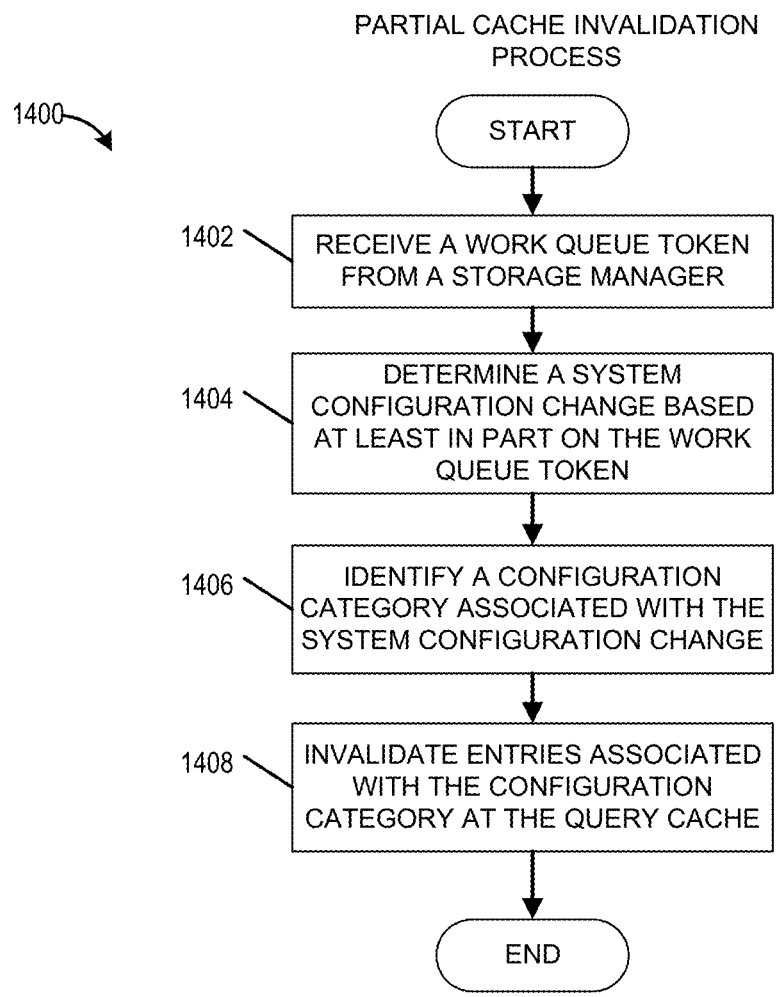
FIG. 14 depicts operations of a partial cache invalidation process 1400 according to an embodiment.

FIG. 14 depicts operations of a partial cache invalidation process 1400 according to an embodiment. The process 1400 can be implemented by any system that can partially invalidate the query cache 1102. The process 1400, in whole or in part, can be implemented by, for example, a data agent 142, a cache manager 514, a query cache 1102, or a core media agent 510, among others. Although any number of systems, in whole or in part, can implement the process 1400, to simplify discussion, the process 1400 will be described with respect to particular systems.

The process 1400 begins at block 1402 where, for example, the cache manager 514 receives a work queue token from the storage manager 140. In some embodiments, the work queue token may be received by the data agent 142. The data agent 142 may provide the work queue token to the cache manager 514. Alternatively, or in addition, the data agent 142 may provide an identity of a configuration change to the cache manager 514 based at least in part on the work queue token. The work queue token may be received from the storage manager 140.

The work queue token may include an identity of a configuration change within the information management system 100. This configuration change may be registered or otherwise stored at the storage manager 140. In certain embodiments, the storage manager 140 may determine the configuration change. This configuration change can relate to any change within the information management system 100. For example, the configuration change can be a change in available computing systems or computing resources, a change in policies (e.g., a change in backup policy, a change in storage policy, and the like), a change in user permissions, or any other change that could possibly invalidate data previously stored at the query cache 1102. In certain embodiments, the changes may be reflected in one or more tables that are stored at the storage manager 140. When the storage manager 140 determines that a change in configuration or policy (e.g., backup policy or storage policy) has occurred, the storage manager 140 may provide a work queue token identifying the change to the cache manager 514 and/or the client computing device 102. In some embodiments, the storage manager 140 provides the work queue token to each system that the configuration or policy change affects.

At block 1404, the cache manager 514 determines the system configuration change based at least in part on the work queue token. In certain embodiments, the block 1404 may be optional or omitted. For example, the work queue token may identify the configuration category associated with the change configuration with or without identifying the particular configuration change.

At block 1406, cache manager 514 identifies a configuration category associated with the system configuration change. The configuration category may be one (or more) of a plurality of possible configuration categories. In certain embodiments, the block 1406 may include identifying multiple configuration categories the may be associated with a particular system configuration change.

At block 1408, the cache manager 514 invalidates entries associated with the configuration category at the query cache 1102. Invalidating entries at the query cache 1102 may include deleting the entries or marking them as invalid. In certain embodiments, the block 1408 may include one or more of the embodiments previously described with respect to the block 1306. However, while embodiments of the block 1306 may be with respect to the entire query cache or entire data structure associated with a job identifier, the cache manager 514 may invalidate entries associated with a particular configuration category at block 1408 while maintaining entries associated with other configuration categories at the query cache 1102.

In certain embodiments, the block 1408 includes invalidating entries within the query cache 1102 that are associated with the configuration category identified at the block 1406 regardless of whether the particular entry was affected or changed as a result of the system configuration change determined at the block 1404. In certain embodiments, a number of different queries can result in the retrieval of particular data. Further, in certain embodiments, a query can be formed in a number of different ways. Accordingly, in certain embodiments, it may be difficult and resource intensive to track individual queries that may be invalidated by a change in data. Advantageously, in certain embodiments, by invalidating a particular configuration category, the overhead required to identify particular query entries within the query cache 1102 that may be affected by the system configuration change can be reduced or eliminated while still at least partially maintaining the advantages associated with having the query cache 1102. For example, while queries associated with the invalidated configuration category may need to be presented to the storage manager 140, queries associated with configuration categories were not invalidated can be obtained from the query cache 1102 reducing the communications with the storage manager 140.

Transaction Log Based Indexing

As previously described, one way to reduce overhead in the information management system 100 is to reduce the number of times the storage manager 140 is queried or otherwise communicated with during a backup, restore, or other data management process. One way that the interaction with the storage manager 140 is reduced is by enabling the client computing devices 102 to communicate directly with a network storage system 302 during a data management (e.g., data backup, data restore, data access, etc.) process.

Embodiments disclosed herein can further improve the efficiency of the information management system by delaying generation of a backup index to a period of time when load on the information management system is reduced. For example, the backup index may be generated after scheduled business hours or when less users are accessing resources of the information management system. The backup index generation may be delayed without losing backup metadata that enables access of data at the network storage system 302 by generating transaction log files that identify the transactions performed with respect to the network storage system 302. The transaction log files may then be used to later generate or update a backup index. Further, to prevent a loss of the transaction log files during a system failure, a media agent assigned to a client computing system or to a particular job can replicate the transaction log files to another media agent until such time as the backup index is generated or updated.

Figure 15:
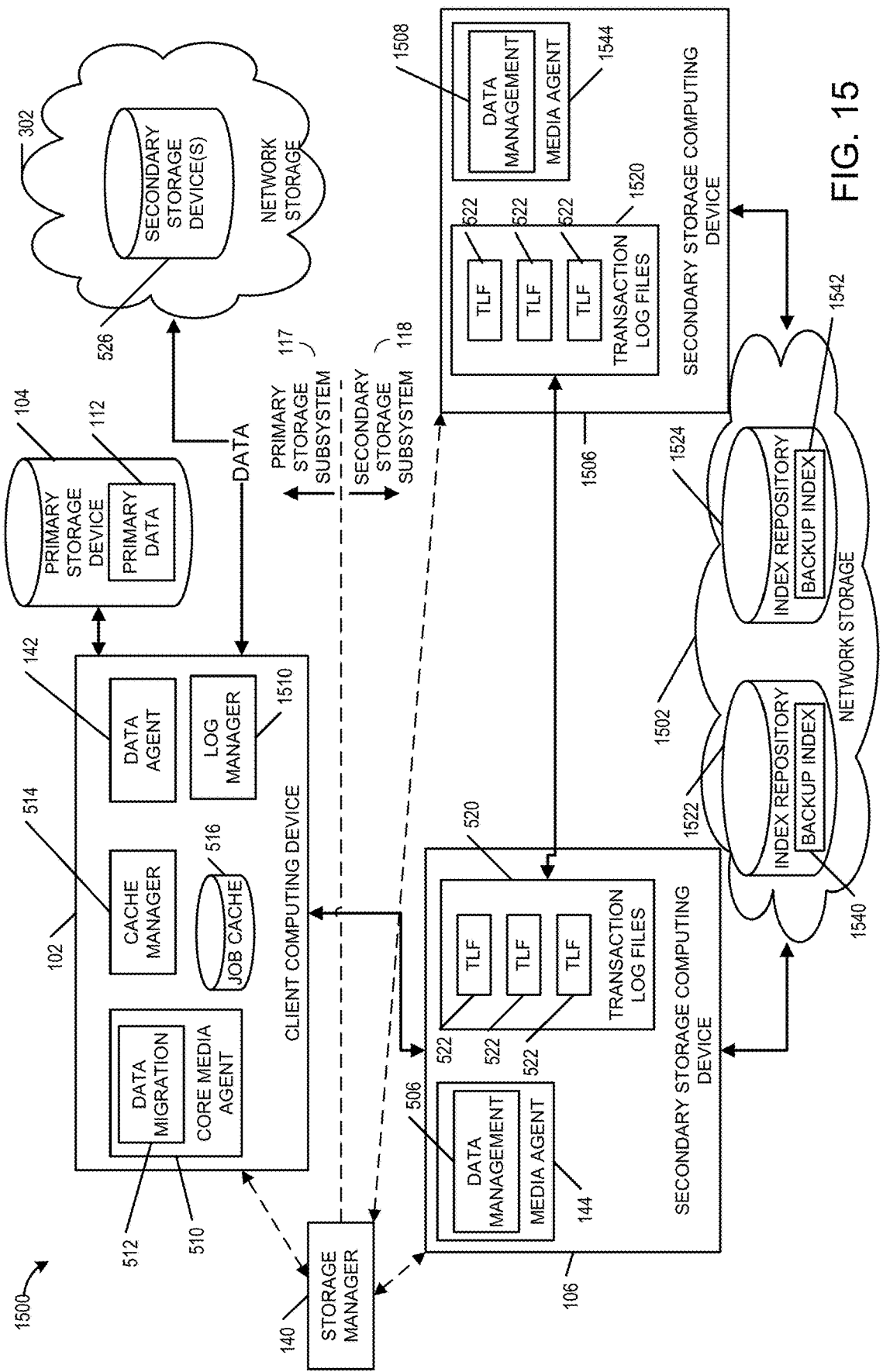
FIG. 15 is a block diagram illustrating portions of a system 1500 using transaction log files to reduce a management burden on a storage manager enabling an increase in the number of clients supported by an information management system, according to an embodiment.

FIG. 15 is a block diagram illustrating portions of a system 1500 using transaction log files to reduce a management burden on a storage manager enabling an increase in the number of clients supported by an information management system, according to an embodiment. In some embodiments, the system 1500 can be part of an information management system 100 and may include one or more of the systems and one or more of the embodiments previously described with respect to the information management system 100. Moreover, in certain embodiments, the system 1500 includes one or more of the embodiments described with respect to the systems 500, 575, and/or 1100.

The client computing device 102 may include a log manager 1510. The log manager 1510 may be implemented separately in the client computing device 102 or may be included as part of the core media agent 510. Alternatively, or in addition, the core media agent 510 may implement one or more features of the log manager 1510.

The log manager 1510 can generate one or more transaction log files 522 based on data backed up to the network storage system 302, or the secondary storage devices 526 of the network storage system 302. In some cases, the one or more transaction log files 522 may be generated based on data accessed, modified, deleted, or otherwise interacted with in a manner that modifies storage of the data at the network storage system 302, or the secondary storage devices 526 of the network storage system 302. The transaction log files 522 may include or be generated based at least in part on an identity of a file interacted with (e.g., backed up, deleted, modified, moved, deduplicated, etc.) at the network storage 302, an attribute of the file (e.g., size, access controls, encryption status, deduplication status, etc.), an indication of a change with respect to a file or storage that caused the transaction log file to be generated, where the file is stored at the network storage system 302 (e.g., which secondary storage device 526, the storage address of the file, etc.), where the file is stored at the primary storage device 104, and the like. In some implementations, the log manager 1510 obtains the information included in the transaction log file 522, but does not generate the transaction log file 522. Instead, the information, or backup metadata, may be provided to the secondary storage computing device 106, or a media agent 144 thereof. The media agent 144 may generate the transaction log file based on the backup metadata.

As previously described, the core media agent 510 may include a data migration system 512 that facilitates backing up data to the network storage system 302. The core media agent 510 may be a reduced or slimmed down version of the media agent in that it may not include all of the functionality of a full media agent, such as the media agent 144. For example, while the media agent 144 may include both data management 504 and data migration 506 systems, the core media agent 510 may include the data migration system 512, but may omit a data management system. Thus, the core media agent 510 may be capable of transmitting data or files to the networks storage system 302, but the index generation and maintenance may be delegated to the media agent 144. It should be understood that the core media agent 510 may include some data management functionality. For example, the core media agent 510 may determine file distribution among chunks. This chunk information may then be provided, for example as part of a TLF 522, to the media agent 144. The media agent 144 may use the chunk information to facilitate generation of a backup index. Advantageously, by including the slimmed down media agent at the client computing device, the client computing device 102 can backup file directly to the network storage system 302 without accessing the secondary storage system or storage manager 140 during the backup process. Moreover, by including the slimmed down media agent at the client computing device instead of a full media agent, the direct communication during backup can occur without using significant resources of the client computing device 102. For example, the backup index generated and stored by the media agent can, in some cases, utilize several Gigabytes of data. Thus, while it may be desirable to move the backup process from the secondary storage system 118 to the primary storage system 117, it is desirable, in some cases, to maintain backup index generation and maintenance at the secondary storage system 118.

The secondary storage subsystem 118 of the information management system 100 may include multiple secondary storage computing devices 106, 1506. Although only two secondary storage computing devices are illustrated, it should be understood that the secondary storage subsystem 118 may include more. For example, the secondary storage subsystem 118 may include 10s, 100s, or more secondary storage computing devices. The number of secondary storage computing devices may be determined based on the number of client computing devices to be supported in the information management system.

Each of the secondary storage computing devices may include one or more media agents 144, 1544. The media agents 144, 1544 may each include a data management system 506, 1508, respectively, that facilitates generation and maintenance of a backup index. Further, the data management system 506, 1508 may generate and/or maintain transaction log files 522 generated during a backup process or other process that modifies the backup storage of the network storage 302.

Each of the secondary storage computing devices 106, 1506 may include a transaction log file repository 520, 1520, respectively, that stores one or more transaction log files. The transaction log file repositories 520, 1520 may include any type of data structure that may store the transaction log files 522. Alternatively, or in addition, the transaction log file repositories 520, 1520 may include a storage device associated with the respective secondary storage computing devices 106, 1506 that is configured to store and/or maintain the transaction log files 522.

Although only one client computing device 102 is illustrated in the system 1500, as previously described, the primary storage subsystem 117 may include multiple client computing devices 102. In some cases, the primary storage subsystem 117 may include 10s or 100s of thousands of client computing devices, or more. Each of the client computing devices 102 may be assigned to a different media agent for managing access to the secondary storage at the secondary storage subsystem 118 and/or the network storage 302. In some cases, a client computing device 102 may be assigned to multiple media agents. For example, different jobs of the client computing device 102 may be associated with different media agents.

Each media agent 144, 1544 may receive TLFs from a client computing device 102 assigned to it. Alternatively, or in addition, the media agents 144, 1544 may receive backup metadata, which the media agents 144, 1544 may use to generate the TLFs 522. Further, the media agents 144, 1544 may distribute or replicate TLFs 522 among multiple secondary storage computing devices 106, 1506. For example, the client computing device 102 may provide TLFs associated with a job identifier to the media agent 144. The media agent 144 may store the received TLFs in association with the job identifier at the transaction log files repository 520. Further, the media agent 144 may provide copies of the TLFs to the secondary storage computing device 1506 and/or one or more additional secondary storage computing devices. Advantageously, by replicating the TLFs across multiple systems, the TLFs can be recovered in the event that the media agent 144 or the secondary storage computing device 106 becomes inaccessible. Further, the replicated TLFs may be provided to a new media agent and/or secondary storage computing device that may be configured to replace the media agent 144 and/or the secondary storage computing device 106. In some cases, the client computing device 102 may provide the TLFs 522 to multiple media agents instead of, or in addition to, the media agent 144 replicating the TLF among other media agents.

Each media agent 144, 1544 may generate a backup index 1540, 1542 based on the TLFs 522. Further, the media agents 144, 1544 may update an existing backup index 1540, 1542 based on the TLFs 522. As mentioned above, TLFs may be replicated among multiple media agents. Generally, the media agent 144 assigned to a job or client computing device 102, or that received the TLFs 522 from the client computing device 102, updates or generates the backup index 1540, 1542. However, in some cases, another media agent that has received copies of the TLFs 522 may update or generate the backup index 1540, 1542.

The media agents 144, 1544 may store the backup index 1540, 1542 at an index repository 1522, 1524 of a network storage system 1502. The network storage system 1502 may be the same network storage system 302, or may be an alternative network storage system. In either case, the network storage system 1502, like the network storage system 302, may be associated with a third-party provider of network storage. For example, the network storage systems 302 and/or 1502 may be network storage (or a cloud computing service) supplied by Amazon®, Google®, or Microsoft®. Further, the network storage systems 302 and/or 1502 may be maintained by a different entity than the information management system 100. For example, the information management system 100 may be a data management system for an entity or business, and the network storage 302 and/or 1502 may be associated with a different entity that provides storage services as part of a third-party service.

The backup index 1540, 1542 stored at the network storage 1502 may be replicated among multiple network repositories 1522, 1524. For example, the backup index 1542 may be a replicated version of the backup index 1540. In some cases, the media agent 144, 1544 may replicate the backup index 1540, 1542 across multiple network repositories 1522, 1524. In other cases, the network storage system 1502 may be configured to replicate the backup index 1540, 1542. When the backup index 1540, 1542 is updated based on the TLFs 522, the updates may be replicated across the multiple instances of the backup index stored at the network storage 1502. Advantageously, by replicating the backup index 1540, 1542 across multiple systems, the backup index 1540, 1542 can be recovered in the event that one of the index repositories 1522, 1524 becomes inaccessible. It should be understood that although only two index repositories are illustrated, the network storage system 1502 may include more than two index repositories. Further, each of the index repositories may include storage devices. In some cases, the index repositories are specifically configured to store backup indexes for backups stored at the secondary storage devices 526.

Example Transaction Log Based Indexing Process

Figure 16:
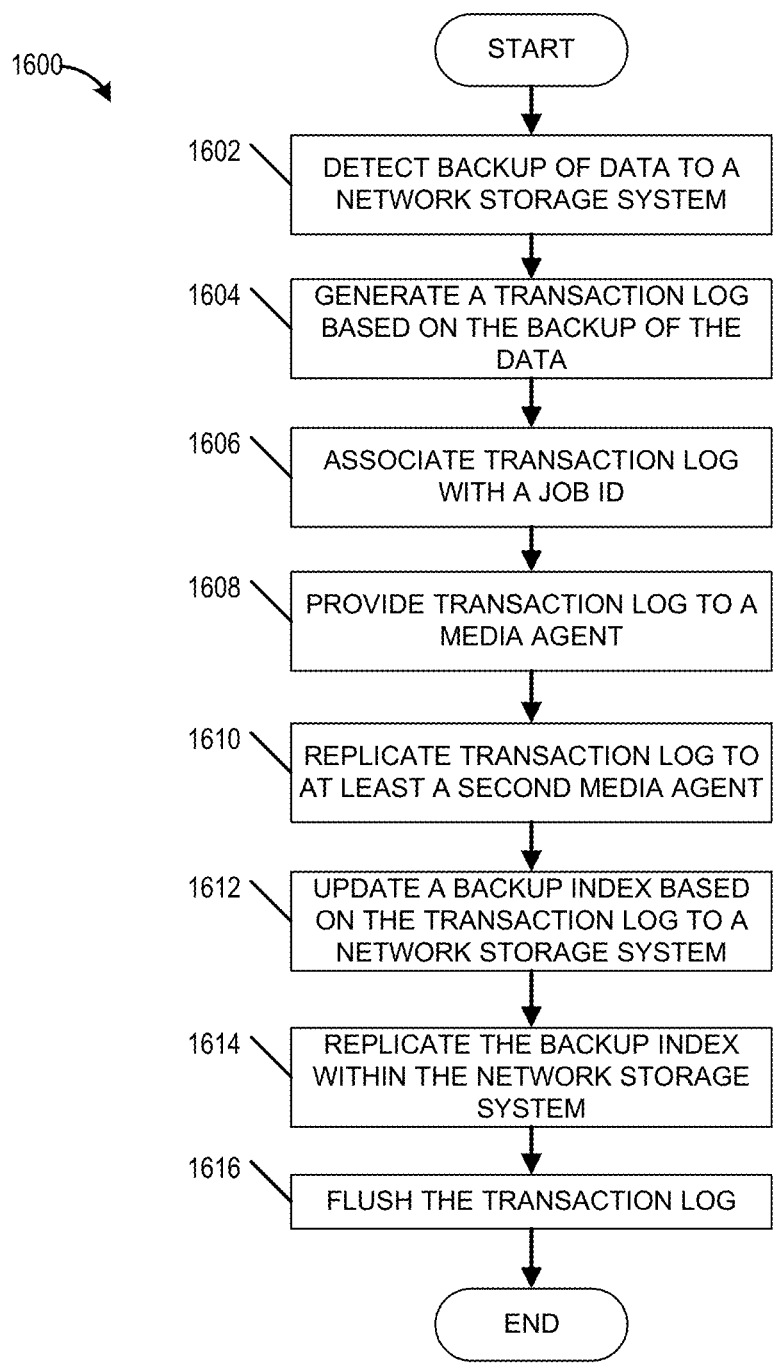
FIG. 16 depicts operations of a transaction log based indexing process 1600 according to an embodiment.

FIG. 16 depicts operations of a transaction log based indexing process 1600 according to an embodiment. The process 1600 can be implemented by any system that can generate or update a backup index associated with backing up a primary storage device to a secondary storage device using transaction log files. The process 1600, in whole or in part, can be implemented by, for example, a data agent 142, a cache manager 514, a log manager 1510, a media agent 144, or a core media agent 510, among others. Although any number of systems, in whole or in part, can implement the process 1600, to simplify discussion, the process 1600 will be described with respect to particular systems.

The process 1600 begins at block 1602 where, for example, the log manager 1510 detects backup of data to a network storage system 302. In some cases, a data agent 142 or a core media agent 510 may alert the log manager 1510 to performance of the backup process. Alternatively, or in addition, the log manager 1510 may determine occurrence of the backup process based on a backup schedule. In some cases, the backup process may be associated with a job identifier. This job identifier may be associated with the client computing device 102. As previously described, the job identifier and information associated with the job may be assigned or determined based at least in part on interaction with a storage manager 140.

At block 1604, the log manager 1510 generates a transaction log file 522 based at least in part on the backup of the data, or metadata associated with the backing up of the data. The metadata used to generate the transaction log file 522 may include any information associated with the files being backed up, the backup process, the location of the files at the network storage system 302 or the secondary storage devices 526, attributes of the files being backed up, information relating to changes in the files being backed up, or any other information that could facilitate maintaining a backup or accessing files from a backup. In some cases, the backup metadata is provided to a media agent 144, which may generate the transaction log file 522 in place of the log manager 1510.

In some cases, the block 1604 may include generating multiple transaction log files 522. For example, in some cases, a different transaction log file 522 may be generated for each file backed up or for each set of files backed up. In some cases, a transaction log file 522 may be limited to a particular size. In some such cases, the block 1604 may generate multiple transaction log files 522 to accommodate backups or modifications to backups that exceed the size of what may be recorded in a particular transaction log file 522. Advantageously, in some cases, by limiting the size of a transaction log file 522 and/or by limiting the amount of data or sets of files that are associated with a particular transaction log file 522, communication and/or distribution of the transaction log files 522 at the secondary storage subsystem 118 may be performed more quickly or efficiently compared to the generation of a single transaction log file.

At block 1606, the log manager 1510 associates the transaction log file 522 with a job identifier. The job identifier may be in identifier assigned to the client computing device 102 by storage manager 140. In some cases, the job identifier is associated with a particular job performed or initiated by the client computing device 102. In other cases, the job identifier is associated with a set of jobs or with the client computing device 102 for a period of time. Thus, in some cases, the job identifier may be associated with multiple transaction log files 522 that may be generated as part of different jobs or during different periods of time.

At block 1608, the log manager 1510 provides the transaction log file 522 to a media agent 144. Alternatively, as described above, the log manager 1510 may provide backup metadata relating to the backup process to the media agent 144. The media agent 144 may then generate one or more transaction log files 522 based at least in part on the backup metadata. Whether providing a transaction log file 522 or backup metadata to the media agent, the log manager 1510 may determine the media agent to receive the transaction log file 522 or the backup metadata-based on information stored at the job cache 516 and/or information provided by the storage manager 140. For example, the storage manager 140 may assign a media agent to facilitate performing data management tasks on behalf of the client computing device 102. The media agent 144 may store the transaction log files 522 at the transaction log file repository 520.

At block 1610, the media agent 144 replicates the transaction log file 522 to at least a second media agent 1544. Replicating the transaction log file 522 may include providing a copy of the transaction log file 522 to the media agent 1544 or a secondary storage computing device 1506 that hosts the media agent 1544. Further, the block 1610 may include providing a copy of the transaction log file to one or more additional media agents or secondary storage computing devices. In some cases, the media agent 144 selects one or more media agents to receive the transaction log file 522 based at least in part on an identity of the client computing device 102 or a job identifier associated with the transaction log file 522.

At block 1612, the media agent 144 updates a backup index 1540 based at least in part on the transaction log file 522 at a network storage system 1502. Operations associated with the block 1612 may be performed during some period of time that is later than the period of time during which operations associated with the blocks 1602 through 1610 are performed. In some cases, operations associated with the blocks 1602 through 1610 may be performed multiple times prior to performance of operations associated with the block 1612. For example, multiple transaction log files 522 may be provided to the media agent 144 during multiple performances of the operations associated with the block 1608 prior to performance of operations associated with the block 1612. In some cases the multiple transaction log files 522 may be provided during different time periods. Thus, for example, a first transaction log file 522 may be received at time T0, a second transaction log file 522 may be received at time T1, a third transaction log file 522 may be received at a time T2, and at a time T3 performance of operations associated with the block 1612 may be performed.

Operations associated with the block 1612 may be performed periodically or at a scheduled time. Alternatively, or in addition, operations associated with the block 1612 may be performed after a job initiated by the client computing device 102 is completed. For example, performance of operations associated with the block 1612 may be delayed until a particular backup is completed at the network storage system 302. The backup may be a full backup or a differential backup. In some cases, operations associated with the block 1612 may be performed after a job identifier has expired or after receiving an indication from the client computing device 102 that a particular job has completed.

Updating the backup index 1540 may include modifying entries within the backup index 1540 based on the information included in the transaction log file 522. In some cases, portions of the backup index 1540 are replaced with the information included in the transaction log file 522. In other cases, modifications to entries within the backup index 1540 are performed based on data within the transaction log file 522. During one non-limiting example, during a backup, a file that has been modified at the primary storage device 104 may be copied to the secondary storage device 526. Copying the modified file to the secondary storage device 526 may include updating and address of the file at the secondary storage device 526 to point to the modified file in place of the previously stored file. The updated address to the modified file may be included as part of a transaction log file 522. When the backup index 1540 is updated, and entry associated with the previously stored file may be modified or replaced based on the updated address of the modified file at the secondary storage device 526 as specified within the transaction log file 522.

In some cases, the block 1612 may include generating a new backup index 1540. For example, during the first occurrence of the process 1600 for a particular client computing device 102, a backup index 1540 may not yet exist. In this example, the transaction log file 522 or a set of transaction log files 522 received during initial performance of the process 1600 may be used to generate a new backup index 1540 at the block 1612.

Updating of the backup index 1540 may be caused or controlled by the media agent 144 that initially receives the transaction log file 522. In other words, in some cases, the one or more secondary media agents that receive replicated copies of the transaction log file 522 may not necessarily be involved in the updating of the backup index 1540. However, in some cases, a different media agent than the media agent that receive the transaction log files from the client computing device 102 may cause the backup index 1540 to be updated based on the transaction log files. For example, if the media agent 144 becomes inaccessible at a time when the backup index 1540 is to be updated, one of the fallback media agents that have received a copy of the transaction log files 522 may cause the backup index 1540 to be updated.

At block 1614, the network storage system 1502 replicates the backup index 1540 within the network storage system 1502. Replicating the backup index 1540 may include causing the network storage system 1502 to make a copy of the backup index 1540 at multiple index repositories 1522, 1524. For example, the backup index 1540 may be replicated as the backup index 1542. Thus, the backup index 1542 may be the same as the backup index 1540. Further, although the network storage 1502 is illustrated as having only two index repositories 1522, 1524, the network storage system 1502 may have more than two index repositories. Thus, the block 1614 may include replicating the backup index at a plurality of index repositories. In some cases, the backup index 1540 may be replicated at multiple index repositories, but not necessarily all of the index repositories of the network storage system 1502. In some cases, the media agent 144 causes the backup index 1540 to be replicated within the network storage system 1502. The network storage system 1502 may implement a database system that performs automatic replication, in such cases, replication of the backup index 1540 may occur automatically without additional interaction by the media agent 144.

At block 1616, the media agent 144 flushes the transaction log file 522. The block 1616 may include flushing the transaction log files 522 at each secondary storage computing device or media agent that is received a copy of the transaction log files 522. Flushing the transaction log files 522 may include deleting the transaction log files 522, marking the transaction log files 522 as expired or out of date, or performing any other process that indicates that the transaction log files 522 are no longer current. In some cases, the block 1616 may be limited to flushing transaction log files 522 that have been used to update or create a backup index 1540 at the block 1612. Additional transaction log files that may exist that were not involved in the generating or updating of the backup index 1540 may be preserved. For example, transaction log files 522 associated with a different backup index 1540 or that of been received after triggering of the backup index 1540 update may be preserved until such time as the transaction log files have been used to update or generate a backup index 1540.

Second Example Media Agent Restoration Process

Figure 17:
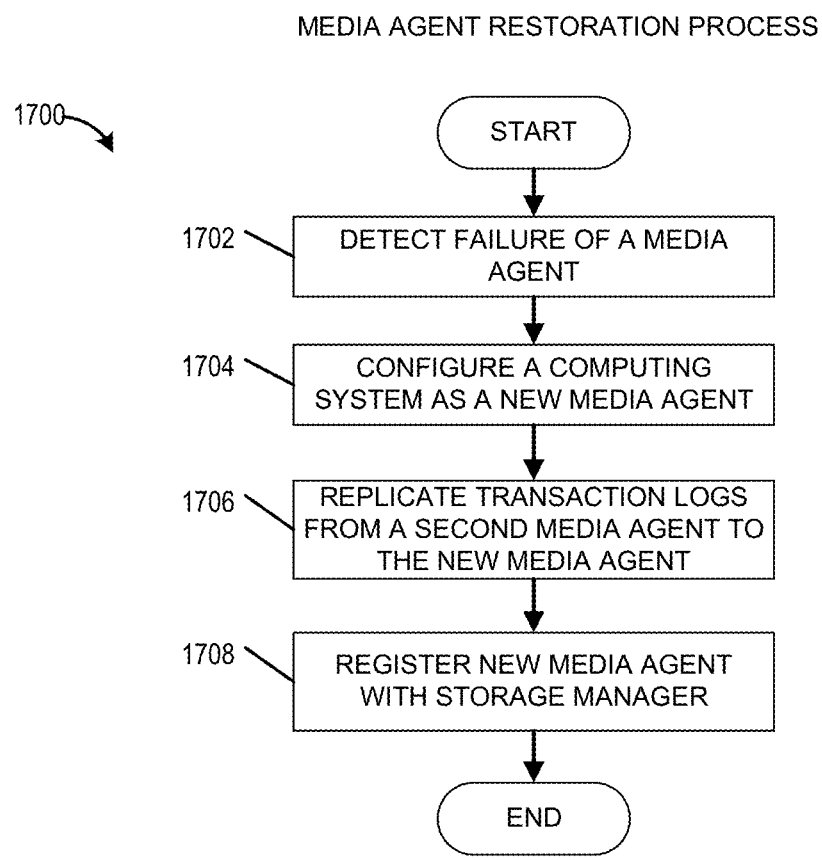
FIG. 17 depicts operations of a media agent restoration process 1700 according to an embodiment.

FIG. 17 depicts operations of a media agent restoration process 1700 according to an embodiment. The process 1700 can be implemented by any system that can add a new media agent to a secondary storage system 118 or replace a media agent at the secondary storage system 118. The process 1700, in whole or in part, can be implemented by, for example, a storage manager 140 or a secondary storage computing device 106, among others. Although any number of systems, in whole or in part, can implement the process 1700, to simplify discussion, the process 1700 will be described with respect to particular systems.

The process 1700 begins at block 1702 where, for example, the storage manager 140 detects a failure of a media agent 144 at the secondary storage system 118. The block 1702 may include one or more of the embodiments previously described with respect to the block 1002. In some cases, as previously described with respect to the block 1002, the storage manager 140 may determine that a new media agent should be configured or generated based on criteria other than the failure of the media agent 144. For example, scaling of the information management system 100 may cause an additional media agent to be added. In some cases, the block 1702 may include detecting a failure of a secondary storage computing device 106 that hosts the media agent 144.

At block 1704, the storage manager 140 configures or causes to be configured a computing system as a new media agent or to host a new media agent. In some embodiments, the block 1704 may include one or more of the embodiments previously described with respect to the block 1004.

At block 1706, the storage manager 140 replicates transaction log files 522 from a second media agent 1544 to the new media agent. In some cases, the block 1706 is performed by another media agent or a secondary storage computing device instead of or in addition to the storage manager 140. In some cases, the storage manager 140 identifies which media agent the new media agent is replacing. By identifying the media agent being replaced, may be determined which transaction log files 522 two copy to the new media agent. For instance, in some implementations, a subset of secondary storage computing devices or media agents may be configured to process or store transaction log files 522 associated with a subset of client computing devices of the primary storage subsystem 117. In such implementations, may be desirable to determine which media agent is being replaced by the new media agent so as to determine which subset of transaction log files 522 are to be replicated to the new media agent being added as part of the block 1704. In other cases, each media agent stores a copy of all transaction log files 522 regardless of whether the media agent receives the transaction log files 522 directly from the client computing device 102 or from another media agent to serve as a backup to the media agent providing the transaction log files 522. In such cases, the newly added media agent may automatically receive a copy of the transaction log files 522 within the secondary storage subsystem 118 upon configuration of the new media agent.

A block 1708, the new media agent is registered with the storage manager 140. In some embodiments, the block 1708 may include one or more of the embodiments previously described with respect to the block 1014. Registering the new media agent may include providing access information of the media agent to one or more client computing devices of the primary storage subsystem 117. In other cases, the new media agent may be configured with the same access information and the same network address information as the media agent being replaced. In such cases, the client computing device 102 make communicate with the new media agent without receiving any updated information and/or without realizing that the media agent with which it is communicating is not the same media agent as it was previously communicating.

Example Secondary Storage Access Process

Figure 18:
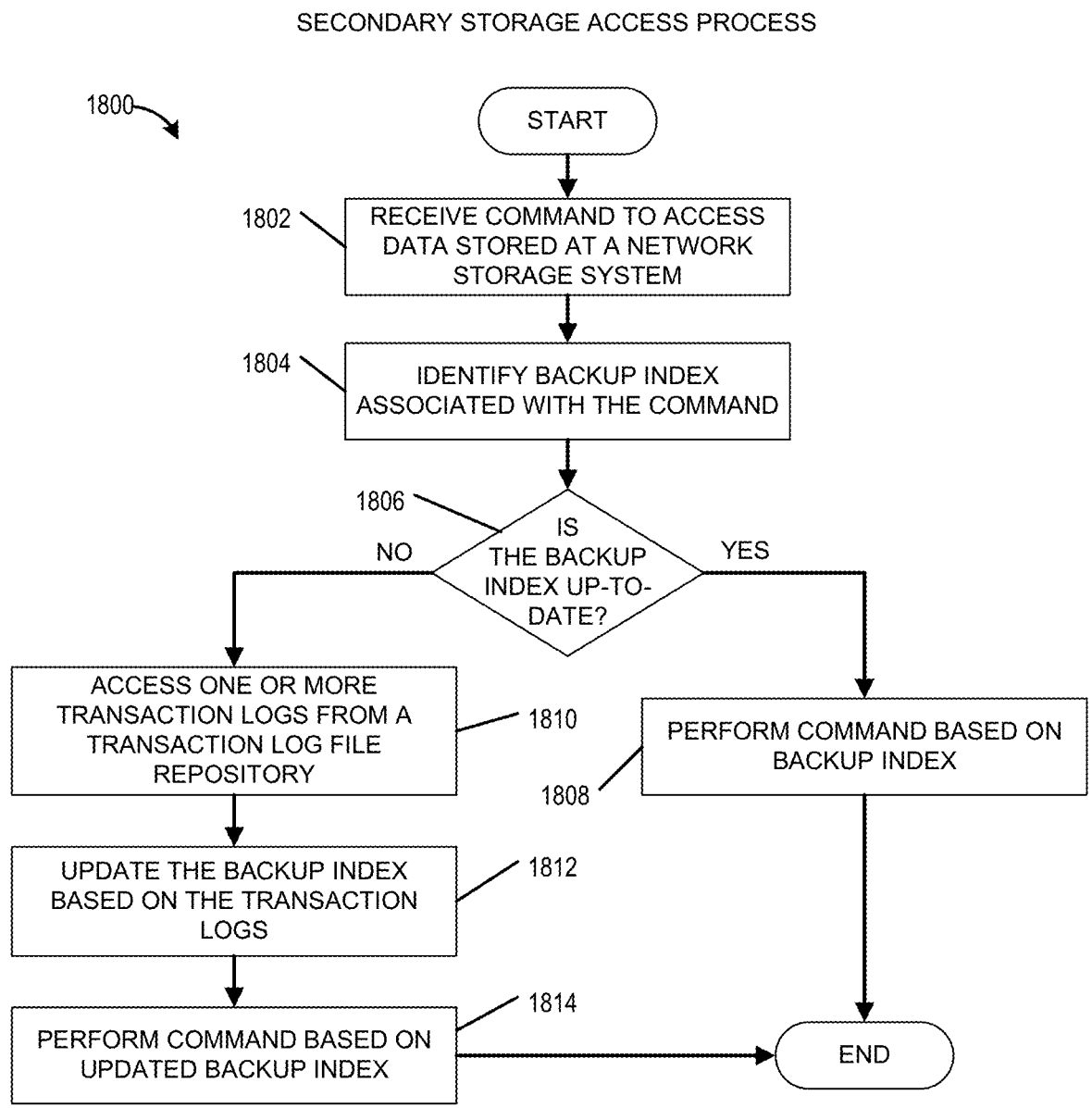
FIG. 18 depicts operations of a secondary storage access process 1800 according to an embodiment.

FIG. 18 depicts operations of a secondary storage access process 1800 according to an embodiment. The process 1800 can be implemented by any system that can access data from a secondary storage device at a secondary storage subsystem 118 and/or a network storage system 302. The process 1800, in whole or in part, can be implemented by, for example, a data agent 142, a cache manager 514, a log manager 1510, a media agent 144, or a core media agent 510, among others. Although any number of systems, in whole or in part, can implement the process 1800, to simplify discussion, the process 1800 will be described with respect to particular systems.

The process 1800 begins at block 1802 where, for example, the media agent 144 receives a command to access data stored at a network storage system 302. In some cases, the command may be a restore command to restore data from a backup at the secondary storage device 526. In other cases, the command may include any type of command that causes data to be accessed at the network storage system 302. For example, the command may be an archive command, a duplication command, a command to view data, or any other command that causes access of the data. In some cases, the command may be related to accessing the backup index and may or may not include accessing data at the secondary storage device 526.

At block 1804, the media agent 144 identifies a backup index associated with the command. Identifying the backup index may include identifying a job identifier associated with the command and/or a job identifier associated with a client computing device 102 that provided the command to the media agent 144. The media agent 144 may access the backup index from the network storage system 1502 or the index repository 1522 based on the job identifier that is identified or determined at the block 1804. In some cases, the backup index is associated with the client computing device 102 or the primary storage device 104 rather than the command itself. However, in some such cases, the backup index may be identified based on information included with the command.

At decision block 1806, the media agent 144 determines whether the backup index identified at the block 1804 is up-to-date. Determining whether the backup index is up-to-date may include determining whether any transaction log files 522 associated with the backup index exist. Determining whether any transaction log files 522 associated with the backup index exist may include determining whether any transaction log files 522 have not been applied to the backup index or have not been used to update the backup index. Further, determining whether any transaction log files 522 exist may include determining whether any transaction log files 522 associated with the job identifier, the client computing device 102, or the primary storage device 104 exist. Generally, although not necessarily, the same information used at the block 1804 to identify the backup index may be used to determine whether any transaction log files 522 exist or have not been applied to the backup index. As indicated above, in some cases transaction log files 522 may exist, but may have already been applied or used to update a backup index. In some such cases, it may be determined that the transaction log files 522 of been applied or used to update the backup index based on a marker, a label, a tag, metadata in the transaction log file repository 520 associated with the transaction log files 522, or any other information that may be used to determine that a transaction log file 522 was previously used to update the backup index.

If it is determined at the decision block 1806 that the backup index is up-to-date, the media agent 144 performs the command based at least in part on the backup index at block 1808. Performing the command may include accessing the backup index, providing access to the backup index to the client computing device 102, accessing the secondary storage device 526 based at least in part on the backup index, or any other action or operation that may be performed in response to receipt of the command at the block 1802.

If it is determined at the decision block 1806 that the backup index is not up-to-date, the media agent 144 accesses one or more transaction log files 522 from a transaction log file repository 520 at block 1810. The one or more transaction log files 522 access from the transaction log file repository 520 may include any transaction log files 522 that are associated with the backup index. Transaction log files 522 that are not associated with the backup index may be excluded from performance of the block 1810. Accessing the transaction log files 522 may include performing any of the operations for identifying the transaction log files as previously described with respect to the decision block 1806. Further, accessing the transaction log files 522 may include loading or retrieving the transaction log files from the transaction log file repository 520. In some cases, the transaction log files 522 are accessed in a particular order. For example, the transaction log files 522 may be accessed in a chronological or reverse chronological order as they were received, generated, or stored at the transaction log files 520. In other cases, the transaction log files 522 may be accessed based on a sequence order determined from a tag, label, or other marker associated with the transaction log file 522 that indicates its order comparison to other transaction log files 522 stored at the transaction log file repository 520. Advantageously, by determining an order for the transaction log files 522, updates to the backup index may be applied in the same order that changes to data stored at the network source system 302 are performed.

At block 1812, the media agent 144 updates the backup index based at least in part on the transaction log files 522. Updating the backup index may include modifying or replacing one or more entries in the backup index based at least in part on the information included in the transaction log files 522. In some cases, the block 1812 may include one or more of the operations previously described with respect to the process 1600. For example, the block 1812 may include one or more of the operations associated with the block 1612. Further, the block 1812 may include replicating the updated backup index across multiple index repositories 1522, 1524 as previously described with respect to the block 1614. In addition, the block 1812 may include performing operations associated with the block 1616 including, for example, flushing the transaction log files 522 used to update the backup index as part of the block 1812.

At block 1814, the media agent 144 performs the command based at least in part on the updated backup index. The block 1814 may include one or more of the operations previously described with respect to the block 1808, but using the updated backup index.

Advantageously, embodiments described herein as well as the process 1800 enables data to be accessed at the network storage system 302 without the use of the storage manager 140. For example, the association of the backup index with a job identifier that identifies a specific client computing device 102 enables the backup index to be identified without accessing a storage manager 140. Further, the ability of the media agent 144 to determine whether the backup index is up-to-date and to update the backup index if it is not up-to-date without accessing the storage manager 140 enables data to be accessed at the network sure system 302 without communicating with the storage manager 140. Advantageously, the ability to perform data management and data processing tasks without accessing the storage manager enables the information management system 100 to be scale to support a greater number of client computing devices without adding additional resources to the storage manager 140 and/or the secondary storage subsystem 118.

Interrupted Backup Restoration

Backing up a primary storage device 104 may take a non-negligible amount of time. Often a user does not want to wait or cannot wait for the backup process to complete before disconnecting from a network or turning off the client computing device 102. Further, in some cases, unplanned interruptions may occur to a backup process. For example, a networking device or a computing device involved in the backup or in the communication between the client computing device 102 and the network storage system 302 may fail. As another example, an unexpected power outage may occur. It is generally not desirable to restart a backup process from the beginning when the backup process is interrupted. A backup process managed by a storage manager 140 or a media agent 144 can monitor the progress of a backup at a secondary storage computing device 106 enabling an interrupted backup to be restarted at, or within a threshold period of time, of the point of interruption in the backup process.

However, as previously described, it is sometimes desirable to have the client computing device 102 communicate directly with the network storage system 302 and to at least partially manage backup through a core media agent 510 so as to reduce the burden on the storage manager 140 and/or the secondary storage subsystem 118, thereby facilitating scaling up of the number of client computing systems supported by the information management system 100.

Thus, it is desirable to have the client computing device 102 monitor a restart point in a backup process to enable the client computing device 102 to manage a backup process while reducing the burden on the storage manager 104 and/or the secondary storage subsystem 118. Certain embodiments disclosed herein enable the client computing device 102 to determine a restart point for an interrupted backup by monitoring a position in a collect file that identifies files to be backed up. The collect file may be periodically updated upon determination that a backup index and/or transaction log file has been generated or updated to reflect a commit status of files or chunks within a network storage system 302.

Figure 19:
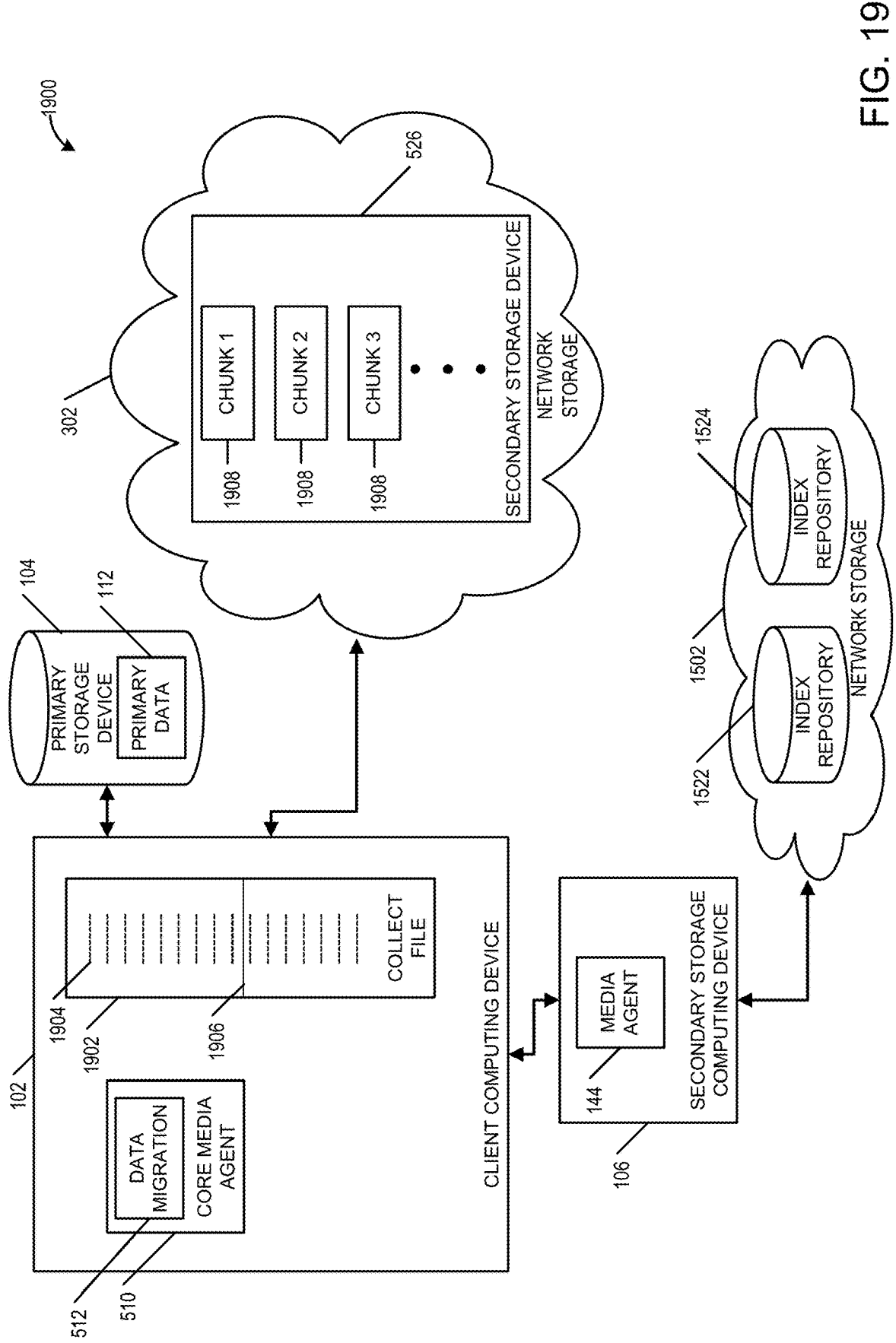
FIG. 19 is a block diagram illustrating portions of a system 1900 using a commit process to restore an interrupted backup without interacting with a storage manager enabling an increase in the number of clients supported by an information management system, according to an embodiment.

FIG. 19 is a block diagram illustrating portions of a system 1900 using a commit process to restore an interrupted backup without interacting with a storage manager enabling an increase in the number of clients supported by an information management system, according to an embodiment. In some embodiments, the system 1900 can be part of an information management system 100 and may include one or more of the systems and one or more of the embodiments previously described with respect to the information management system 100. Moreover, in certain embodiments, the system 1900 includes one or more of the embodiments described with respect to the systems 500, 575, 1100, and/or 1500.

The client computing device 102 may include a collect file 1902. This collect file 1902 may be generated or maintained by the core media agent 510 during occurrence of a backup process to backup primary data 112 stored at the primary storage device 104. The core media agent 510 may backup the data to a secondary storage device 526 at a network storage system 302.

During the backup process, the core media agent 510 may generate and/or populate a collect file 1902 with a list of files 1904 to be backed up. Although only one dashed line is labelled with the reference 1904, it should be understood that each dashed line within the collect file 1902 may represent a file or data to be backed up. Further, the collect file 1902 is not limited to the number of files (or dashed lines) represented in the example of FIG. 19. The collect file 1902 may include an identity of more or fewer files.

The files listed in the collect file 1902 may be listed in a backup order, or an order in which the files are to be backed up at the network storage system 302. The order in which the files are backed up may be random (or pseudorandom), based on a modification time of the file, based on a backup policy associated with the client computing device 102 or the information management system 1900, based on a frequency of access of the file, based on an identified important of the file, or based on any other factor that may affect the order in which files are backed up to the network storage system 302.

The collect file 1902 may track a restart point 1906 for restarting an interrupted backup. Although the collect file 1902 may list files to be backed up, the network storage device 526 may backup or store the files in chunks. As previously explained, the use of fixed-size chunks can increase communication and storage efficiency. Although chunks may be a fixed size, which may vary based on a configuration of the network storage system 302, the information management system 1900, or user settings, files may be of varying size. Thus, each chunk 1908 that is written to the secondary storage device 526 may include different numbers of files and, in some cases, portions of files. Accordingly, as files are written, and/or committed, to the secondary storage device 526, the restart point 1906 may be adjusted non-uniformly based on the number of files committed in a particular chunk 1908. For example, after chunk 1 is committed, the restart point 1906 may be adjusted down five files, and after chunk 2 is committed, the restart point 1906 may be adjusted down a further 3 or 7 files. In other cases, each chunk is configured to include a uniform number of files. In some such cases, where the files are of different sizes, space may remain unused in a chunk. Further, in such cases, as each chunk may include the same number of files, the restart point 1906 may be adjusted a uniform amount after each chunk 1908 is committed. For example, if each chunk 1908 includes ten files, the restart point may be adjusted down ten files in the collect file 1902 after each chunk 1908 is committed.

Example Backup Tracking Process

Figure 20:
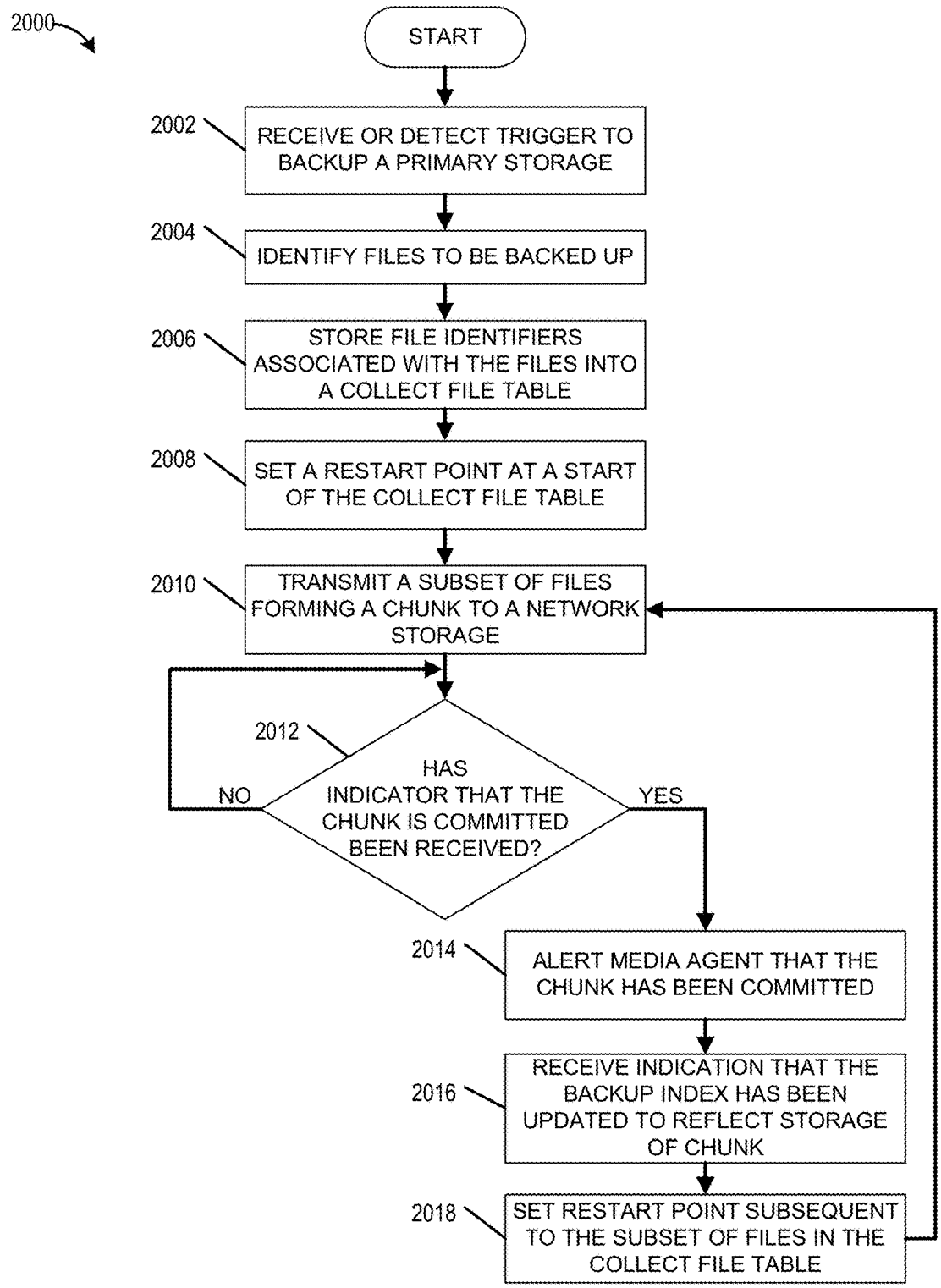
FIG. 20 depicts operations of a backup tracking process 2000 according to an embodiment.

FIG. 20 depicts operations of a backup tracking process 2000 according to an embodiment. The process 2000 can be implemented by any system that can perform a backup process from a primary storage device 104 to a secondary storage subsystem 118 or a network storage system 302, and that can maintain a restart point during the backup process so as to restart the interrupted backup at the last confirmed chunk. The process 2000, in whole or in part, can be implemented by, for example, the client computing device 102, a data agent 142, a cache manager 514, a log manager 1510, a secondary storage device 526, a network storage system 302, a media agent 144, or a core media agent 510, among others. Although any number of systems, in whole or in part, can implement the process 2000, to simplify discussion, the process 2000 will be described with respect to particular systems.

The process 2000 begins at block 2002 where, for example, the core media agent 510 receives or detects a trigger to back up a primary storage device 104. The trigger may include any type of trigger that causes a backup process to occur or be initiated. For example, the trigger may include a change in files stored at the primary storage device 104, receipt of a command, or a passage of time. In some cases, the trigger may be based on a schedule, such as a scheduled backup process that occurs regularly or intermittently. In some cases, the block 2002 may include one or more of the embodiments previously described with respect to the block 802.

In some cases, the frequency with which a client computing device 102 is backed up, or the frequency with which a trigger occurs to back up the primary storage device 104, may be based at least in part on usage of the client computing device 102. For example, a client computing device that is used more frequently or that includes data that is accessed or modified more frequently may be backed up more frequently than a client computing device that is used less frequently.

In some cases, a backup schedule is generated for the client computing device 102 based at least in part on a prediction function or parameter model. The prediction model may be used to determine the frequency with which a backup process should be triggered. In some cases, the prediction model may predict how often a threshold amount of data or files may be generated or modified a particular primary storage device 104 associated with a particular client computing device 102. Based on the predicted frequency that the threshold amount of data or files are generated or modified, a backup schedule may be generated for the client computing device 102.

The prediction function or parameter model may be generated using a machine learning algorithm. Historical data associated with the client computing device 102, other computing devices of the primary storage subsystem 117 or other computing devices having the same role or classified similarly to the client being device 102 may be supplied to the machine learning algorithm to generate the prediction function. In some cases, the historical data provided to the machine learning algorithm may include a profile that is generated for the client computing device 102. The profile may, for example, be generated for the client computing device 102 based at least in part on a user that is assigned to the client computing device 102 or who uses the client computing device 102, the role of the user (e.g., a salesperson, an engineer, an administrator, an executive officer, an administrative assistant, etc.) that accesses the client computing device 102, the role of the client computing device 102 (for example, is a regularly used device, as a loaner or temporary device, or as a device included in a particular department of an entity (e.g., sales, billing, marketing, engineering, etc.)). In some cases, the profile may include historical access information for the client computing device 102 and/or for a user accessing the client computing device 102. This historical access information may include information about the types of files accessed, the frequency with which the files are accessed, the frequency with which modifications are made to accessed files, or any other information that may be used to estimate an amount of changes or additions of data that may be made over a particular time period with respect to the client computing device 102. Further, the profile may include a frequency with which a threshold amount of data at the client computing device 102, or other computing devices, is generated or modified. Based on the profile information and/or other historical data, machine learning algorithm may generate the prediction function, which may be used to predict a backup schedule for a particular client during device 102.

At block 2004, the core media agent 510 determines the files to back up. Determining the files to back up may include accessing metadata associated with the files. Further, determining files to back up may include determining files that have been modified, files included in directories that have been modified, files included in directories that include a file that has been modified, files included in particular directories regardless of whether the files have been modified, files that have not been backed up for more than a threshold period of time, files associated with a particular user (e.g., files having a particular author or owner), or files associated with any other characteristic that may be used to determine whether a file is to be backed up.

Determining the files to back up may also include determining the distribution of files among chunks. In some cases, the core media agent 510 may assign one or more files to a particular chunk. The core media agent 510 may determine the files to assign to the chunk based on a number of criteria. At least some of the criteria may be based on whether the chunk is limited to a particular size or must satisfy a particular size. For example, if the chunk size is 4 GB, the core media agent 510 may assign 4 GB of files to a first chunk. If additional files are to be backed up, the core media agent 510 may assign the additional files to one or more additional chunks. If, in the example of a 4 GB chunk size limit, there are less than 4 GB files to be backed up, or if the remainder of files left to be backed up is less than 4 GB, the chunk size may be less than 4 GB. Alternatively, the chunk may be filled with placeholder data to satisfy the 4 GB chunk size.

In some cases, the criteria for determining the files to include in a particular chunk may be based on where the files are stored in the primary storage device 104 (e.g., the particular directory), the application that created the files, how frequently the files are accessed, an importance assigned to the files, or any other criteria that may be used to determine the chunk to assign a file. In some cases, the core media agent 510 may assign files to a chunk in access order, which may be determined by the order the files were created, edited, or stored, or an alphanumeric order for a name or identifier number assigned to the file. In some cases, the core media agent 510 may assign files to a chunk randomly or pseudo-randomly. In certain embodiments, the core media agent 510 may identify the files for back up, but may not allocate the files to a particular chunk. Instead, the files may be sent to the network storage system 302, which may determine the distribution or assignment of the files to one or more chunks. In some such cases, the network storage system 302 may inform the core media agent 510 as to which chunk or chunks a particular file is stored enabling the chunk information to be added to the collect file 1902 and/or to a backup index identifying the location of backed up files.

At block 2006, the core media agent 510 stores file identifiers associated with the files identified at the block 2004 at a collect file table 1902. The collect file table 1902 may be a table that stores the identifier of files to be backed up. Alternatively, or in addition, the collect file table 1902 may include any other type of data structure that may track files to be backed up. The file identifiers may include a name of a file, a unique file number or other ID value, a storage location of the file, or any other information that may serve as a unique identifier for the file. In some cases, the collect file table 1902 may store an indication of which chunk each file is assigned. For example, the collect file table 1902 may identify that the first three files 1904 are included in chunk 1 1908, that the next four files 1904 are included in chunk 2 1908, and so on and so forth. In some cases, a file may be split among multiple chunks due to the size of the file and/or the size limits of the chunk. In some such cases, the collect file table 1902 may identify each chunk that includes a portion of the file or may identify the first chunk that includes a portion of the file (such as the first portion of the file).

At block 2008, the core media agent 510 sets a restart point 1906 at the start of the collect file table 1902. Setting the restart point 1906 may include storing an address, a link, a locator, or any other location information identifying a portion or location within the collect file table 1902. In some cases, the restart point 1906 may be stored in a register of the client computer device 102. In some cases, the restart point 1906 is not necessarily set at the start of the collect file table 1902, but may be set at some location that facilitates tracking the progress of the backup process with respect to the files to be backed up. For example, the restart point 1906 may be set at the end of the collect file table 1902 and may be decremented as files are backed up.

At block 2010, the client computing device 102 transmits a subset of files forming a chunk 1908 to a network storage system 302. Transmitting the subset of files to the network storage system 302 may include streaming the files or otherwise transmitting the files over a network using one or more data packets. As described above, the core media agent 510 may track which files are included in a particular chunk. Accordingly, the client computing device 102 may stream or transmit files a chunk at a time. As a chunk is usually larger than a data packet, streaming files a chunk at a time may include streaming multiple data packets that are associated with the chunk.

In some cases, the core media agent 510 is unaware, or initially unaware, of what files constitute a chunk 1908 or are included in a specific chunk 1908. In some such cases, the files are transmitted or streamed to the network storage system 302, and the network storage system 302 determines which chunk 1908 to store particular files received from the client computing device 102. In some such cases, the core media agent 510 may be informed by the network storage system 302 of which files are included in a particular chunk. In some cases, a file may be split among multiple chunks 1908. Further, a chunk 1908 may include portions of multiple files.

Typically, data packets generally carry significantly less information than is included in a file or a chunk 1908. Therefore, the subset of files may be transmitted over a plurality of data packets. Thus, in some cases, a portion of a chunk 1908 may be written as files are received at the network storage system 302, but something may occur to interrupt the transmission and/or a writing of the portion of the chunk 1908. Accordingly, in some cases, the transmission of the subset of files by the client computing device 102 may, on its own, be an insufficient basis for modifying the restart point 1908. Thus, in certain cases, additional interaction between the network storage system 302 and the core media agent 510 may be necessary to determine whether a file has been successfully backed up or whether he chunk 1908 has been committed. In certain cases, the indication that chunk 1908 has been committed at a secondary storage device 526 may include a indication that the chunk 1908 has been successfully stored. Further, an indication that the chunk 1908 has been committed may include an indication of where the chunk 1908 is stored within the network storage system 302.

At decision block 2012, the core media agent 510 determines whether an indicator, which may be referred to as a "commit indicator," that the chunk 1908 has been committed has been received. The commit indicator may be a form of acknowledgment provided by the network storage system 302 to acknowledge receipt and storage of a file within a chunk 1908 at the secondary storage device 526. The commit indicator may be received from the network storage system 302 upon a chunk 1908 being committed. In some cases, the commit indicator may include an address of where the chunk 1908 is located at the network storage system 302. For example, the commit indicator may include a storage address at one of the secondary storage devices 526. The storage address may be provided to the media agent 144 or the log manager 1510 to facilitate generating a transaction log file 522 and/or a backup index. Alternatively, or in addition, the storage address of the chunk 1908 may be transmitted separately from or in conjunction with the commit indicator.

Further, in some cases, an identity of the files stored within the chunk 1908 may be provided by the network storage system 302 to the core media agent 510 or the client computing device 102. As previously indicated, in some cases, a file may be stored among multiple chunks. In some such cases, the identity of each chunk that includes a portion of a file, or an address of each chunk that includes a portion of the file, may be included with the commit indicator or may be transmitted separately from the commit indicator from the network storage system 302 to the client computing device 102. In some other cases, only an indicator or address of a chunk that includes a first portion of the file is provided. In such cases, upon attempting to access the file by using the address that points to a chunk including a first portion of the file, the network storage system 302 may determine the chunks and include other portions of the file based at least in part on metadata stored at the network storage system 302. In some cases, the address of the chunk 1908 that includes a file or portion of a file is provided by the network storage system 302 directly to the media agent 144. In some such cases, the commit indicator may be provided to the client computing device 102 without providing a source location or address for the check 1908 to the client computing device 102. The commit indicator may be, or may include, an acknowledgement packet or receipt. This acknowledgement packet received from the network storage system 302 may indicate that the chunk has been successfully committed.

If it is determined at the decision block 2012 that the commit indicator has not been received, the process 2000 returns to the decision block 2012 to continue determining whether the commit indicator has been received. In some cases, the core media agent 510 may not actively determine whether the commit indicator has been received, but may instead proceed to the block 2014 upon receiving the commit indicator. In other words, in some cases, the receipt of the commit indicator may serve as a trigger that causes the process to proceed to the block 2014. In some cases, after a threshold period of time has passed without receipt of the commit indicator, an error process may be performed. The error process may include retransmitting some or all of the subset of files to the network storage 302, alerting an administrator regarding the failure to receive the commit indicator within the threshold period of time, alerting the network storage system 302 regarding the failure to receive the commit indicator, or any other error process that may be performed in response to failure to receive the commit indicator within the threshold time.

At block 2014, the core media agent 510 alerts the media agent 144 that the chunk has been committed. Alternatively, or in addition, the core media agent 510 may alert the log manager 1510 that the chunk has been committed. In some cases, alerting the media agent 144 that the chunk has been committed may include providing metadata indicating at least a storage location of the chunk 1908 or files included in the chunk 1908. In some cases, the metadata may be provided as part of a transaction log file 522 to the media agent 144. In other cases, the metadata may be provided as backup metadata to the media agent 144, which uses the backup metadata to generate a transaction log file 522.

At block 2016, the core media agent 510 receives an indication that the backup index has been updated to reflect the storage of the chunk 1908. The backup index may be updated based at least in part on backup metadata provided by the core media agent 510 to the media agent 144 and/or backup metadata provided by the network storage system 302 to the secondary storage subsystem 118. In some cases, some or all of the process 1600 may be performed after the media agent 144 is alerted that the chunk 1908 has been committed. Further, as part of performing the process 1600, indication that the backup index has been updated may be received as part of the block 2016.

At block 2018, the core media agent 510 sets the restart point to a point in the collect file table that is subsequent to the listing of the subset of the files transmitted at the block 2010. Further, the block 2018 may include generating transaction log files 522 based at least in part on the files included in the chunk 1908 indicated is being committed. After operations associate with the block 2018 or performed, the process 2000 may return to the block 2010 where additional files forming a chunk may be transmitted or may continue to be transmitted to the network storage system 302. Alternatively, if the restart point has reached the end of the collect file table 1902 indicating that all files have been transmitted to the network storage system 302, the backup process may be complete and the process 2000 may end.

Advantageously, if there is a failure during the backup process or if an event occurs that causes the backup process to be interrupted, the restart point may be used to resume the backup process upon the failure being resolved or the completion of the event that interrupted the backup process. For example, if a user turns off a client computing device 102 during a backup, upon the client computing device 102 being turned back on, the backup process may automatically resume beginning with the files in the collect file table 1902 following the restart point 1906. Similarly, if a network connection between the client computing device 102 and the network storage system 302 is interrupted, backup may automatically resume at the restart point upon the network connection being reestablished.

EXAMPLE EMBODIMENTS

Some example enumerated embodiments are recited in this section in the form of methods, systems, and non-transitory computer-readable media, without limitation.

One aspect of the disclosure provides a computer-implemented method of reducing storage manager overhead associated with secondary storage management of an information management system during backup. The computer implemented method comprises: as implemented by one or more hardware processors of the information management system, the one or more hardware processors configured with specific computer-executable instructions, accessing first backup metadata associated with backing up data from a first client computing system to a one or more secondary storage devices of a network storage system as part of a backup process, the first backup performed using a cached job identifier associated with the first client computing system; generating a first transaction log file based on the first backup metadata; providing the first transaction log file to a first media agent associated with the first client computing system; and replicating the first transaction log to at least a second media agent; determining occurrence of a trigger to update a backup index; accessing a set of transaction log files including the first transaction log file; updating the backup index based on the set of transaction log files; and flushing the set of transaction log files.

The method of the preceding paragraph can include any combination or sub-combination of the following features: where the method further comprises, prior to said flushing the set of transaction log files, replicating the backup index within a distributed index storage system; where the distributed index storage system is implemented at the network storage system; where flushing the set of transaction log files comprises deleting the set of transaction log files; where updating the backup index comprises identifying a backup index at the distributed index storage system associated with the first client computing system based on the job identifier assigned to the first client computing system; where the trigger to update the backup index comprises one or more of: an elapse of a period of time, an indication of completion of a backup job, the number of transaction log files added to the set of transaction log files satisfying a threshold; or receipt of a command to update the backup index; where updating the backup index comprises generating a new backup index; where the first media agent is implemented at a secondary storage computing system included in a secondary storage environment and the first client computing system is included in a primary storage environment of the information management system; where at least said generating the first transaction log file is performed by a core media agent at the first client computing system that is separate from the first media agent; where a second transaction log file associated with backup of a second client computing system is provided to the second media agent, and wherein the second transaction log file is replicated to the first media agent; where the method further comprises: detecting failure of a secondary storage computing system hosting the first media agent; configuring a computing system as a replacement secondary storage computing system; replicating the first transaction log from the second media agent to a replacement media agent hosted by the replacement secondary storage computing system; and registering the replacement media agent with a storage manager of the information management system; where the method further comprises receiving a request to access a backup index associated with the job identifier; determining that a set of transaction log files associated with the job identifier exist, the set of transaction log files including the first transaction log file; updating the backup index based at least in part on the set of transaction log files to obtain an updated backup index; and providing access to the updated backup index responsive to the request to access the backup index; and where the method further comprises flushing the set of transaction log files after updating the backup index.

Another aspect of the disclosure provides a system for reducing storage manager overhead associated with secondary storage management of an information management system. The system comprises a log manager and a first media agent. The log manager may be implemented by one or more hardware processors of a client computing system. The log manager may be configured to: access first backup metadata associated with backing up data from a primary storage device of client computing system to a network storage system as part of a backup process at a first time, the first backup performed using a cached job identifier obtained from a storage manager at a second time that is earlier than the first time; generate a first transaction log file based on the first backup metadata; and provide the first transaction log file to a first media agent at a first secondary storage computing system. The first media agent may be implemented by one or more hardware processors of the secondary storage computing system. Further, the first media agent may be configured to replicate the first transaction log to at least a second media agent hosted by a second secondary storage computing system.

The system of the preceding paragraph can include any combination or sub-combination of the following features: where the first media agent is further configured to: determine an occurrence of a trigger to update a backup index; access a set of transaction log files including the first transaction log file; update the backup index based on the set of transaction log files; replicate the backup index within a distributed index storage system; and flush the set of transaction log files; where the first media agent is further configured to cause the set of transaction log files to be flushed from the second media agent; where the first media agent determines the set of transaction log files to access based at least in part on the job identifier associated with the client computing system; where the system further comprises a storage manager configured to: detect failure of the secondary storage computing system implementing the first media agent; configure a computing system as a replacement secondary storage computing system; and replicate the first transaction log from the second media agent to a replacement media agent hosted by the replacement secondary storage computing system; where the storage manager is further configured to assign the replacement media agent to the client computing system as a replacement for the first media agent; and where the first media agent is further configured to: receive a request to access a backup index associated with the job identifier; determine that a set of transaction log files associated with the job identifier exist, the set of transaction log files including the first transaction log file; update the backup index based at least in part on the set of transaction log files to obtain an ' computing system comprising one or more hardware processors and configured with specific computer-executable instructions, obtaining a first storage manager query associated with querying a storage manager of an information management system as part of a backup process for backing up data of a primary storage of the client computing system to a secondary storage; generating a hash of the first storage manager query; accessing a query cache of the client computing system to determine whether the hash of the first storage manager query is located in the query cache; determining that the hash of the first storage manager query is not located within the query cache of the client computing system; providing the first storage manager query to the storage manager; receiving a query response from the storage manager responsive to providing the first storage manager query to the storage manager; and storing at least the hash of the first storage manager query and at least a portion of the query response at the query cache enabling a subsequent request for data associated with the query response to be processed without accessing the storage manager.

The method of the preceding paragraph can include any combination or sub-combination of the following features: where the cache manager is part of a data agent of the client computing system, the data agent configured to manage data associated with one or more applications executed by the client computing system; where the secondary storage is part of a network storage system that is external to the information management system; where the method further comprises: determining one or more additional storage manager queries associated with the first storage manager query; and aggregating the one or more additional storage manager queries with the first storage manager query to obtain an aggregate query, wherein providing the first storage manager query to the storage manager comprises providing the aggregate query to the storage manager; where the one or more additional storage manager queries are identified based at least in part on a probability that the one or more additional storage manager queries are issued within a threshold time period of the first storage manager query being issued; where the method further comprises: identifying a configuration category associated with the first storage manager query, the configuration category one of a plurality of configuration categories; and associating the hash of the first storage manager query with the configuration category at the query cache; where the configuration category may include one of: a storage policy; a sub-client configuration; a backup policy; or an access control policy; where the method further comprises: receiving an indication of a change to a configuration setting of the information management system; identifying a configuration category associated with the configuration setting of the information management system, wherein the configuration category is one of a plurality of configuration categories, and wherein each entry at the query cache corresponds to a different storage manager query that is associated with at least one configuration category of the plurality of configuration categories; and invalidating entries in the query cache associated with the configuration category while not invalidating entries in the query cache not associated with the configuration category; where the method further comprises: receiving an indication of a change in a job identifier associated with one or more storage management jobs; and invalidating the query cache; where the method further comprises providing the query response to a media agent to facilitate performing the backup process; where providing the query response to the media agent comprises providing the query response to a portion of the media agent hosted by the client computing system; where obtaining the first storage manager query comprises receiving the first storage manager query from a data agent of the client computing system as part of the backup process, the data agent configured to manage data associated with one or more applications executed by the client computing system; where obtaining the first storage manager query comprises generating the first storage manager query as part of the backup process; where generating the hash of the first storage manager query comprises generating the hash based on a portion of the first storage manager query that is unique to the first storage manager query; where the method further comprises obtaining a second storage manager query associated with querying the storage manager; generating a hash of the second storage manager query; determining that the hash of the second storage manager query is located within the query cache of the client computing system; and retrieving data associated with a response to the second storage manager query from the query cache of the client computing system without accessing the storage manager; and where the second storage manager query is a second instance of the first storage manager query.

Another aspect of the disclosure provides a system for reducing storage manager overhead associated with secondary storage management of an information management system. The system comprises a query cache and a cache manager. The query cache may be configured to at least store configuration data obtained from a storage manager of an information management system. The cache manager of a client computing system comprising one or more hardware processors and configured to: obtain a first storage manager query associated with querying the storage manager as part of a backup process for backing up data of a primary storage of the client computing system to a secondary storage, the first storage manager query including a request for configuration data of the information management system; generate a hash of the first storage manager query; access a query cache of the client computing system to determine whether the hash of the first storage manager query is located in the query cache; determine that the hash of the first storage manager query is not located within the query cache; provide the first storage manager query to the storage manager; receive a query response from the storage manager responsive to providing the first storage manager query to the storage manager, the query response including configuration data at least partially responsive to the first storage manager query; and store at least the hash of the first storage manager query and at least a portion of the query response at the query cache enabling a subsequent request for data associated with the query response to be processed without accessing the storage manager.

The system of the preceding paragraph can include any combination or sub-combination of the following features: where the system further comprises a data agent of the client computing system, and the data agent is configured to: generate the first storage manager query as part of the backup process to backup data managed by the data agent; and provide the first storage manager query to the cache manager; where the cache manager is further configured to: obtain a second storage manager query associated with querying the storage manager; generate a hash of the second storage manager query; determine that the hash of the second storage manager query is located within the query cache of the client computing system; and retrieve data associated with a response to the second storage manager query from the query cache of the client computing system without accessing the storage manager; and where the cache manager is further configured to: receive an indication of a change to a configuration setting of the information management system; identify a configuration category associated with the configuration setting of the information management system, wherein the configuration category is one of a plurality of configuration categories, and wherein each entry at the query cache corresponds to a different storage manager query that is associated with at least one configuration category of the plurality of configuration categories; and invalidate entries in the query cache associated with the configuration category while not invalidating entries in the query cache not associated with the configuration category.

One aspect of the disclosure provides a computer-implemented method of managing a job at a client computing system of an information management system. The computer-implemented method comprises: as implemented by a data agent within a client computing system comprising one or more hardware processors and configured with specific computer-executable instructions, detecting a trigger to perform a job at a secondary storage system; determining that an active job identifier does not exist for the client computing system; requesting a job identifier from a storage manager of an information management system; receiving the job identifier from the storage manager and a set of job metadata, wherein the set of job metadata comprises an identity of resources available to the client computing system to perform the job; storing the job identifier and the set of job metadata at a job cache of the client computing system, wherein the job metadata is associated with the job identifier at the job cache; and performing the job at the secondary storage system using at least some of the resources identified in the set of job metadata.

The method of the preceding paragraph can include any combination or sub-combination of the following features: where the job comprises a backup job that backs up data from the client computing system to the secondary storage system or a restore job that restores data from the secondary storage system to the client computing system; where determining that the active job identifier does not exist comprises determining that an existing job identifier at the client computing device has expired; where determining that the active job identifier does not exist comprises determining that a threshold number of errors associated with an existing job identifier at the client computing device has occurred; where the method further comprises designating the job identifier as expired when determining that the threshold number of errors associated with the existing job identifier have occurred; where the information management system comprises the client computing system and the secondary storage system; where the resources identified by the job metadata comprise one or more of filters that filter data to include as part of the job; a number of communication streams available for use by the client computing system to communicate with the secondary storage system; an identity of one or more secondary storage devices of the secondary storage system available to the client computing system; or one or more file scanning resources available to the client computing system; where performing the job at the secondary storage system comprises: storing data at a network storage system that is external to the information management system without communicating with a media agent of the secondary storage system; and providing index information associated with the data to the media agent of the secondary storage system; where the method further comprises: detecting a trigger to perform a second job at the secondary storage system; determining that the job identifier stored at the job cache remains active; accessing the job cache to determine the set of job metadata associated with the job identifier; and performing the second job at the secondary storage system using at least some of the resources identified in the set of job metadata without accessing the storage manager; where the method further comprises associating a plurality of jobs with the job identifier at the client computing system; where the storage manager is unaware of at least one job from the plurality of jobs associated with the job identifier for at least a period of time; where performing a batch update with respect to the storage manager, wherein the batch update comprises providing the storage manager at least a unique identifier of each job of the plurality of jobs associated with the job identifier; where the method further comprises receiving an updated set of job metadata associated with the job identifier from the storage manager; and updating the job metadata stored at the job cache based at least in part on the updated set of job metadata; and where the trigger comprises one or more of a scheduled job, a command, or a threshold amount of new or modified data at a primary storage of the client computing system.

Another aspect of the disclosure provides a system for managing a job at a client computing system of an information management system. The system comprises a data agent of a client computing system comprising one or more hardware processors. The data agent may be configured to: detect a trigger to perform a job at a secondary storage system; determine that an active job identifier does not exist for the client computing system; request a job identifier from a storage manager of an information management system; receive the job identifier from the storage manager and a set of job metadata; store the job identifier and the set of job metadata at a job cache; and perform the job at the secondary storage system based at least in part on the set of job metadata.

The system of the preceding paragraph can include any combination or sub-combination of the following features: where the data agent is further configured to determine that a threshold number of errors associated with the an existing job identifier at the client computing device has occurred; and designate the existing job identifier as unusable; where the secondary storage comprises one or more secondary storage devices and a network storage system; where the data agent is further configured to perform the job at the secondary storage system by: storing data at a network storage system without communicating with a media agent of the secondary storage system; and providing index information associated with the data to the media agent of the secondary storage system; where the data agent is further configured to: detect a trigger to perform a second job at the secondary storage system; determine that the job identifier stored at the job cache remains active; access the job cache to obtain the set of job metadata associated with the job identifier; and perform the second job at the secondary storage system using at least some of the resources identified in the set of job metadata without accessing the storage manager; and where the data agent is further configured to: receive an updated set of job metadata associated with the job identifier from the storage manager; and update the job metadata stored at the job cache based at least in part on the updated set of job metadata.

Another aspect of the disclosure provides a computer-implemented method of backing up a client computing system of an information management system. The computer implemented method comprises: as implemented by a data agent within a client computing system comprising one or more hardware processors and configured with specific computer-executable instructions, detecting a trigger to perform an instance of a backup process at a network storage system during a first time period; determining that the client computing system is capable of interacting with the network storage system during the first time period; backing up data from a primary storage of the client computing system using a core media agent at the client computing system as part of the instance of the backup process, wherein the data is backed up to the network storage system without accessing a media agent at a secondary storage system of the information management system; and providing backup metadata to the media agent at the secondary storage system without providing the data from the primary storage to the media agent.

The method of the preceding paragraph can include any combination or sub-combination of the following features: where the method further comprises: accessing a job cache to obtain job metadata; and determining based at least in part on the job metadata that the client computing system is capable of interacting with the network storage system; where the job metadata comprises access information for accessing the network storage system; where determining that the client computing system is capable of interacting with the network storage system comprises communicating a test packet to the network storage system; where determining that the client computing system is capable of interacting with the network storage system comprises determining that the client computing system is capable of interacting with the network storage system directly or via an external network without communicating with an intermediary system of the information management system; where the network storage system is external to the information management system; where the method further comprises detecting a trigger to perform a second instance of the backup process at the network storage system during a second time period that differs from the first time period; determining that the client computing system is not capable of interacting with the network storage system during the second time period; and providing data from the primary storage of the client computing system for backup as part of the second instance of the backup process to the media agent at the secondary storage system; where determining that the client computing system is not capable of interacting with the network storage system during the second time period comprises determining that the client computing system is not capable of providing data for backup to the network storage system without providing the data to the media agent at the secondary storage system; where the trigger comprises one or more of a scheduled backup, a command, or a threshold amount of new or modified data at the primary storage of the client computing system; where the method further comprises detecting a trigger to perform an instance of a restore process to restore data from the network storage system; retrieving a backup index from the media agent at the secondary storage system, the backup index created based at least in part on the backup metadata; and restoring, using the core media agent, the data from the network storage system based at least in part on the backup index without accessing the media agent to obtain the data when it is determined that the client computing system is capable of interacting with the network storage system during a restore time period; where the method further comprises restoring, using the media agent, the data from the network storage system based at least in part on the backup index to obtain the data when it is determined that the client computing system is not capable of interacting with the network storage system during the restore time period; and where backing up the data from the primary storage using the core media agent comprises writing the data to a memory space of the core media agent, wherein the core media agent provides the data written to the memory space of the core media agent to the network storage system for backup.

Another aspect of the disclosure provides a system for backing up a client computing system of an information management system. The system comprises a data agent of a client computing system comprising one or more hardware processors. The data agent may be configured to: detect a trigger to perform an instance of a backup process at a network storage system during a first time period; determine that the client computing system is capable of interacting with the network storage system during the first time period; back up data from a primary storage of the client computing system using a core media agent at the client computing system as part of the instance of the backup process, wherein the data is backed up to the network storage system without accessing a media agent at a secondary storage system of the information management system; and provide backup metadata to the media agent at the secondary storage system without providing the data from the primary storage to the media agent.

The system of the preceding paragraph can include any combination or sub-combination of the following features: where the data agent is further configured to: access a job cache to obtain job metadata; and determine based at least in part on the job metadata that the client computing system is capable of interacting with the network storage system; where the job metadata comprises access information for accessing the network storage system; where the data agent is further configured to: detect a trigger to perform a second instance of the backup process at the network storage system during a second time period that differs from the first time period; determine that the client computing system is not capable of interacting with the network storage system during the second time period; and provide data from the primary storage of the client computing system for backup as part of the second instance of the backup process to the media agent at the secondary storage system; where determining that the client computing system is not capable of interacting with the network storage system during the second time period comprises determining that the client computing system is not capable of providing data for backup to the network storage system without providing the data to the media agent at the secondary storage system; where the data agent is further configured to: detect a trigger to perform an instance of a restore process to restore data from the network storage system; retrieve a backup index from the media agent at the secondary storage system, the backup index created based at least in part on the backup metadata; and use the core media agent to restore the data from the network storage system based at least in part on the backup index without accessing the media agent to obtain the data when it is determined that the client computing system is capable of interacting with the network storage system during a restore time period; where the data agent is further configured to use the media agent to restore the data from the network storage system based at least in part on the backup index when it is determined that the client computing system is not capable of interacting with the network storage system during the restore time period; and where the data agent is further configured to back up the data from the primary storage using the core media agent by writing the data to a memory space of the core media agent enabling the core media agent to access the data for backup to the network storage system.

Another aspect of the disclosure provides a computer-implemented method of a multi-tiered backup indexing process of an information management system. The computer implemented method comprises: as implemented by a media agent within a secondary storage computing device comprising one or more hardware processors and configured with specific computer-executable instructions, receiving backup metadata from a client computing system undergoing a backup process at a first time period; generating a backup index based at least in part on the received backup metadata; receiving job metadata corresponding to a job performed with respect to the client computing system at a second time period; generating a transaction log file based on the job metadata, wherein the transaction log file comprises a reduced set of metadata compared to the backup metadata used to generate the backup index enabling faster processing of the transaction log file than the backup index; and updating the backup index based at least in part on the transaction log file at a period of time that occurs after completion of the job performed at the second time period.

The method of the preceding paragraph can include any combination or sub-combination of the following features: where the method further comprises: where the backup index comprises a full index associated with a full backup of the client computing system; where the backup index comprises a distributed index that is distributed across a plurality of media agents across a plurality of secondary storage computing devices; where the reduced set of metadata comprises file attributes of files undergoing the job performed with respect to the client computing system at the second time period; where the job performed with respect to the client computing system at the second time period comprises a backup job; where the backup job comprises one or more of a differential backup, a partial backup, a reduced backup, an archive operation, or a non-full backup; where the method further comprises storing one or more transaction identifiers of one or more transactions occurring subsequent to generating the transaction log file; where the method further comprises generating a second transaction log file at a third time period based at least in part on the one or more transaction identifiers for the one or more transactions occurring subsequent to generating the transaction log file; where the method further comprises discarding the one or more transaction identifiers after generating the second transaction log; where the method further comprises backing up the backup index and the transaction log file to a network storage system; where the backup index or the transaction log file is backed up at a different time period than data of a primary storage of a client computing system being backed up as part of the backup process; where updating the backup index comprises generating a new copy of the backup index that is updated based at least in part on the transaction log file; where generating the transaction log file based on the job metadata comprises generating a plurality of transaction log files based on the job metadata as the job metadata is received over a period of time associated with the second time period; and where the method further comprises storing the backup index and the transaction log file at an indexing system of a secondary storage system, the secondary storage system including the secondary storage computing device.

Another aspect of the disclosure provides a system for performing a multi-tiered backup indexing process of an information management system. The system comprises: a media agent of a secondary storage computing device comprising one or more hardware processors, the media agent configured to: receive backup metadata from a client computing system undergoing a backup process at a first time period; generate a backup index based at least in part on the received backup metadata; receive job metadata corresponding to a job performed with respect to the client computing system at a second time period; generate a transaction log file based on the job metadata, wherein the transaction log file comprises a reduced set of metadata compared to the backup metadata used to generate the backup index enabling faster processing of the transaction log file than the backup index; and update the backup index based at least in part on the transaction log file at a period of time that occurs after completion of the job performed at the second time period.

The system of the preceding paragraph can include any combination or sub-combination of the following features: where the media agent is further configured to store one or more transaction identifiers of one or more transactions occurring subsequent to generating the transaction log file; where the media agent is further configured to generate a second transaction log file at a third time period based at least in part on the one or more transaction identifiers for the one or more transactions occurring subsequent to generating the transaction log file; where the media agent is further configured to periodically backup, at a network storage system, backup indexes and transaction log files, wherein the backup indexes include the backup index and the transaction log files include the transaction log file; where data that is backed up as part of the backup process is backed up during a different period of time than the backup index generated based at least in part on the received backup metadata, wherein the backup index corresponds to the data that is backed up; and where the media agent is further configured to replicate the backup index across a plurality of media agents.

Another aspect of the disclosure provides a computer-implemented method of configuring a media agent of an information management system. The computer-implemented method comprising: as implemented by a storage manager within an information management system, the storage manager comprising one or more hardware processors and configured with specific computer-executable instructions, configuring a secondary computing system as a media agent; restoring a backup index from a network storage system to the media agent; accessing a transaction log file at the network storage system that is more recent than the backup index; updating the backup index at the media agent based at least in part on the transaction log file to obtain a current backup index; associating the current backup index with the media agent; and adding the media agent to a set of available media agents at a secondary storage system of the information management system.

The method of the preceding paragraph can include any combination or sub-combination of the following features: where configuring the secondary computing system as the media agent comprises configuring the secondary computing system to host the media agent; where the secondary computing system comprises a computing system at the secondary storage system of the information management system; where the method further comprises detecting a failure of a second media agent that differs from the media agent, wherein configuring the secondary computing system as the media agent occurs in response to detecting the failure of the second media agent; where the failure of the second media agent comprises a loss of access to the second media agent; where the backup index is one of a plurality of backup indexes at the network storage system, and wherein the backup index is the most recently generated backup index of the plurality of backup indexes; where the transaction log file is associated with a timestamp that is more recent than a timestamp of the backup index; where the transaction log file comprises a set of file attributes for one or more files that have been backed up during a period of time that is more recent than when the backup index was generated; where the transaction log file is one of a plurality of transaction log files, wherein each transaction log file is generated at a different time period, and wherein each transaction log file is more recent than the backup index; where adding the media agent to the set of available media agents comprises designating the media agent as available for use by a primary storage system in a management repository of the storage manager; wherein the method further comprises accessing a transaction identifier that is more recent than the transaction log file; and updating the current backup index based at least in part on the transaction identifier to obtain an updated current backup index, wherein associating the current backup index with the media agent comprises associating the updated current backup index with the media agent; where updating the current backup index based at least in part on the transaction identifier comprises replaying a transaction associated with the transaction identifier and updating the current backup index based on a result of replaying the transaction; and where the transaction identifier is accessed from a distributed indexing system.

Another aspect of the disclosure provides a system for configuring a media agent at an information management system. The system comprises: a storage manager comprising one or more hardware processors, the storage manager configured to: configure a secondary computing system as a media agent; restore a backup index from a network storage system to the media agent; access a transaction log file at the network storage system that is more recent than the backup index; update the backup index at the media agent based at least in part on the transaction log file to obtain a current backup index; provide the media agent with access to the current backup index; and add the media agent to a set of available media agents at a secondary storage system of the information management system.

The system of the preceding paragraph can include any combination or sub-combination of the following features: where the storage manager is further configured to determine that a scaling criteria satisfies a scaling threshold, wherein configuring the secondary computing system as the media agent occurs in response to detecting that the scaling criteria satisfies the scaling threshold; where the storage manager is further configured to add the media agent to the set of available media agents by replacing a second media agent of the set of available media agents with the media agent; where the transaction log file comprises a reduced set of metadata for a backed up file compared to the backup index; where the storage manager is further configured to add the media agent to the set of available media agents by designating the media agent as available for use in a management repository of the storage manager; where the storage manager is further configured to: access a transaction identifier that is associated with a timestamp that is more recent than a timestamp of the transaction log file; and update the current backup index based at least in part on the transaction identifier to obtain an updated current backup index, wherein providing the media agent with access to the current backup index comprises providing the media agent with access to the updated current backup index with the media agent; and where the storage manager is further configured to update the current backup index based at least in part on the transaction identifier by replaying a transaction associated with the transaction identifier and updating the current backup index based on a result of replaying the transaction.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope to the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects are presented below in certain claim forms, but the applicant contemplates other aspects in any number of claim forms. For example, while only one aspect may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of reducing storage manager overhead associated with secondary storage management of an information management system during backup, the computer-implemented method comprising:
   as implemented by one or more hardware processors of the information management system, the one or more hardware processors configured with specific computer-executable instructions,
      accessing first backup metadata associated with a first backup of data from a first client computing system of the information management system to one or more secondary storage devices of a network storage system as part of a backup process, the first backup performed using a cached job identifier associated with the first client computing system, wherein the network storage system is external to the information management system;
      generating a first transaction log file based on the first backup metadata;
      providing the first transaction log file to a first media agent of the information management system associated with the first client computing system;
      maintaining the first transaction log file at a plurality of media agents by at least replicating the first transaction log file to at least a second media agent of the information management system, wherein the second media agent is selected from the plurality of media agents based at least in part on an identity of the first client computing system or a job identifier associated with the first transaction log file;
      determining occurrence of a trigger to update a backup index at the network storage system;
      accessing a set of transaction log files including the first transaction log file;
      updating the backup index at the network storage system based on the set of transaction log files; and
      flushing the set of transaction log files.

2. The computer-implemented method of claim 1, further comprising, prior to said flushing the set of transaction log files, replicating the backup index within a distributed index storage system.

3. The computer-implemented method of claim 2, wherein the distributed index storage system is implemented at the network storage system.

4. The computer-implemented method of claim 2, wherein updating the backup index comprises identifying a backup index at the distributed index storage system associated with the first client computing system based on the job identifier assigned to the first client computing system.

5. The computer-implemented method of claim 1, wherein flushing the set of transaction log files comprises deleting the set of transaction log files.

6. The computer-implemented method of claim 1, wherein the trigger to update the backup index comprises one or more of: an elapse of a period of time, an indication of completion of a backup job, the number of transaction log files added to the set of transaction log files satisfying a threshold; or receipt of a command to update the backup index.

7. The computer-implemented method of claim 1, wherein updating the backup index comprises generating a new backup index.

8. The computer-implemented method of claim 1, wherein the first media agent is implemented at a secondary storage computing system included in a secondary storage environment and the first client computing system is included in a primary storage environment of the information management system.

9. The computer-implemented method of claim 8, wherein at least said generating the first transaction log file is performed by a core media agent at the first client computing system that is separate from the first media agent.

10. The computer-implemented method of claim 1, wherein a second transaction log file associated with backup of a second client computing system is provided to the second media agent, and wherein the second transaction log file is replicated to the first media agent.

11. The computer-implemented method of claim 1, further comprising:
   detecting failure of a secondary storage computing system hosting the first media agent;
   configuring a computing system as a replacement secondary storage computing system;
   replicating the first transaction log from the second media agent to a replacement media agent hosted by the replacement secondary storage computing system; and
   registering the replacement media agent with a storage manager of the information management system.

12. The computer-implemented method of claim 1, further comprising:
   receiving a request to access a backup index associated with the job identifier;

determining that a set of transaction log files associated with the job identifier exist, the set of transaction log files including the first transaction log file;

updating the backup index based at least in part on the set of transaction log files to obtain an updated backup index; and providing access to the updated backup index responsive to the request to access the backup index.

13. The computer-implemented method of claim 12, further comprising flushing the set of transaction log files after updating the backup index.

14. A system for reducing storage manager overhead associated with secondary storage management of an information management system, the system comprising:

a log manager implemented by one or more hardware processors of a client computing system, the log manager configured to:

access first backup metadata associated with a first backup of data from a primary storage device of a client computing system to a network storage system as part of a backup process at a first time, the first backup performed using a cached job identifier obtained from a storage manager at a second time that is earlier than the first time, wherein the network storage system is external to the information management system;

generate a first transaction log file based on the first backup metadata; and provide the first transaction log file to a first media agent at a first secondary storage computing system of the information management system; and the first media agent implemented by one or more hardware processors of the secondary storage computing system, the first media agent configured to maintain the first transaction log file at a plurality of media agents by replicating the first transaction log to at least a second media agent of the information management system hosted by a second secondary storage computing system, wherein the second media agent is selected from the plurality of media agents based at least in part on an identity of the client computing system or a job identifier associated with the first transaction log file.

15. The system of claim 14, wherein the first media agent is further configured to:

determine an occurrence of a trigger to update a backup index;

access a set of transaction log files including the first transaction log file;

update the backup index based on the set of transaction log files;

replicate the backup index within a distributed index storage system; and flush the set of transaction log files.

16. The system of claim 15, wherein the first media agent is further configured to cause the set of transaction log files to be flushed from the second media agent.

17. The system of claim 15, wherein the first media agent determines the set of transaction log files to access based at least in part on the job identifier associated with the client computing system.

18. The system of claim 14, further comprising a storage manager configured to:

detect failure of the secondary storage computing system implementing the first media agent;

configure a computing system as a replacement secondary storage computing system; and replicate the first transaction log from the second media agent to a replacement media agent hosted by the replacement secondary storage computing system.

19. The system of claim 18, wherein the storage manager is further configured to assign the replacement media agent to the client computing system as a replacement for the first media agent.

20. The system of claim 14, wherein the first media agent is further configured to:

receive a request to access a backup index associated with the job identifier;

determine that a set of transaction log files associated with the job identifier exist, the set of transaction log files including the first transaction log file;

update the backup index based at least in part on the set of transaction log files to obtain an updated backup index; and provide access to the updated backup index responsive to the request to access the backup index.

* * * * *